US010013479B2

(12) United States Patent
Inoue et al.

(10) Patent No.: US 10,013,479 B2
(45) Date of Patent: Jul. 3, 2018

(54) DISPLAYING CONVERSION CANDIDATES ASSOCIATED WITH INPUT CHARACTER STRING

(71) Applicant: International Business Machines Corporation, Armonk, NY (US)

(72) Inventors: Motoharu Inoue, Kanagawa (JP); Kensuke Matsuoka, Chiba (JP); Yohei Noda, Tokyo (JP); Asako Ono, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 298 days.

(21) Appl. No.: 14/821,832

(22) Filed: Aug. 10, 2015

(65) Prior Publication Data
US 2016/0092450 A1     Mar. 31, 2016

(30) Foreign Application Priority Data
Sep. 29, 2014   (JP) ................... 2014-198477

(51) Int. Cl.
*G06F 17/30*     (2006.01)
(52) U.S. Cl.
CPC .............. *G06F 17/30646* (2013.01)
(58) Field of Classification Search
CPC ................................................ G06F 17/30646
See application file for complete search history.

(56) References Cited

U.S. PATENT DOCUMENTS 7,107,204 B1*   9/2006   Liu ...................... G06F 17/273
704/2

9,105,000 B1   8/2015   White et al.
2016/0148018 A1*   5/2016   Sugiura ............... G06F 21/6254
726/28

FOREIGN PATENT DOCUMENTS

| JP | 11031109 A | 2/1999 |
|---|---|---|
| JP | 2000307630 A | 11/2000 |
| JP | 2001188721 A | 7/2001 |
| JP | 2001188776 A | 7/2001 |
| JP | 2002197027 A | 7/2002 |
| JP | 2003114898 A | 4/2003 |

(Continued)

OTHER PUBLICATIONS

Inoue et al., "Method of Displaying Conversion Candidates Associated With Input Character String, Electronic Apparatus and Server Computer for Method, and Program for Electronic Apparatus and Program for Server Computer", Japanese Patent Application 2014-198477, pp. 1-194, filed on Sep. 29, 2014.

(Continued)

*Primary Examiner* — Apu Mofiz
*Assistant Examiner* — Husam T Samara
(74) *Attorney, Agent, or Firm* — Stosch Sabo

(57) ABSTRACT

A method, executed by an electronic apparatus, includes retrieving, in response to input of a character string by a user, conversion candidates associated with the input character string, each conversion candidate having a first rank. The method also includes displaying, when a plurality of the conversion candidates are present, the plurality of conversion candidates within a corresponding plurality of regions on a map wherein conversion candidates that have a higher first rank occupy larger regions on the map. A corresponding computer program product and corresponding computer systems are also disclosed herein.

2 Claims, 25 Drawing Sheets

(56) References Cited

FOREIGN PATENT DOCUMENTS

| | | |
|---|---|---|
| JP | 2003141034 A | 5/2003 |
| JP | 2006285703 A | 10/2006 |
| JP | 2006344039 A | 12/2006 |
| JP | 2007193717 A | 8/2007 |
| JP | 2007293635 A | 11/2007 |
| JP | 2008123318 A | 5/2008 |
| JP | 2009015743 A | 1/2009 |
| JP | 2009093325 A | 4/2009 |
| JP | 2009199254 A | 9/2009 |
| JP | 2009258970 A | 11/2009 |
| JP | 2010015283 A | 1/2010 |
| JP | 2010271811 A | 12/2010 |
| JP | 2011118735 A | 6/2011 |
| JP | 2011192002 A | 9/2011 |
| JP | 2012027748 A | 2/2012 |
| JP | 2013251002 A | 12/2013 |
| JP | 2014174953 A | 9/2014 |
| WO | 2014068745 A1 | 5/2014 |

OTHER PUBLICATIONS

List of IBM Patents or Patent Applications Treated as Related, Sep. 19, 2017. 2 pages.
Decision to Grant a Patent, Patent Application No. 2014-198477. Drafted May 12, 2016, translated Jun. 30, 2016. 6 pages.
Notification of Reasons for Refusal, Patent Application No. 2014-198477. Drafted Feb. 2, 2016, translated Jun. 30, 2016. 9 pages.
Inoue et al., "Displaying Conversion Candidates Associated With Input Character String", U.S. Appl. No. 15/709,626, filed Sep. 20, 2017.

* cited by examiner

| MAIL ADDRESS | APPELLATION | NUMBER OF PEOPLE WHO TRANSMITTED MAILS USING APPELLATION | NUMBER OF TIMES SENDER TRANSMITTED MAILS USING APPELLATION |
|---|---|---|---|
| Taro_Saitoh@us.ibm.com | Mr. Saito | 8 | 20 |
| | Mr. Saitoh | 20 | 60 |
| | Saitoh-san | 10 | 200 |
| | Mr. Taro Saitoh | 3 | 30 |
| | Taro | 1 | 0 |

FIG. 2B

| MAIL ADDRESS | APPELLATION | NUMBER OF PEOPLE WHO TRANSMITTED MAILS USING APPELLATION | NUMBER OF TIMES SENDER TRANSMITTED MAILS USING APPELLATION |
|---|---|---|---|
| Taro_Saitoh@jp.ibm.com | Mr. Saito | 8 | 20 |
| | Mr. Saitoh | 20 | 60 |
| | Saitoh-san | 10 | 200 |
| | Saito-san | 3 | 30 |
| | Taro-san | 1 | 0 |

FIG. 2D

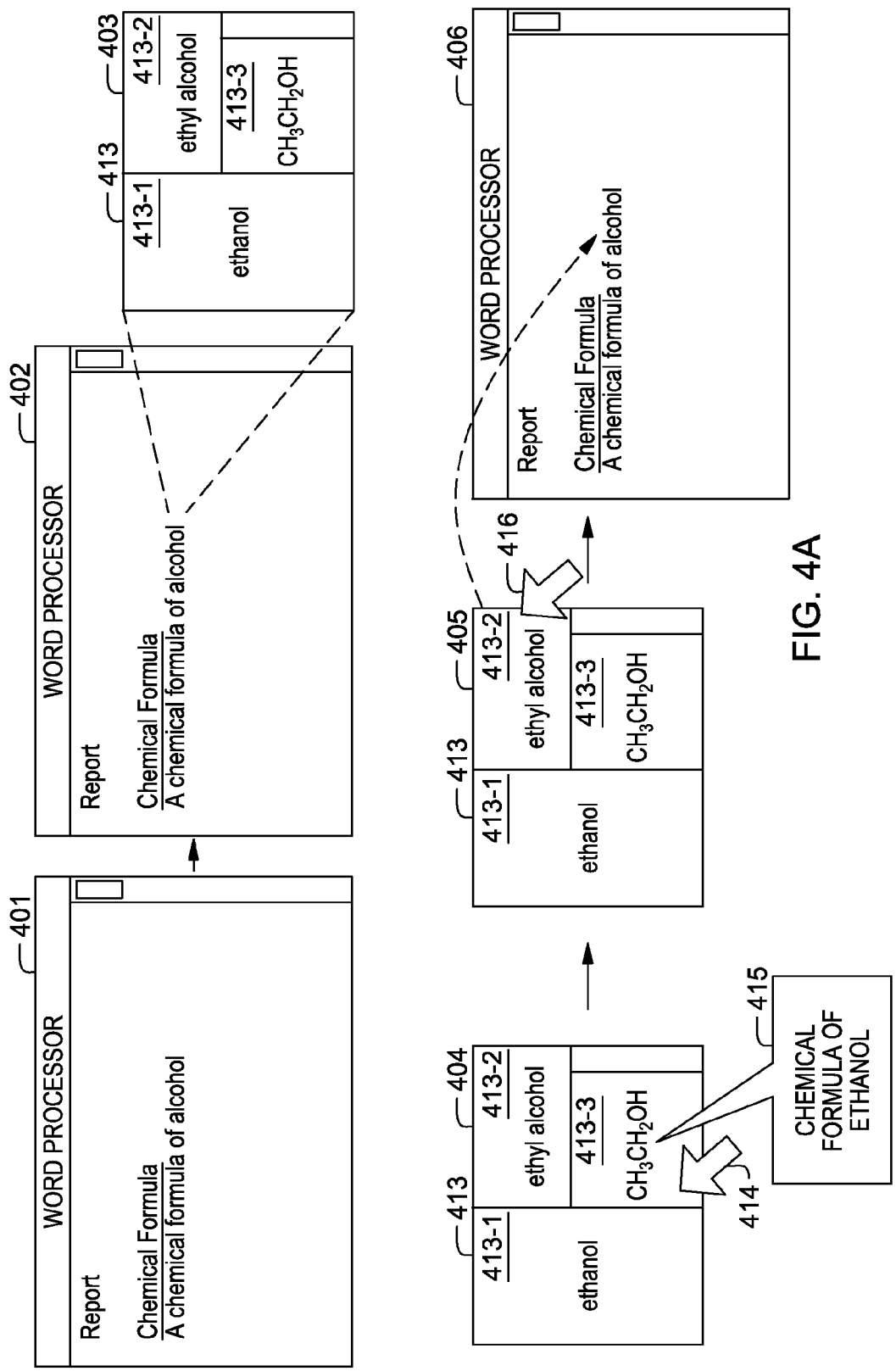

FIG. 4B

| INPUT CHARACTER STRING | CONVERSION CANDIDATE | NUMBER OF PEOPLE WHO PERFORMED DECISION INPUTS USING CONVERSION CANDIDATE | NUMBER OF TIMES INPUTTING PERSON PERFORMED DECISION INPUTS USING CONVERSION CANDIDATE |
|---|---|---|---|
| alcohol | ethanol | 50 | 60 |
| | ethy alcohol | 25 | 200 |
| | $CH_3CH_2OH$ | 10 | 30 |
| | $CH_3-CH_2-OH$ | 5 | 20 |
| | EtOH | 2 | 10 |

| INPUT CHARACTER STRING | CONVERSION CANDIDATE | NUMBER OF PEOPLE WHO PERFORMED DECISION INPUTS USING CONVERSION CANDIDATE | NUMBER OF TIMES INPUTTING PERSON PERFORMED DECISION INPUTS USING CONVERSION CANDIDATE |
|---|---|---|---|
| alcohol | ethyl alcohol | 25 | 200 |
| | ethanol | 50 | 60 |
| | CH₃CH₂OH | 14 | 20 |
| | ethy alcohol | 12 | 15 |
| | ethanol | 8 | 12 |
| | CH₃-CH₂-OH | 6 | 10 |
| | ethyl alcohol | 2 | 1 |
| | EtOH | 2 | 5 |

FIG. 4D

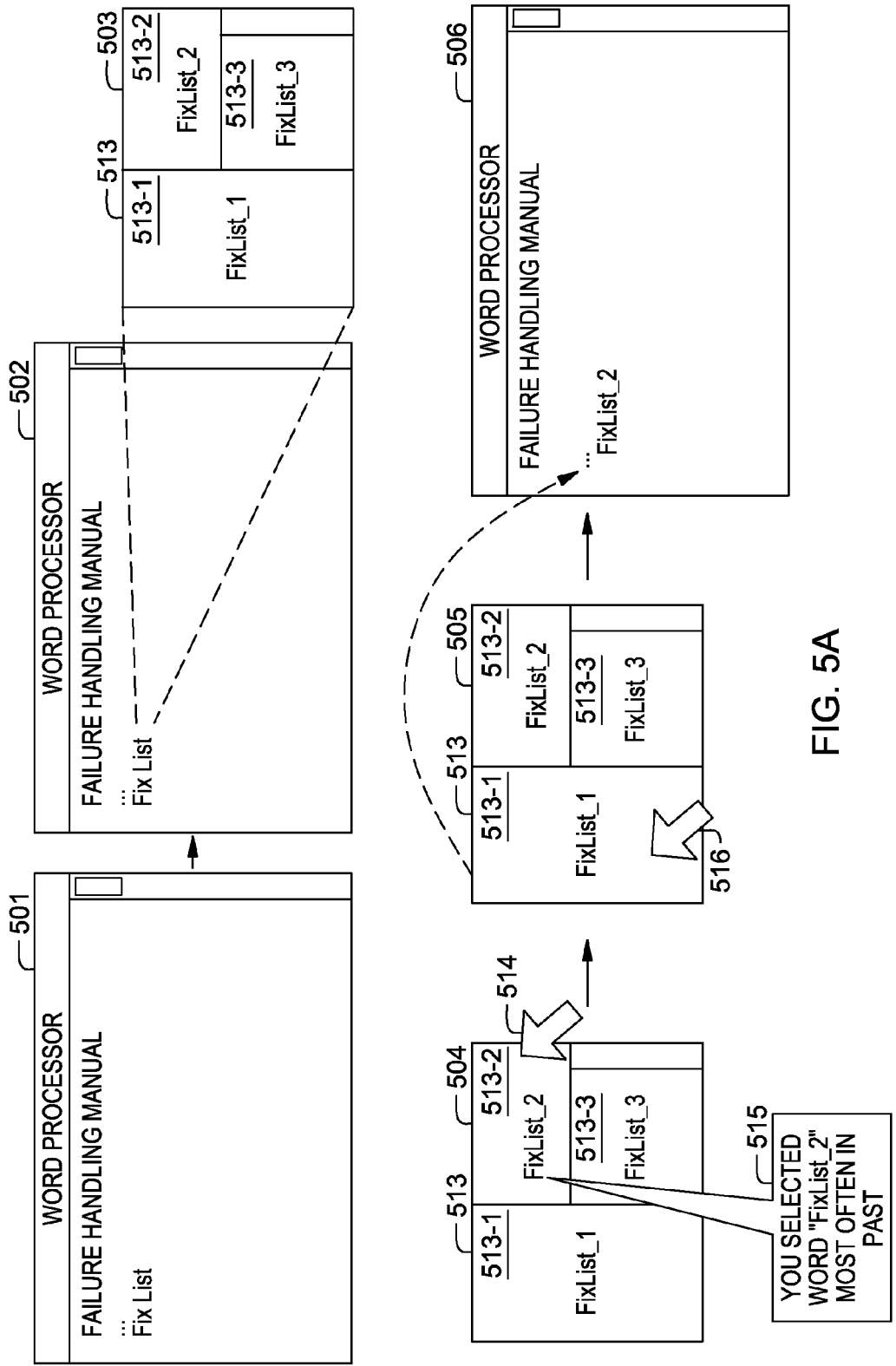

| INPUT CHARACTER STRING (CONVERSION TARGET CHARACTER STRING) | CONVERSION CANDIDATE | NUMBER OF PEOPLE WHO PERFORMED DECISION INPUTS USING CONVERSION CANDIDATE | NUMBER OF TIMES INPUTTING PERSON PERFORMED DECISION INPUTS USING CONVERSION CANDIDATE |
|---|---|---|---|
| Fix List | FixList_2 | 10 | 120 |
| | FixList_1 | 20 | 100 |
| | FixList_3 | 5 | 15 |
| | Fix List | 2 | 5 |

FIG. 5B

DISPLAYING CONVERSION CANDIDATES ASSOCIATED WITH INPUT CHARACTER STRING

BACKGROUND OF THE INVENTION

The present invention relates generally to character string conversions and specifically to user interfaces for character string conversions.

A character conversion system is a system in which a user inputs a word, phrase or sentence and the character conversion system converts the input character string into a character string associated with the input character string.

SUMMARY

A method, executed by an electronic apparatus, includes retrieving, in response to input of a character string by a user, conversion candidates associated with the input character string, each conversion candidate having a first rank, displaying, when a plurality of the conversion candidates are present, the plurality of conversion candidates within a corresponding plurality of regions on a map wherein conversion candidates that have a higher first rank occupy larger regions on the map. A corresponding computer program product and corresponding computer systems are also disclosed herein.

BRIEF DESCRIPTION OF THE DRAWINGS

FIG. 2B is an illustration showing data usable for displaying the plurality of conversion candidates on the map in the mode shown in FIG. 2A;

FIG. 2D is an illustration showing data usable for displaying the plurality of conversion candidates on the map in the mode shown in FIG. 2C;

FIG. 4A is an illustration showing a mode in which a plurality of conversion candidates corresponding to an input character string (English) are displayed on the map and a selected conversion candidate on the map is decided in accordance with at least one embodiment of the present invention;

FIG. 4B is an illustration showing data usable for displaying the plurality of conversion candidates on the map in the mode shown in FIG. 4A;

FIG. 4D is an illustration showing data usable for displaying the plurality of conversion candidates on the map in the mode shown in FIG. 4C;

FIG. 5A is an illustration showing a mode in which a plurality of conversion candidates (Japanese words as translated words) corresponding to a character string (English) are displayed on a map and a selected conversion candidate on the map is decided in accordance with at least one embodiment of the present invention;

FIG. 5B is an illustration showing data usable for displaying the plurality of conversion candidates on the map in the mode shown in FIG. 5A;

DETAILED DESCRIPTION

Figure 1A:
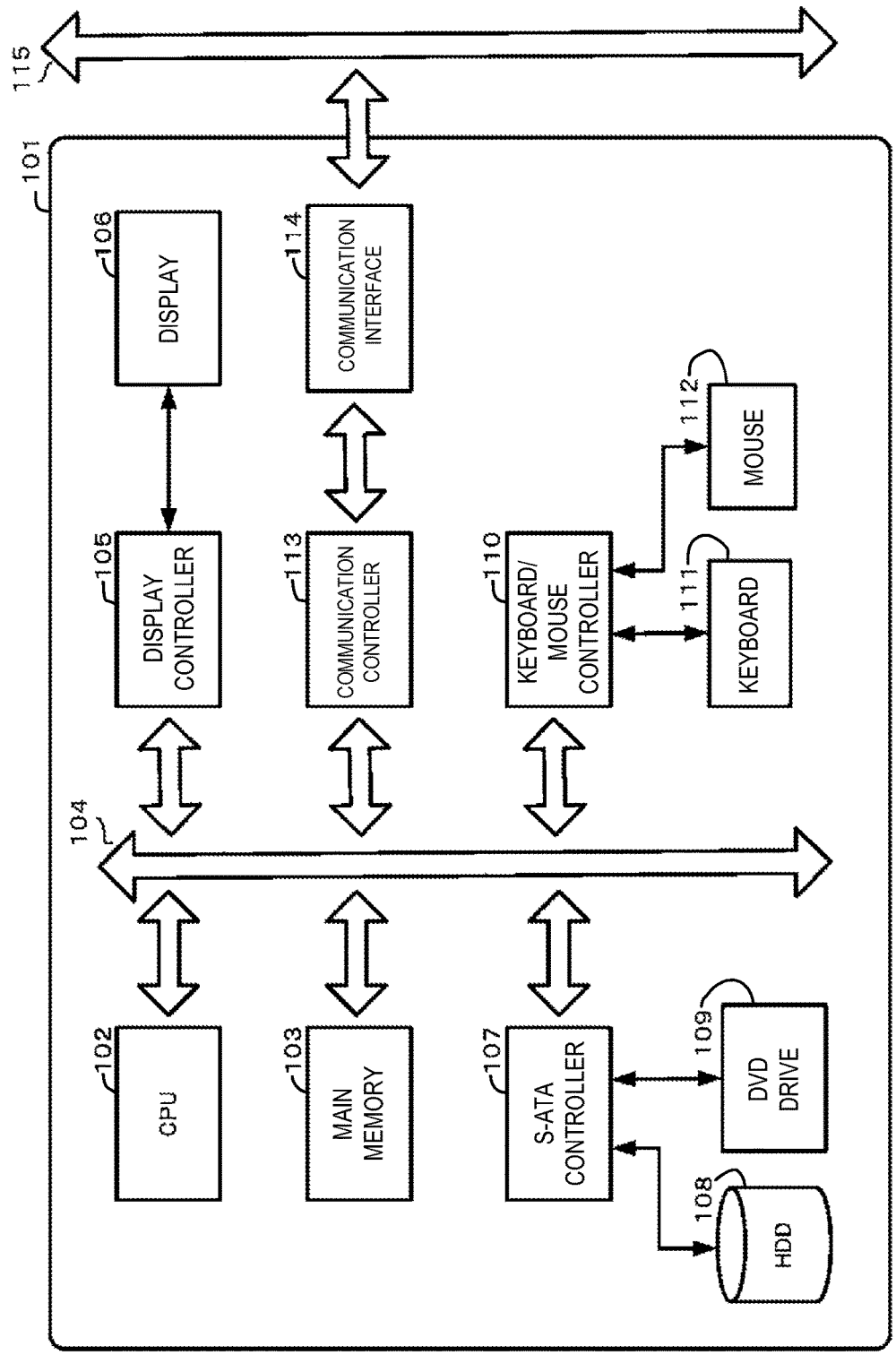
FIGS. 1A-1C are functional block diagrams showing various examples of an electronic apparatus (e.g., a computer, server computer, smart phone, phablet, tablet terminal, electronic book reader, cellular phone, or navigation apparatus) in accordance with at least one embodiment of the present invention.

It should be noted that various terms used herein may be subject to trademark rights in various jurisdictions throughout the world and is used here only in reference to the products or services properly denominated by the marks to the extent that such trademark rights may exist.

Embodiments of the present invention are explained below with reference to the drawings. Throughout the figures referred to below, unless particularly noted, the same reference numerals and signs indicate the same targets. Please understand that the embodiments of the present invention are embodiments for explaining various modes of the present invention and are not intended to limit the scope of the present invention to a scope explained in the embodiments.

Figure 1B:
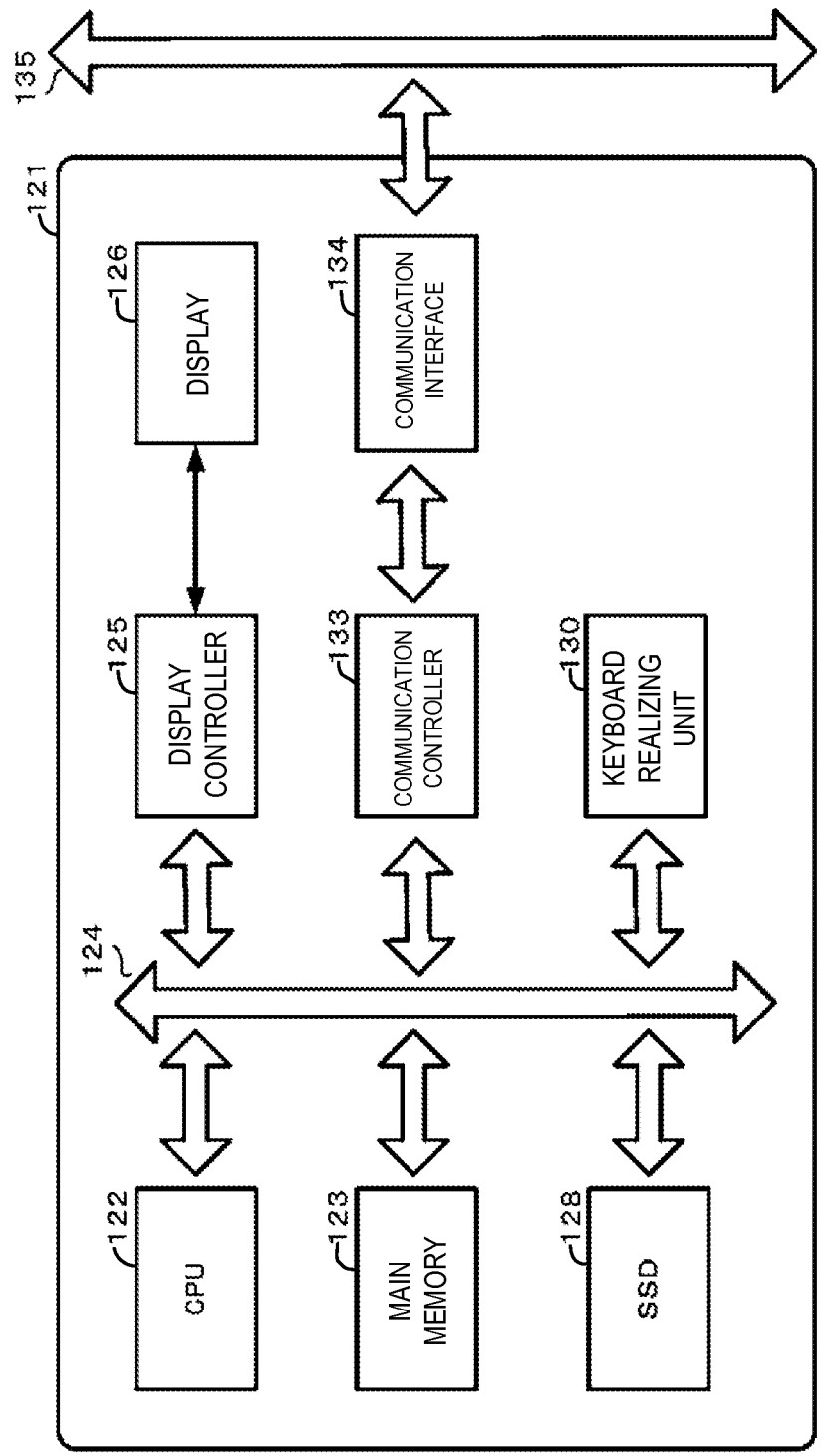

FIGS. 1A and 1B are respectively diagrams showing examples of an electronic apparatus according to an embodiment of the present invention or usable in the embodiment of the present invention. FIG. 1A is a diagram showing an example of an electronic apparatus (e.g., a computer such as a desktop computer, a display integrated computer, a notebook computer, or an ultra book) according to the embodiment of the present invention or usable in the embodiment of the present invention.

An electronic apparatus (101) includes one or a plurality of CPUs (102) and a main memory (103), which are connected to a bus (104). The CPU (102) may be based on a 32-bit or 64-bit architecture. The CPU (102) can be, for example, Core™, i series, Core™, 2 series, Atom™ series, Xeon® series, Pentium® series, or Celeron® series of Intel Corporation, A series, Phenom™ series, Athlon™ series, Turion® series, or Sempron™ of AMD (Advanced Micro Device), or Power™ series of International Business Machines Corporation.

A display (106), for example, a liquid crystal display (LCD) can be connected to the bus (104) via a display controller (105). The liquid crystal display (LCD) may be, for example, a touch panel display or a floating touch display. The display (106) can be used for displaying, in an appropriate graphic interface, an object displayed according to operation of software operating on the electronic apparatus (101) or any various programs for the electronic apparatus operating on the electronic apparatus (101) (e.g., any various computer programs). The display (106) can output, for example, software for performing a character input, for example, various kinds of business software (e.g., word processor, spread sheet, and presentation software), or a screen of a mailer.

A disk (108), for example, a hard disk or a solid state drive (SSD) can be optionally connected to the bus (104) via, for example, a SATA or IDE controller (107). A drive (109), for example, a CD, DVD, or BD driver can be optionally connected to the bus (104) via, for example, the SATA or IDE controller (107). A keyboard (111) or a mouse (112) can be optionally connected to the bus (104) via a peripheral device controller (110), for example, via a keyboard/mouse controller or a USB bus.

In the disk (108), an operating system, for example, Windows®, MacOS®, Android®, UNIX®, and Linux® and a Java® processing environment such as J2EE, Java® application, a Java® virtual machine (VM), a program for providing a (JIT) compiler during Java® execution, a computer program according to the embodiment of the present invention, and other programs, and data can be stored to be loadable to the main memory (103).

The disk (108) may be incorporated in the electronic apparatus (101), may be connected via a cable such that the electronic apparatus (101) is accessible to the disk (108), or may be connected via a wired or wireless network such that the electronic apparatus (101) is accessible to the disk (108). The drive (109) can be used to install, for example, an operating system, applications, or the program for the electronic apparatus according to the embodiment of the present invention in the disk (108) from a CD-ROM, a DVD-ROM, or a BD according to necessity.

A communication interface (114) conforms to, for example, an Ethernet® protocol. The communication interface (114) is connected to the bus (104) via a communication controller (113), plays a role of connecting the electronic apparatus (101) to a communication line (115) by wire or radio, and provides a network interface layer to a TCP/IP communication protocol of a communication function of an operating system of the electronic apparatus (101). Note that the communication line can be, for example, a wireless LAN environment based on a wireless LAN connection standard, a Wi-Fi wireless LAN environment such as IEEE802.11a/b/g/n, or a cellular phone network environment (e.g., 3G, LTE, or 4G environment).

FIG. 1B is a diagram showing an example of an electronic apparatus (e.g., a smart phone, a phablet, a tablet terminal, an electronic book reader, a cellular phone, or a navigation apparatus (e.g., a portable navigation apparatus)) according to the embodiment of the present invention or usable in the embodiment of the present invention.

A CPU (122), a main memory (123), a bus (124), a display controller (125), a display (126), an SSD (128), a communication controller (133), a communication interface (134), and a communication line (135) of an electronic apparatus (121) shown in FIG. 1B can respectively correspond to the CPU (102), the main memory (103), the bus (104), the display controller (105), the display (106), the disk (108), the communication controller (113), the communication interface (114), and the communication line (115) of the electronic apparatus (101) shown in FIG. 1A. When the electronic apparatus (121) is a smart phone, a phablet, a tablet terminal, an electronic book reader, a cellular phone, a navigation apparatus, or the like, the CPU (122) can be, for example, various CPUs for the tablet terminal, the smart phone, the electronic book reader, or the cellular phone or A series of Apple Inc.®.

In the SSD (128) disk, for example, an OS for the smart phone, the phablet, the tablet terminal, the electronic book reader, the cellular phone, or the navigation apparatus (e.g., Android™, FireOS®, Windows® or Windows® PhoneOS, or iOS®) and a Java® processing environment such as J2EE, Java® application, a Java® virtual machine (VM), a program for providing a (JIT) compiler during Java® execution, a program for the electronic apparatus according to the embodiment of the present invention, any various programs for the electronic apparatus operating on the electronic apparatus (121), and data can be stored to be loadable to the main memory (123). Keyboard realizing means (130) can display a software keyboard on the display (126) as one of applications.

Please understand that, in the following explanation, when the electronic apparatus (101) is described, the electronic apparatus (101) may be the electronic apparatus (121) shown in FIG. 1B instead of the electronic apparatus (101) shown in FIG. 1A.

Figure 1C:
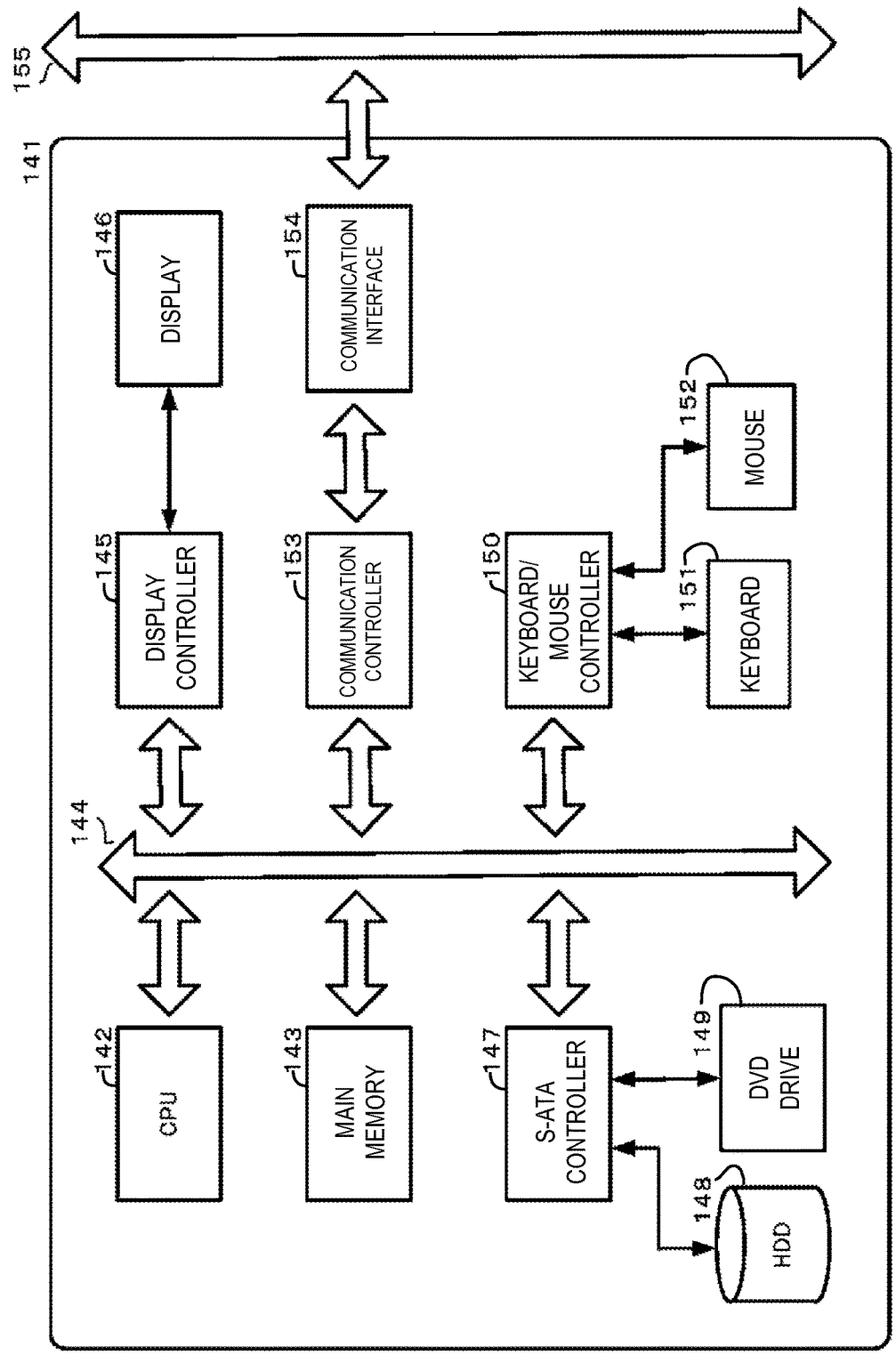

FIG. 1C is a diagram showing an example of a server computer (e.g., a computer including a server function) according to the embodiment of the present invention or usable in the embodiment of the present invention. A server computer (141) can be configured as a general-purpose computer apparatus such as a work station, a rack mount-type server, a blade-type server, a midrange, or a main frame.

The server computer (141) includes one or a plurality of CPUs (142) and a main memory (143), which are connected to a bus (144). The CPU (142) may be based on a 32-bit or 64-bit architecture. The CPU (142) can be, for example, Xeon® series, Core™, i series, Core™, 2 series, Pentium® series, Celeron® series, or Atom™ series of Intel Corporation, Opteron™ series, A series, Phenom™ series, Athlon™ series, Turion® series, or Sempron™ of AMD (Advanced Micro Device), or Power™ series of International Business Machines Corporation.

The main memory (143), the bus (144), a display controller (145), a display (146), an SATA or IDE controller (147), a disk (148), a drive (149), a peripheral device controller (150), a keyboard (151), a mouse (152), a communication controller (153), a communication interface (154), and a communication line (155) of the server computer (141) shown in FIG. 1C can respectively correspond to the main memory (103), the bus (104), the display controller (105), the display (106), the SATA or IDE controller (107), the disk (108), the drive (109), the peripheral device controller (110), the keyboard (111), the mouse (112), the communication controller (113), the communication interface (114), and the communication line (115) of the electronic apparatus (101) shown in FIG. 1A.

The server computer (141) can operate one or a plurality of virtual machines including the same or different OSs (e.g., Windows®, UNIX®, and Linux®) as guest OSs on a hypervisor (referred to as virtualization monitor or virtualization OS as well) of virtualization software (e.g., VMWare®, Hyper-V®, or Xen®).

FIG. 2A and FIG. 2B, FIG. 2C and FIG. 2D, FIG. 3A and FIG. 3B, FIG. 3C and FIG. 3D, FIG. 4A and FIG. 4B, FIG. 4C and FIG. 4D, and FIG. 6A and FIG. 6B referred to below respectively show various modes in which a conversion candidate associated with an input character string is displayed according to the embodiments of the present invention. Note that, in FIG. 2C and subsequent figures and paragraphs of explanation of the figures, Han characters (whose category has the following 4 subcategories, Chinese hanzi, Japanese kanji, Korean hanja, and Vietnamese Han tu) sometimes appear as conversion candidate examples. For example, the Han characters are SAITOH_1(齋藤) and SAITOH_2(斉藤). These characters are used as personal names in countries that use Han characters. Since these characters are different forms but read the same (SAITOH), these characters are likely to be mis-converted. Please note that modes of conversion candidates are different depending on countries.

Figure 2A:
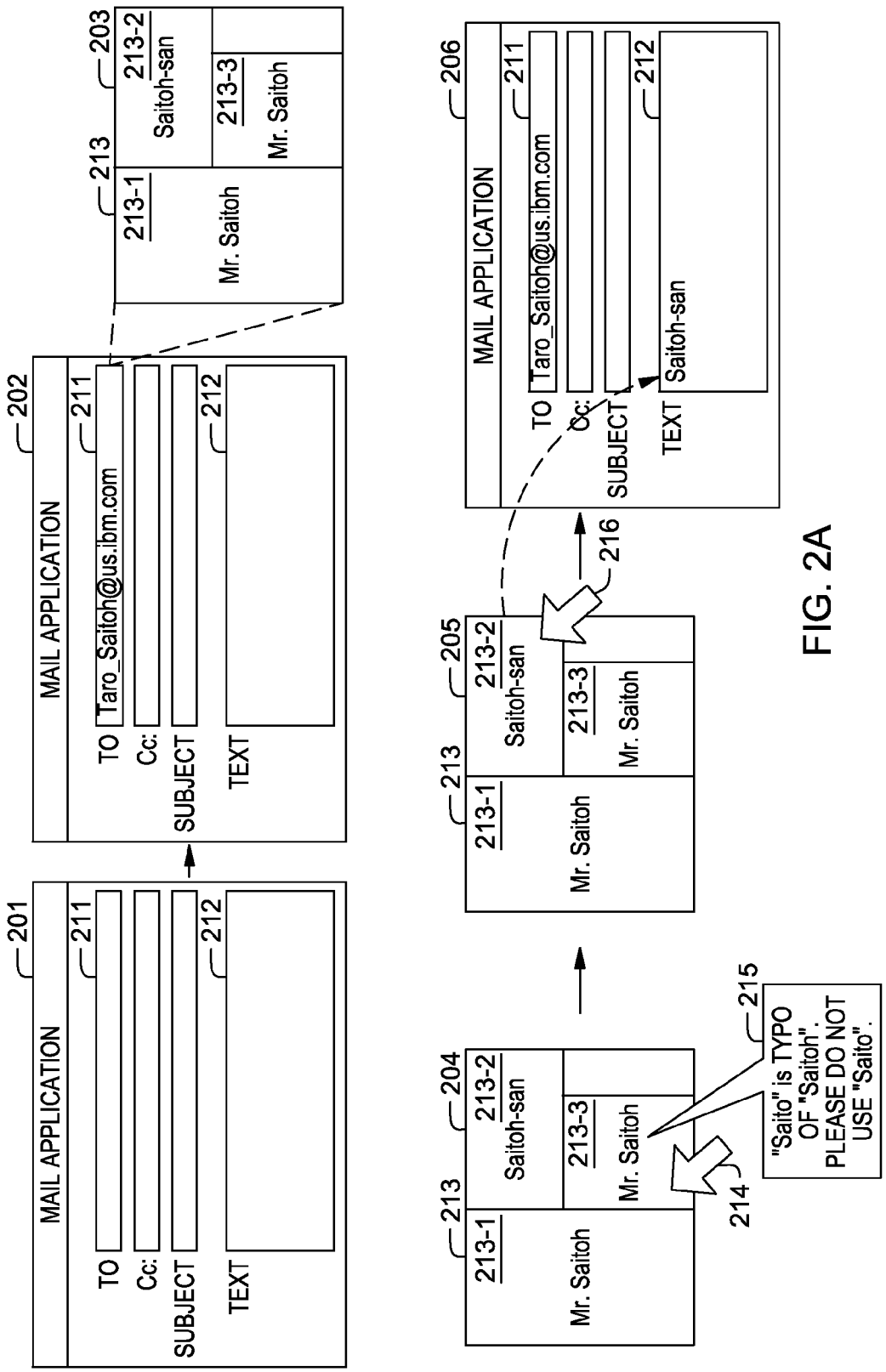
FIG. 2A is an illustration depicting a mode in which a plurality of conversion candidates (nicknames or names in English) corresponding to an input character string (mail address) are displayed on a map and a selected conversion candidate on the map is input to a predetermined position in accordance with at least one embodiment of the present invention.

FIG. 2A shows a mode in which a plurality of conversion candidates (nicknames or names in English) corresponding to an input character string (mail address) are displayed on a map and a selected conversion candidate on the map is input to a predetermined position according to the embodiment of the present invention. FIG. 2B shows data usable for displaying the plurality of conversion candidates on the map in the mode shown in FIG. 2A.

In the following explanation, a mode in which the electronic apparatus (101) retrieves a plurality of conversion candidates (nicknames or names in English) corresponding to an input character string (mail address) and a mode in which the server computer (141) retrieves the plurality of conversion candidates are respectively explained.

In step 201, a user, user A, is about to start a mail application and create a new mail on the electronic apparatus (101) (e.g., a desktop computer). The electronic apparatus (101) starts the mail application and displays a screen for new mail creation. The screen for new mail creation includes fields for inputting a destination (211), carbon copy, a subject, and a text (212).

In step 202, user A inputs a mail address to the destination (211) or selects a mail address from an address book. It is assumed that the address input by or selected by user A is Taro_Saitoh@us.ibm.com. The electronic apparatus (101) displays the input or selected mail address "Taro_Saitoh@us.ibm.com" in the destination (211).

The electronic apparatus (101) refers to, according to the input or the selection of the mail address "Taro_Saitoh@us.ibm.com", data (207) including the mail address and a nickname or a name (hereinafter simply referred to as "appellation" as well) associated with the mail address. The data (207) has been downloaded to the electronic apparatus (101) from a storage medium (e.g., a server computer accessible to the storage medium) having stored therein the data (207), for example, during the start of the electronic apparatus (101) or during the start of the mail application or at every predetermined time interval.

The data (207) includes, for each mail address, a plurality of appellations associated with the mail address and, concerning each of the plurality of appellations, a total number of people who transmitted mails to the mail address using the appellation (hereinafter referred to as first count as well) and the number of times or a frequency a sender (i.e., the user A) transmitted mails to the mail address using the appellation (hereinafter referred to as second count as well). For example, when the mail address is a mail address for all members belonging to a specific organization, the appellation associated with the mail address can be, for example, "Hi all", "Hi, everyone", "Dear all", and "Dear all in . . . section".

The electronic apparatus (101) selects, referring to the data (207), for example, three appellations in descending order of the first counts of a respective plurality of appellations, which are conversion candidates, (the number of appellations to be selected can be set to any number and user A can set the number to, for example, three to five). Note that a conversion candidate having the high first count can be interpreted as an appellation used in more users. A conversion candidate having the low first count can be interpreted as a privately used appellation or a wrong appellation.

In step 203, the electronic apparatus (101) displays, in descending order of the first counts, conversion candidates "Mr. Saitoh" (the first count=20) (213-1), "Saitoh-san" (the first count=10) (213-2), and "Mr. Saito" (the first count=8) (213-3) on a map (213). The map (213) can be displayed as, for example, a window associated with the destination (211) or a mail address input to the destination (211). The electronic apparatus (101) displays the respective conversion candidates (213-1, 213-2, and 213-3) on the map (213) to occupy wider regions in descending order of the first counts. The area on the map is allocated according to, for example, a ratio of the first counts of the respective conversion candidates (213-1, 213-2, and 213-3). Alternatively, the area on the map is allocated at ratios of, for example, 50% for the conversion candidate having the highest first count of the respective conversion candidates (213-1, 213-2, and 213-3), for example, 30% for the conversion candidate having the second highest first count, and, for example, 20% for the conversion candidate having the third highest first count.

Subsequently, the electronic apparatus (101) reads, referring to the data (207), the second counts of the respective selected conversion candidates (213-1, 213-2, and 213-3). The electronic apparatus (101) displays the regions on the map such that, for example, a hue is lighter, brightness is lower, or chroma is lower as the second count is lower. That is, the electronic apparatus (101) displays the conversion candidates on the map (213) in descending order of the second counts such that, for example, a hue is lighter, brightness is lower, or chroma is lower in the order of the conversion candidates "Saitoh-san" (the second count=200)

(213-2), "Mr. Saitoh" (the second count=60) (213-1), and "Mr. Saito" (the second count=20) (213-3).

On the map (213), the electronic apparatus (101) displays a plurality of conversion candidates according to two ranks of the respective first and second counts. In the case of a conversion candidate having the high first count, since an area occupied on the map (213) is large, user A can easily select the conversion candidate having the high first count. User A can learn, from display areas of the respective conversion candidates, what kinds of conversion candidates users other than user A often use. In the case of a conversion candidate having the high second count, since a hue displayed on the map (213) is thick, user A can learn which conversion candidate user A himself/herself frequently uses.

In step 204, user A places a mouse cursor (214) on the conversion candidate "Mr. Saito" (213-3) on the map (213). The electronic apparatus (101) displays, for example, with a popup window, information 'Since "Saito" is a typographical error of "Saitoh", please do not use "Saito"' (215) associated with the conversion candidate "Mr. Saito" (213-3) on which the mouse cursor (214) is placed and for supporting selection of the conversion candidate "Mr. Saito" (213-3) on which the mouse cursor (214) is placed.

In step 205, user A selects the conversion candidate "Saitoh-san" (213-2) on the map (213) using a mouse cursor (216) (e.g., left click). In step 206, the electronic apparatus (101) inputs, according to the selection by the mouse cursor (216), the selected "Saitoh-san" in the text (212) on an application to which a mail address is input (i.e., a position different from the destination (211) to which the mail address is input) and decides the selected "Saitoh-san". Therefore, user A can select, according to the input or the selection of the mail address "Taro_Saitoh@us.ibm.com", a conversion candidate, which user A considers optimum, out of the appellations, which are the plurality of conversion candidates, on the graphically displayed map (213) and input the conversion candidate.

According to the conversion of the mail address "Taro_Saitoh@us.ibm.com" into the appellation "Saitoh-san", the electronic apparatus (101) can increment, by 1, the second count (=200) in a row in which a mail address is "Taro_Saitoh@us.ibm.com" and an appellation is "Saitoh-san" in the data (207).

The electronic apparatus (101) can notify the server computer (141) that the mail address "Taro_Saitoh@us.ibm.com" has been converted into the appellation "Saitoh-san". According to reception of the notification, the server computer (141) can increment, by 1, the second count (=200) in a row in which a mail address is "Taro_Saitoh@us.ibm.com" and an appellation is "Saitoh-san" in data corresponding to the data (207).

In step 201, a user B is about to start a mail application and create a new mail on the electronic apparatus (101) (e.g., a smart phone). The electronic apparatus (101) starts the mail application and displays a screen for new mail creation. The screen for new mail creation includes fields for inputting the destination (211), Cc., a subject, and the text (212).

In step 202, the user B inputs a mail address to the destination (211) or selects a mail address from an address book. It is assumed that the address input or selected by the user B is "Taro_Saitoh@us.ibm.com". The electronic apparatus (101) displays the input or selected mail address "Taro_Saitoh@us.ibm.com" in the destination (211).

The electronic apparatus (101) transmits, according to the input or the selection of the mail address "Taro_Saitoh@us.ibm.com", the input or selected mail address "Taro_Saitoh@us.ibm.com" to the server computer (141).

According to reception of the mail address "Taro_Saitoh@us.ibm.com" from the electronic apparatus (101), the server computer (141) refers to the data (207) including the mail address and a nickname or a name ("appellation") associated with the mail address. The data (207) is stored in, for example, a storage medium (e.g., the disk (148) shown in FIG. 1C) accessible by the server computer (141).

The data (207) includes, for each mail address, a plurality of appellations associated with the mail address and, concerning each of the plurality of appellations, a total number of people who transmitted mails to the mail address using the appellation (the first count) and the number of times or a frequency a sender (i.e., the user B) transmitted mails to the mail address using the appellation (the second count). Note that, when data is updated concerning the items of the data (207), the server computer (141) can update the data concerning the items, for example, on a real time basis or through batch processing.

The server computer (141) selects, referring to the data (207), for example, three appellations in descending order of the first counts of a respective plurality of appellations, which are conversion candidates, (the number of appellations to be selected can be set to any number and the user B can set the number to, for example, three to five). Note that a conversion candidate having the high first count can be interpreted as an appellation used in more users. A conversion candidate having the low first count can be interpreted as a privately used appellation or a wrong appellation. Therefore, the server computer (141) selects the conversion candidates "Mr. Saitoh" (the first count=20), "Saitoh-san" (the first count=10), and "Mr. Saito" (the first count=8) in descending order of the first counts.

Subsequently, the server computer (141) reads, referring to the data (207), the second counts of the respective selected three conversion candidates. The server computer (141) transmits the three conversion candidates and the first counts and the second counts associated with the respective conversion candidates to the electronic apparatus (101). The server computer (141) can optionally transmit information for supporting selection associated with the respective conversion candidates to the electronic apparatus (101).

The electronic apparatus (101) receives the three conversion candidates and the first counts and the second counts associated with the respective conversion candidates and optionally the information for supporting selection associated with the respective conversion candidates transmitted from the server computer (141).

The electronic apparatus (101) displays the received three conversion candidates on the map (213). The map (213) can be displayed as, for example, a window associated with the destination (211) or a mail address input to the destination (211). The electronic apparatus (101) displays the respective conversion candidates (213-1, 213-2, and 213-3) on the map (213) to occupy wider regions in descending order of the first counts. The area on the map is allocated according to, for example, a ratio of the first counts of the respective conversion candidates (213-1, 213-2, and 213-3). Alternatively, the area on the map is allocated at ratios of, for example, 50% for the conversion candidate having the highest first count of the respective conversion candidates (213-1, 213-2, and 213-3), for example, 30% for the conversion candidate having the second highest first count, and, for example, 20% for the conversion candidate having the third highest first count.

Subsequently, the electronic apparatus (101) displays the regions on the map such that, for example, a hue is lighter, brightness is lower, and chroma is lower as the second count is lower. That is, the electronic apparatus (101) displays the conversion candidates on the map (213) in descending order of the second counts such that, for example, a hue is lighter, brightness is lower, or chroma is lower in the order of the conversion candidates "Saitoh-san" (the second count=200) (213-2), "Mr. Saitoh" (the second count=60) (213-1), and "Mr. Saito" (the second count=20) (213-3).

On the map (213), the electronic apparatus (101) displays a plurality of conversion candidates according to two ranks of the respective first and second counts. In the case of a conversion candidate having the high first count, since an area occupied on the map (213) is large, the user B can easily select the conversion candidate having the high first count. The user B can learn, from display areas of the respective conversion candidates, what kinds of conversion candidates users other than the user B often use. In the case of a conversion candidate having the high second count, since a hue displayed on the map (213) is thick, the user B can learn which conversion candidate the user B himself/herself frequently uses.

In step 204, the user B places an operation finger (214) on the conversion candidate "Mr. Saito" (213-3) on the map (213). The electronic apparatus (101) displays, for example, with a popup window, information 'Since "Saito" is a typographical error of "Saitoh", please do not use "Saito"' (215) associated with the conversion candidate "Mr. Saito" (213-3) on which the operation finger (214) is placed and for supporting selection of the conversion candidate "Mr. Saito" (213-3) on which the operation finger (214) is placed. In step 205, the user B selects the conversion candidate "Saitoh-san" (213-2) on the map (213) using the operation finger (216) (e.g., double touch).

In step 206, the electronic apparatus (101) inputs, according to the selection by the operation finger (216), the selected "Saitoh-san" in the text (212) on an application to which a mail address is input (i.e., a position different from the destination (211) to which the mail address is input) and decides the selected "Saitoh-san". Therefore, the user B can select, according to the input or the selection of the mail address "Taro_Saitoh@us.ibm.com", a conversion candidate, which the user B considers optimum, out of the appellations, which are the plurality of conversion candidates, on the graphically displayed map (213) and input the conversion candidate.

The electronic apparatus (101) can notify the server computer (141) that the mail address "Taro_Saitoh@us.ibm.com" has been converted into the appellation "Saitoh-san". According to reception of the notification, the server computer (141) can increment, by 1, the second count (=200) in a row in which a mail address is "Taro_Saitoh@us.ibm.com" and an appellation is "Saitoh-san" in the data (207).

Figure 2C:
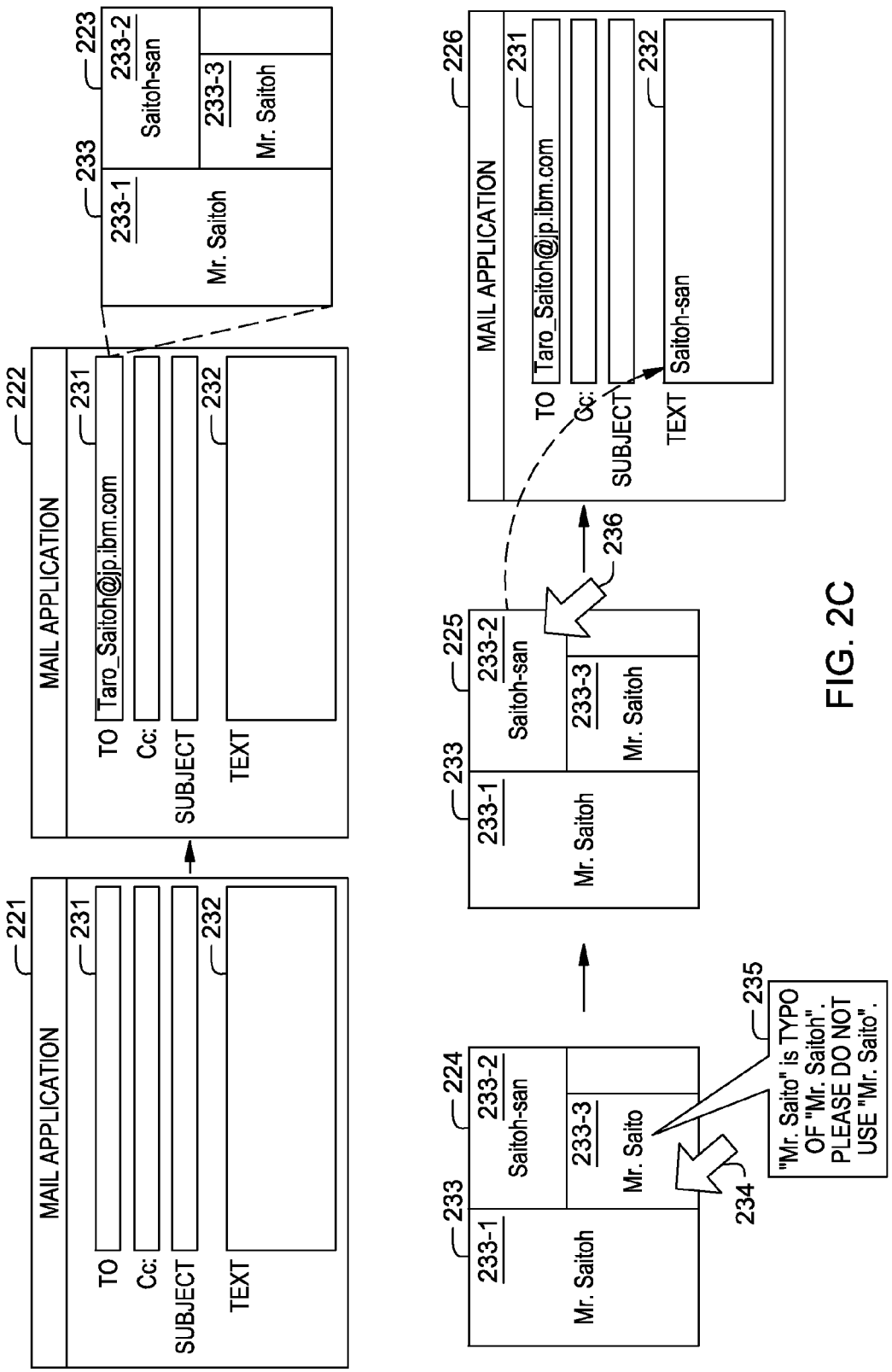
FIG. 2C is an illustration depicting a mode in which a plurality of conversion candidates (nicknames or names in Japanese) corresponding to an input character string (mail address) are displayed on a map and a selected conversion candidate on the map is input to a predetermined position in accordance with at least one embodiment of the present invention.

FIG. 2C shows a mode in which a plurality of conversion candidates (nicknames or names in Japanese) corresponding to an input character string (mail address) are displayed on a map and a selected conversion candidate on the map is input to a predetermined position according to the embodiment of the present invention. FIG. 2D shows data usable for displaying the plurality of conversion candidates on the map in the mode shown in FIG. 2C.

In the following explanation, a mode in which the electronic apparatus (101) retrieves a plurality of conversion candidates (nicknames or names in Japanese) corresponding to an input character string (mail address) and a mode in which the server computer (141) retrieves the plurality of conversion candidates are respectively explained.

In step 221, a user C is about to start a mail application and create a new mail on the electronic apparatus (101) (e.g., a display integrated computer). The electronic apparatus (101) starts the mail application and displays a screen for new mail creation. The screen for new mail creation includes fields for inputting a destination (231), Cc., a subject, and a text (232).

In step 222, the user C inputs a mail address to the destination (211) or selects a mail address from an address book. It is assumed that the address input or selected by the user C is "Taro_Saitoh@jp.ibm.com". The electronic apparatus (101) displays the input or selected mail address "Taro_Saitoh@jp.ibm.com" in the destination (231).

The electronic apparatus (101) refers to, according to the input or the selection of the mail address "Taro_Saitoh@jp.ibm.com", data (227) including the mail address and a nickname or a name ("appellation") associated with the mail address. The data (227) has been downloaded to the electronic apparatus (101) from a storage medium (e.g., a server computer accessible to the storage medium) having stored therein the data (227), for example, during the start of the electronic apparatus (101) or during the start of the mail application or at every predetermined time interval.

The data (227) includes, for each mail address, a plurality of appellations associated with the mail address and, concerning each of the plurality of appellations, a total number of people who transmitted mails to the mail address using the appellation (the first count) and the number of times or a frequency a sender (i.e., the user C) transmitted mails to the mail address using the appellation (the second count).

The electronic apparatus (101) selects, referring to the data (227), for example, three appellations in descending order of the first counts of a respective plurality of appellations, which are conversion candidates, (the number of appellations to be selected can be set to any number and the user C can set the number to, for example, three to five). Note that a conversion candidate having the high first count can be interpreted as an appellation used in more users. A conversion candidate having the low first count can be interpreted as a privately used appellation or a wrong appellation.

In step 223, the electronic apparatus (101) displays, in descending order of the first counts, conversion candidates Mr. Saitoh(斎藤さん) (the first count=20) (233-1), Saitoh-san(斎藤様) (the first count=10) (233-2), and Mr. Saito(斉藤さん) (the first count=8) (233-3) on a map (233). The map (233) can be displayed as, for example, a window associated with the destination (231) or a mail address input to the destination (231). The electronic apparatus (101) displays the respective conversion candidates (233-1, 233-2, and 233-3) on the map (233) to occupy wider regions in descending order of the first counts. The area on the map is allocated according to, for example, a ratio of the first counts of the respective conversion candidates (233-1, 233-2, and 233-3). Alternatively, the area on the map is allocated at ratios of, for example, 50% for the conversion candidate having the highest first count of the respective conversion candidates (233-1, 233-2, and 233-3), for example, 30% for the conversion candidate having the second highest first count, and, for example, 20% for the conversion candidate having the third highest first count.

Subsequently, the electronic apparatus (101) reads, referring to the data (227), the second counts of the respective selected conversion candidates (233-1, 233-2, and 233-3). The electronic apparatus (101) displays the regions on the map such that, for example, a hue is lighter, brightness is lower, or chroma is lower as the second count is lower. That is, the electronic apparatus (101) displays the conversion candidates on the map (233) in descending order of the second counts such that, for example, a hue is lighter, brightness is lower, or chroma is lower in the order of the conversion candidates Saitoh-san (the second count=200) (233-2), Mr.Saitoh (the second count=60) (233-1), and Mr.Saito (the second count=20) (233-3).

On the map (233), the electronic apparatus (101) displays a plurality of conversion candidates according to two ranks of the respective first and second counts. In the case of a conversion candidate having the high first count, since an area occupied on the map (233) is large, the user C can easily select the conversion candidate having the high first count. The user C can learn, from display areas of the respective conversion candidates, what kinds of conversion candidates users other than the user C often use. In the case of a conversion candidate having the high second count, since a hue displayed on the map (233) is thick, the user C can learn which conversion candidate the user C himself/herself frequently uses.

In step 224, the user C places a mouse cursor (234) on the conversion candidate Mr. (233-3) on the map (233). The electronic apparatus (101) displays, for example, with a popup window, information 'Since SAI_1(斉) is a typographical error of SAI_2(斉), please do not use SAI_1 (235) associated with the conversion candidate Mr.Saito (233-3) on which the mouse cursor (234) is placed and for supporting selection of the conversion candidate Mr.Saito (233-3) on which the mouse cursor (234) is placed.

In step 225, the user C selects the conversion candidate Saitoh-san (233-2) on the map (233) using the mouse cursor (236) (e.g., left click). In step 226, the electronic apparatus (101) inputs, according to the selection by the mouse cursor (236), the selected Saitoh-san in the text (232) on an application to which a mail address is input (i.e., a position different from the destination (231) to which the mail address is input) and decides the selected Saitoh-san. Therefore, the user C can select, according to the input or the selection of the mail address "Taro_Saitoh@jp.ibm.com", a conversion candidate, which the user C considers optimum, out of the appellations, which are the plurality of conversion candidates, on the graphically displayed map (233) and input the conversion candidate.

According to the conversion of the mail address "Taro_Saitoh@jp.ibm.com" into the appellation Saitoh-san, the electronic apparatus (101) can increment, by 1, the second count (=60) in a row in which a mail address is "Taro_Saitoh@jp.ibm.com" and an appellation is Saitoh-san in the data (227). The electronic apparatus (101) can notify the server computer (141) that the mail address "Taro_Saitoh@jp.ibm.com" has been converted into the appellation Saitoh-san. According to reception of the notification, the server computer (141) can increment, by 1, the second count (=200) in a row in which a mail address is "Taro_Saitoh@jp.ibm.com" and an appellation is Saitoh-san in data corresponding to the data (227).

In step 221, a user D is about to start a mail application and create a new mail on the electronic apparatus (101) (e.g., a phablet). The electronic apparatus (101) starts the mail application and displays a screen for new mail creation. The screen for new mail creation includes fields for inputting the destination (231), Cc., a subject, and the text (232).

In step 222, the user D inputs a mail address to the destination (231) or selects a mail address from an address book. It is assumed that the address input or selected by the user D is "Taro_Saitoh@jp.ibm.com". The electronic apparatus (101) displays the input or selected mail address "Taro_Saitoh@jp.ibm.com" in the destination (231).

The electronic apparatus (101) transmits, according to the input or the selection of the mail address "Taro_Saitoh@jp.ibm.com", the input or selected mail address "Taro_Saitoh@jp.ibm.com" to the server computer (141). According to reception of the mail address "Taro_Saitoh@jp.ibm.com" from the electronic apparatus (101), the server computer (141) refers to the data (227) including the mail address and a nickname or a name ("appellation") associated with the mail address. The data (227) is stored in, for example, a storage medium (e.g., the disk (148) shown in FIG. 1C) accessible by the server computer (141).

The data (227) includes, for each mail address, a plurality of appellations associated with the mail address and, concerning each of the plurality of appellations, a total number of people who transmitted mails to the mail address using the appellation (the first count) and the number of times or a frequency a sender (i.e., the user D) transmitted mails to the mail address using the appellation (the second count). Note that, when data is updated concerning the items of the data (227), the server computer (141) can update the data concerning the items, for example, on a real time basis or through batch processing.

The server computer (141) selects, referring to the data (227), for example, three appellations in descending order of the first counts of a respective plurality of appellations, which are conversion candidates, (the number of appellations to be selected can be set to any number and the user D can set the number to, for example, three to five). Note that a conversion candidate having the high first count can be interpreted as an appellation used in more users. A conversion candidate having the low first count can be interpreted as a privately used appellation or a wrong appellation. Therefore, the server computer (141) selects the conversion candidates Mr.Saitoh (the first count=20) (233-1), Saitoh-san (the first count=10) (233-2), and Mr.Saito (the first count=8) (233-3) in descending order of the first counts.

Subsequently, the server computer (141) reads, referring to the data (227), the second counts of the respective selected conversion candidates (233-1, 233-2, and 233-3). The server computer (141) transmits the three conversion candidates and the first counts and the second counts associated with the respective conversion candidates to the electronic apparatus (101). The server computer (141) can optionally transmit information for supporting selection associated with the respective conversion candidates to the electronic apparatus (101).

The electronic apparatus (101) receives the three conversion candidates and the first counts and the second counts associated with the respective conversion candidates and optionally the information for supporting selection associated with the respective conversion candidates transmitted from the server computer (141). The electronic apparatus (101) displays the received three conversion candidates on the map (233). The map (233) can be displayed as, for example, a window associated with the destination (231) or a mail address input to the destination (231). The electronic apparatus (101) displays the respective conversion candidates (233-1, 233-2, and 233-3) on the map (233) to occupy wider regions in descending order of the first counts. The area on the map is allocated according to, for example, a ratio of the first counts of the respective conversion candidates (233-1, 233-2, and 233-3). Alternatively, the area on the map is allocated at ratios of, for example, 50% for the conversion candidate having the highest first count of the respective conversion candidates (233-1, 233-2, and 233-3), for example, 30% for the conversion candidate having the second highest first count, and, for example, 20% for the conversion candidate having the third highest first count.

Subsequently, the electronic apparatus (101) displays the regions on the map such that, for example, a hue is lighter, brightness is lower, and chroma is lower as the second count is lower. That is, the electronic apparatus (101) displays the conversion candidates on the map (233) in descending order of the second counts such that, for example, a hue is lighter, brightness is lower, or chroma is lower in the order of the conversion candidates Saitoh-san (the second count=200) (233-2), Mr.Saitoh (the second count=60) (233-1), and Mr.Saito (the second count=20) (233-3).

On the map (233), the electronic apparatus (101) displays a plurality of conversion candidates according to two ranks of the respective first and second counts. In the case of a conversion candidate having the high first count, since an area occupied on the map (213) is large, the user D can easily select the conversion candidate having the high first count. The user D can learn, from display areas of the respective conversion candidates, what kinds of conversion candidates users other than the user D often use. In the case of a conversion candidate having the high second count, since a hue displayed on the map (233) is thick, the user D can learn which conversion candidate the user D himself/herself frequently uses.

In step 224, the user D places an operation finger (234) on the conversion candidate Mr.Saito (233-3) on the map (233). The electronic apparatus (101) displays, for example, with a popup window, information 'Since SAI_1 is a typographical error of SAI_2, please do not use SAI_1 (235) associated with the conversion candidate Mr.Saito (233-3) on which the operation finger (234) is placed and for supporting selection of the conversion candidate Mr.Saito (233-3) on which the operation finger (234) is placed.

In step 225, the user D selects the conversion candidate Saitoh-san (233-2) on the map (233) using the operation finger (236) (e.g., double touch). In step 226, the electronic apparatus (101) inputs, according to the selection by the operation finger (236), the selected Saitoh-san in the text (232) on an application to which a mail address is input (i.e., a position different from the destination (231) to which the mail address is input) and decides the selected Saitoh-san. Therefore, the user D can select, according to the input or the selection of the mail address "Taro_Saitoh@jp.ibm.com", a conversion candidate, which the user D considers optimum, out of the appellations, which are the plurality of conversion candidates, on the graphically displayed map (233) and input the conversion candidate.

The electronic apparatus (101) can notify the server computer (141) that the mail address "Taro_Saitoh@jp.ibm.com" has been converted into the appellation Saitoh-san. According to reception of the notification, the server computer (141) can increment, by 1, the second count (=200) in a row in which a mail address is "Taro_Saitoh@jp.ibm.com" and an appellation is Saitoh-san in the data (227).

Figure 3A:
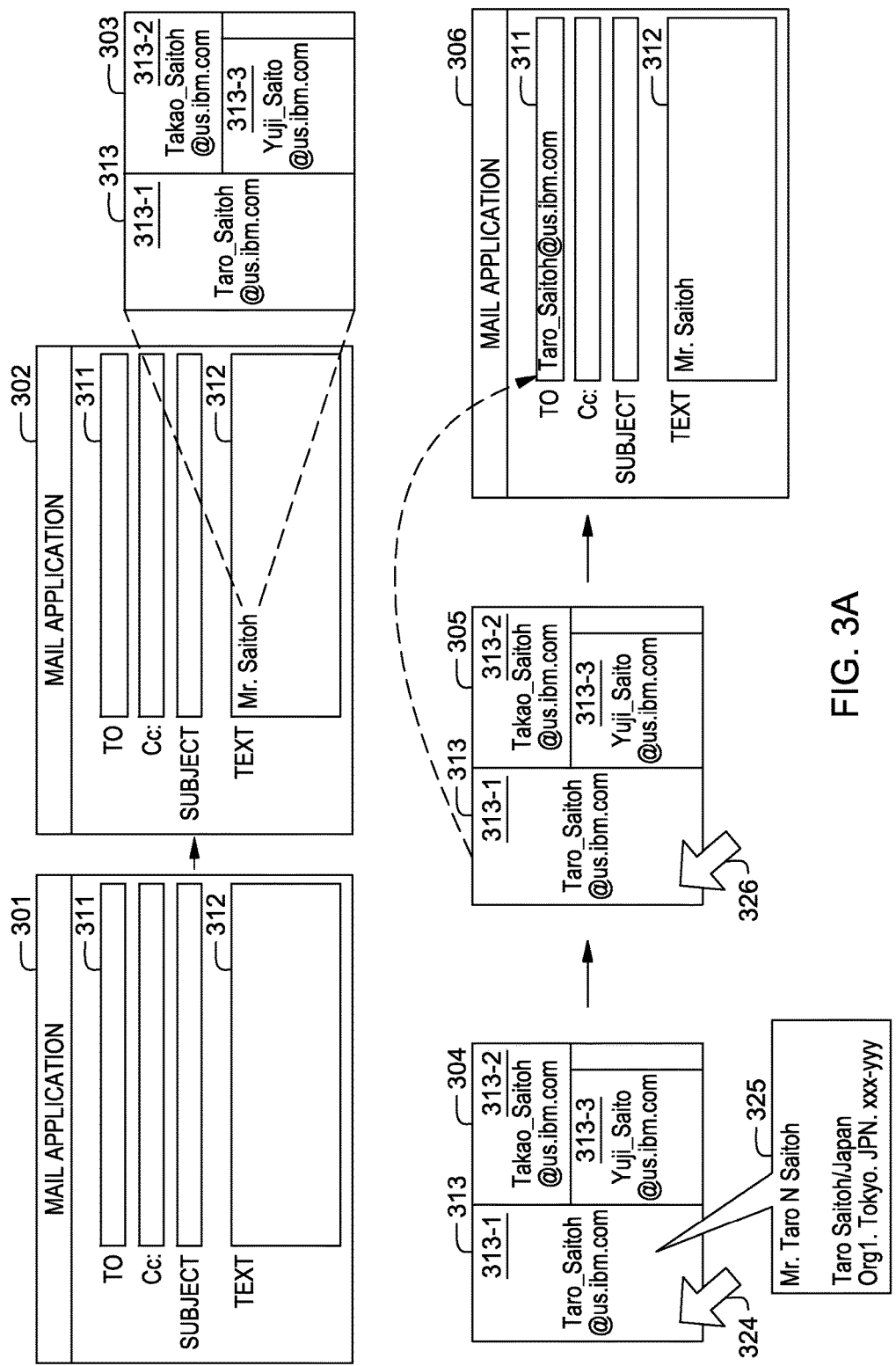
FIG. 3A is an illustration depicting a mode in which a plurality of conversion candidates (mail addresses in English) corresponding to an input character string (nickname or name) are displayed on a map and a selected conversion candidate on the map is input to a predetermined position in accordance with at least one embodiment of the present invention.
Figure 3B:
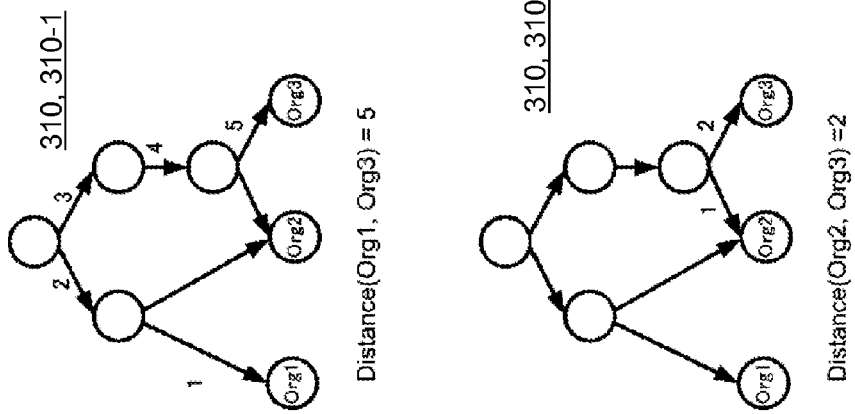
FIG. 3B is an illustration showing data usable for displaying the plurality of conversion candidates on the map in the mode shown in FIG. 3A.

FIG. 3A shows a mode in which a plurality of conversion candidates (mail addresses in English) corresponding to an input character string (nickname or name) are displayed on a map and a selected conversion candidate on the map is input to a predetermined position according to the embodiment of the present invention. FIG. 3B shows data usable for displaying the plurality of conversion candidates on the map in the mode shown in FIG. 3A.

In the following explanation, a mode in which the electronic apparatus (101) retrieves a plurality of conversion candidates (mail addresses) corresponding to an input character string (nickname or name in English) and a mode in which the server computer (141) retrieves the plurality of conversion candidates are respectively explained.

In step 301, a user E (who uses a mail address Hanako_Tanaka@us.ibm.com) belonging to an organization (Org3) is about to start a mail application and create a new mail on the electronic apparatus (101) (e.g., a notebook computer). The electronic apparatus (101) starts the mail application and displays a screen for new mail creation. The screen for new mail creation includes fields for inputting a destination (311), Cc., a subject, and a text (312).

In step 302, the user E inputs a nickname or a name ("appellation") to, for example, the head of the text (312). It is assumed that the appellation input by the user E is "Mr. Saitoh". The electronic apparatus (101) displays "Mr. Saitoh" in the text (312).

The electronic apparatus (101) refers to, according to the input of the appellation "Mr. Saitoh", data 1 (307) including an appellation and a mail address associated with the appellation. The data 1 (307) has been downloaded to the electronic apparatus (101) from a storage medium (e.g., a server computer accessible to the storage medium) having stored therein the data 1 (307), for example, during the start of the electronic apparatus (101) or during the start of the mail application or at every predetermined time interval.

The data 1 (307) includes, for each mail address, a plurality of appellations associated with the mail address and, concerning each of the plurality of appellations, a total number of people who transmitted mails to the mail address using the appellation (the first count) and the number of times or a frequency a sender (i.e., the user E) transmitted mails to the mail address using the appellation (the second count).

The electronic apparatus (101) extracts, referring to the data 1 (307), mail addresses (i.e., conversion candidates) in which the appellation "Mr. Saitoh" is used. That is, the electronic apparatus (101) extracts, from the data 1 (307), as conversion candidates, mail addresses "Taro_Saitoh@us.ibm.com" and "Takao_Saitoh@us.ibm.com" in which the appellation "Mr. Saitoh" is used. The electronic apparatus (101) can optionally extract, from the data 1 (307), as a conversion candidate, a mail address "Yuji_Saitoh@us.ibm.com" in which an appellation having pronunciation similar to the appellation "Mr. Saitoh" (e.g., "Mr. Saito" having a co-occurrence relation with the appellation "Mr. Saitoh") is used.

Subsequently, the electronic apparatus (101) optionally refers to data 2 (308) including a pair of a mail address of a receiver and a mail address of a sender (hereinafter referred to as receiver-sender pair as well) and the number of times of transmission or a frequency mails were transmitted from the sender to the receiver (hereinafter referred to as third count as well). The data 2 (308) has been downloaded to the electronic apparatus (101) from a storage medium (e.g., a server computer accessible to the storage medium) having stored therein the data 2 (308), for example, during the start of the electronic apparatus (101) or during the start of the mail application or at every predetermined time interval. Therefore, the electronic apparatus (101) optionally acquires, from the data 2 (308), the number of times of transmission or a frequency mails are transmitted from the mail address (Hanako_Tanaka@us.ibm.com) of the sender (the user E who is a mail creator) to the respective extracted mail addresses (i.e., mail addresses of reception destinations) "Taro_Saitoh@us.ibm.com" and "Takano_Saitoh@us.ibm.com" or optionally "Yuji_Saitoh@us.ibm.com" (the third count). That is, the electronic apparatus (101) acquires the number of times of transmission "2000" of a receiver-sender pair "(To) Taro_Saitoh@us.ibm.com; (From) Hanako_Tanaka@us.ibm.com", the number of times of transmission "30" of a receiver-sender pair "(To) Takao_Saitoh@us.ibm.com; (From) Hanako_Tanaka@us.ibm.com", and, optionally, the number of times of transmission "10" of a receiver-sender pair "(To) Yuji_Saito@us.ib.mcom"; (From) Hanako_Tanaka@us.ibm.com" (not shown on the data (308) in FIG. 3B).

Subsequently, the electronic apparatus (101) further optionally refers to data 3 (309) including a mail address of a reception destination, an organization to which a sender belongs, and the number of times of transmission and a frequency a person belonging to the organization to which the sender belongs transmitted mails to the mail address of the reception destination (hereinafter referred to as forth count as well). The data 3 (309) has been downloaded to the electronic apparatus (101) from a storage medium (e.g., a server computer accessible to the storage medium) having stored therein the data 3 (309), for example, during the start of the electronic apparatus (101) or during the start of the mail application or at every predetermined time interval.

The electronic apparatus (101) further optionally calculates data 4 (see 310) indicating a distance between the organization to which the sender of the mail belongs and the organization to which the user having the mail address of the reception destination belongs and acquires the distance from the server computer. For example, the distance is calculated using tree structures (310-1 and 310-2) shown in FIG. 3B.

The tree structure (310-1) indicates a calculation method for a distance between the organization (Org1) and the organization (Org3). The number of branches in the tree structure (310-1) from the organization (Org1) to the organization (Org3) is five. Therefore, the distance between the organization (Org1) and the organization (Org3) is five. Similarly, the tree structure (310-2) indicates a calculation method for a distance between the organization (Org2) and the organization (Org3). The number of branches in the tree structure (310-1) from the organization (Org2) to the organization (Org3) is two. Therefore, the distance between the organization (Org2) and the organization (Org3) is two. When organizations are the same, a distance between the organizations is one.

The electronic apparatus (101) can further optionally calculate, from the data 1 (307), the data 2 (308), the data 3 (309), and the data 4 (see 310), concerning each of the extracted mail addresses, a conversion candidate ranking L (hereinafter referred to as fifth count as well) according to Expression 1 below (for calculating a conversion candidate ranking L1) or Expression 2 (for calculating a conversion candidate ranking L2) or acquire the candidate ranking L1 or L2 calculated according to Expression 1 below or Expression 2 below from the server computer.

(Expression 1) L1 (Sender, Candidate)=(A×count (Sender, Candidate)+B×count (Candidate, FromOrg)/Distance (SenderOrg, CandidateOrg); Where L1 (Sender, Candidate): L1 (sender, mail address (i.e., receiver mail address), which is a conversion candidate)); A×count (Sender, Candidate): A×third count(the number of times or a frequency of transmission from the sender to the receiver); B×count(Candidate, FromOrg): B×fourth count (the number of times of transmission or a frequency a person belonging to the organization to which the sender belongs transmits mails to the mail address of the reception destination); and Distance (SenderOrg, CandidateOrg): the distance between the organization to which the sender belongs and the organization to which the receiver belongs, and the distance is uniquely determined if the sender and the receiver are determined. A and B are respectively any numerical values equal to or larger than 0 and are numbers (weights) optionally determined on the basis of a value of which parameter is considered important.

In Expression 1, when A=1 and B=1, the candidate rankings L1 (the fifth counts) of the respective extracted mail addresses "Taro_Saitoh@us.ibm.com" (belonging to Org1) and "Takao_Saitoh@us.ibm.com" (belonging to Org2) are as described below: L1 (Hanako_Tanaka@us.ibm.com, Taro_Saitoh@us.ibm.com)=0×20+(1×2000+1×4500)/5 (Distance(Org1, Org3)=1300; and L1 (Hanako_Tanaka@us.ibm.com, Takao_Saitoh@us.ibm.com)=0×6+(1×30+1×2094)/2 (Distance(Org2, Org3)=1062.

Therefore, concerning the fifth count, the mail address "Taro_Saitoh@us.ibm.com", which is the conversion candidate, has a larger value than the mail address "Takao_Saitoh@us.ibm.com", which is the conversion candidate.

(Expression 2) L2 (Sender, Candidate)=α+β×count (Sender, Candidate)+γ×count(SenderOrg, CandidateOrg); Where L2 (Sender, Candidate): L2 (sender, mail address (i.e., receiver mail address), which is the conversion candidate) α: A×first count; β: B/Distance (SenderOrg, CandidateOrg); γ: C/Distance (SenderOrg, CandidateOrg); and Distance (SenderOrg, CandidateOrg): a distance between the organization to which the sender belongs and an organization to which the receiver belongs, and the distance is uniquely determined if the sender and the receiver are determined. A and B are respectively any numerical values equal to or larger than 0 and are numbers (weights) optionally determined according to which parameter is considered important.

In Expression 2, when A=0, B=1, and C=1, the candidate rankings L2 (the fifth counts) of the respective extracted mail addresses "Taro_Saitoh@us.ibm.com" (belonging to Org1) and "Takao_Saitoh@us.ibm.com" (belonging to Org2) are as described below: L2 (Hanako_Tanaka@ us.ibm.com, Taro_Saitoh@us.ibm.com), (1×2000)×(⅕)±(1+4500)×(⅕)=1300; and L2 (Hanako_Tanaka @us.ibm.com, Takao_Saitoh@us.ibm.com)=(1×30)×(½)±(1+2094)×(½)=1062.

Therefore, concerning the fifth count, the mail address "Taro_Saitoh@us.ibm.com", which is the conversion candidate, has a larger value than the mail address "Takao_Saitoh@us.ibm.com", which is the conversion candidate.

In Expression 2, the coefficients A, B, and C are numbers (weights) that can be optionally determined according to a value of which parameter of data (307), data (308), and data (309) is considered important. In Expression 2, in the case of A=1, B=0, and C=0, Expression 2 is the same as Expression 1.

The fifth count is the mail addresses "Taro_Saitoh@us.ibm.com", "Takao_Saitoh@us.ibm.com", and "Yuji_Saito@us.ibm.com" in descending order of values of the fifth count.

The electronic apparatus (101) selects, for example, three conversion candidates in descending order of the fifth counts of the respective plurality of mail addresses, which are conversion candidates (the number of conversion candidates to be selected can be set to any number, and the user E can set the number to, for example, three to five). Note that, in closeness of the organizations to which the receiver and the sender belong, a conversion candidate having the high fifth count can be interpreted as a mail address used in more users in the organization to which the sender belongs. A conversion candidate having the low fifth count can be interpreted as a mail address not so often used by users in the organization to which the sender belongs because the organizations to which the receiver and the sender belong are apart from each other.

In step 303, the electronic apparatus (101) displays the selected conversion candidates "Taro_Saitoh@us.ibm.com" (313-1), "Takao_Saitoh@us.ibm.com" (313-2), and "Yuji_Saito@us.ibm.com" (313-3) on a map (313). For example, the map (313) can be displayed as a window associated with the text (312) or the appellation "Mr. Saitoh" input to the text (312). The electronic apparatus (101) displays the respective conversion candidates (313-1, 313-2, and 313-3) on the map (313) to occupy wider regions in descending order of the fifth counts. The area on the map is allocated at ratios of, for example, 50% for the conversion candidate having the highest fifth count of the respective conversion candidates (313-1, 313-2, and 313-3), for example, 30% for the conversion candidate having the second highest fifth count, and, for example, 20% for the conversion candidate having the third highest fifth count. Alternatively, the area on the map is allocated according to a ratio of the fifth counts of the respective conversion candidates (313-1, 313-2, and 313-3).

Subsequently, the electronic apparatus (101) reads, referring to the data 1 (307), the second counts of the respective selected conversion candidates (313-1, 313-2, and 313-3). The electronic apparatus (101) displays the regions on the map such that, for example, a hue is lighter, brightness is lower, or chroma is lower as the second count is lower. That is, the electronic apparatus (101) displays the conversion candidates on the map (313) in descending order of the second counts such that, for example, a hue is lighter, brightness is lower, or chroma is lower in the order of the conversion candidates "Takao_Saitoh@us.ibm.com" (313-2) (the second count=60) (313-2), "Taro_Saitoh@us.ibm.com" (the second count=30) (313-1), and "Yuji_Saito@us.ibm.com" (the second count=5) (313-3).

The electronic apparatus (101) displays, on the map (313), a plurality of conversion candidates according to two ranks of the fifth count and the second count. In the case of a conversion candidate having the high fifth count, since an area occupied on the map (313) is large, the user E can easily select the conversion candidate having the high fifth count. The user E can learn, from display areas of the respective conversion candidates, in closeness of the organizations to which the receiver and the sender belong, whether the conversion candidate is used in more users in the organization to which the sender belongs. In the case of a conversion candidate having the high second count, since a hue displayed on the map (313) is thick, the user E can learn which conversion candidate the user E himself/herself frequently uses.

In step 304, the user E places a mouse cursor (324) on the conversion candidate "Taro_Saitoh@us.ibm.com" (313-1) on the map (313). The electronic apparatus (101) displays, for example, with a popup window, information "Mr. Taro N Saitoh Taro_Saitoh/Japan Org1, Tokyo, JPN, xxx-yyy" (N is a middle name and indicates an organization to which Mr. Taro N Saitoh belongs) (325) associated with the conversion candidate "Taro_Saito@us.ibm.com" (313-1) on which the mouse cursor (324) is placed and for supporting selection of the conversion candidate "Taro_Saitoh@us.ibm.com" (313-1) on which the mouse cursor (324) is placed.

In step 305, the user E selects the conversion candidate "Taro_Saitoh@us.ibm.com" (313-1) on the map (313) using a mouse cursor (326) (e.g., left click). In step 306, the electronic apparatus (101) inputs, according to the selection by the mouse cursor (326), the selected "Taro_Saitoh@us.ibm.com" to the destination (311) on an application to which a mail address is input (i.e., a position different from the text (312) to which the appellation is input) and decides the selected "Taro_Saitoh@us.ibm.com". Therefore, the user E can select, according to the input of the appellation "Mr. Saitoh", a conversion candidate, which the user E considers optimum, out of the appellations, which are the plurality of conversion candidates, on the graphically displayed map (313) and input the conversion candidate.

According to the conversion of the appellation "Mr. Saitoh" into the mail address "Taro_Saitoh@us.ibm.com", the electronic apparatus (101) can increment, by 1, the second count (=30) in a row in which a mail address is "Taro_Saitoh@us.ibm.com" and an appellation is "Mr. Saitoh" in the data (207). The electronic apparatus (101) can notify the server computer (141) that the mail address "Taro_Saitoh@us.ibm.com" has been converted into the appellation "Mr. Saitoh". According to reception of the notification, the server computer (141) can increment, by 1, the second count (=30) in a row in which a mail address is "Taro_Saitoh@us.ibm.com" and an appellation is "Mr. Saitoh" in data corresponding to the data (207).

In step 301, a user F (who uses the mail address Hanako_Tanaka@us.ibm.com) belonging to the organization (Org3) is about to start a mail application and create a new mail on the electronic apparatus (101) (e.g., an electronic book reader). The electronic apparatus (101) starts the mail application and displays a screen for new mail creation. The screen for new mail creation includes fields for inputting the destination (311), Cc., a subject, and the text (312).

In step 302, the user F inputs a nickname or a name ("appellation") to, for example, the head of the text (312). It is assumed that the appellation input by the user F is "Mr. Saitoh". The electronic apparatus (101) displays "Mr. Saitoh" in the text (312).

The electronic apparatus (101) transmits, according to the input of the appellation "Mr. Saitoh", the input appellation "Mr. Saitoh" to the server computer (141).

According to reception of the appellation "Mr. Saitoh" from the electronic apparatus (101), the server computer (141) refers to the data 1 (307) including an appellation and a mail address associated with the appellation. The data 1 (307) is stored in, for example, a storage medium (e.g., the disk (148) shown in FIG. 1C) accessible by the server computer (141).

The data 1 (307) includes, for each mail address, a plurality of appellations associated with the mail address and, concerning each of the plurality of appellations, a total number of people who transmitted mails to the mail address using the appellation (the first count) and the number of times or a frequency a sender (i.e., the user F) transmitted mails to the mail address using the appellation (the second count). Note that, when data is updated concerning the items of the data 1 (307), the server computer (141) can update the data concerning the items, for example, on a real time basis or through batch processing.

The server computer (141) extracts mail addresses (i.e., conversion candidates) in which the appellation "Mr. Saitoh" is used. That is, the server computer (141) extracts, from the data 1 (307), as conversion candidates, mail addresses "Taro_Saitoh@us.ibm.com" and "Takao_Saitoh@us.ibm.com" in which the appellation "Mr. Saitoh" is used. The server computer (141) can optionally extract, from the data 1 (307), as a conversion candidate, the mail address "Yuji_Saitoh@us.ibm.com" in which an appellation having pronunciation similar to the appellation "Mr. Saitoh" (e.g., "Mr. Saito" having a co-occurrence relation with the appellation "Mr. Saitoh") is used.

Subsequently, the server computer (141) optionally refers to the data 2 (308) including a pair of a mail address of a receiver and a mail address of a sender (a receiver-sender pair) and the number of times of transmission or a frequency mails were transmitted from the sender to the receiver (the third count). Note that, when data is updated concerning the items of the data 2 (308), the server computer (141) can update the data concerning the items, for example, on a real time basis or through batch processing.

The server computer (141) optionally acquires, from the data 2 (308), the number of times of transmission or a frequency mails are transmitted from the mail address (Hanako_Tanaka@us.ibm.com) of the sender (the user F who is a mail creator) to the respective extracted mail addresses (i.e., mail addresses of reception destinations) "Taro_Saitoh@us.ibm.com" and "Takano_Saitoh@us.ibm.com" or optionally "Yuji_Saitoh@us.ibm.com" (the third count). That is, the server computer (141) acquires the number of times of transmission "2000" of a receiver-sender pair "(To) Taro_Saitoh@us.ibm.com; (From) Hanako_Tanaka@us.ibm.com", the number of times of transmission "30" of a receiver-sender pair "(To) Takao_Saitoh@us.ibm.com; (From) Hanako_Tanaka@us.ibm.com", and, optionally, the number of times of transmission "10" of a receiver-sender pair "(To) Yuji_Saito@us.ib.mcom"; (From) Hanako_Tanaka@us.ibm.com" (not shown on the data (308) in FIG. 3B).

Subsequently, the server computer (141) further optionally refers to the data 3 (309) including a mail address of a reception destination, an organization to which a sender belongs, and the number of times of transmission and a frequency a person belonging to the organization to which the sender belongs transmitted mails to the mail address of the reception destination (the forth count). Note that, when data is updated concerning the items of the data 3 (309), the server computer (141) can update the data concerning the items, for example, on a real time basis or through batch processing.

The server computer (141) further optionally calculates the data 4 (see 310) indicating a distance between the organization to which the sender of the mail belongs and the organization to which the user having the mail address of the reception destination belongs. For example, the distance is calculated using the tree structures (310-1 and 310-2) shown in FIG. 3B. The tree structure (310-1) and the tree structure (310-2) are as explained above.

The server computer (141) can further optionally calculate, from the data 1 (307), the data 2 (308), the data 3 (309), and the data 4 (see 310), concerning each of the extracted mail addresses, the candidate ranking L (the fifth count) according to the above Expression 1 and Expression 2. The fifth count is the mail addresses "Taro_Saitoh@us.ibm.com", "Takao_Saitoh@us.ibm.com", and "Yuji_Saito@us.ibm.com", which are the conversion candidates, in descending order of values of the fifth count.

The server computer (141) selects, according to the calculated fifth counts, for example, three conversion candidates in descending order of the fifth counts of the respective conversion candidates, which are conversion candidates (the number of conversion candidates to be selected can be set to any number, and the user F can set the number to, for example, three to five). Note that, in closeness of the organizations to which the receiver and the sender belong, a conversion candidate having the high fifth count can be interpreted as a mail address used in more users in the organization to which the sender belongs. A conversion candidate having the low fifth count can be interpreted as a mail address not so often used by users in the organization to which the sender belongs because the organizations to which the receiver and the sender belong are apart from each other. Therefore, the server computer (141) selects "Taro_Saitoh@us.ibm.com" (313-1), "Takao_Saitoh@us.ibm.com" (313-2), and "Yuji_Saito@us.ibm.com" (313-3) in descending order of the fifth counts. Subsequently, the server computer (141) reads, referring to the data 1 (307), the second counts of the respective selected conversion candidates (313-1, 313-2, and 313-3).

The server computer (141) transmits the three conversion candidates and the fifth counts and the second counts associated with the respective conversion candidates to the electronic apparatus (101). The server computer (141) can optionally transmit information for supporting selection associated with the respective conversion candidates to the electronic apparatus (101). The electronic apparatus (101) receives the three conversion candidates and the fifth counts and the second counts associated with the respective conversion candidates and optionally the information for supporting selection associated with the respective conversion candidates transmitted from the server computer (141).

In step 303, the electronic apparatus (101) displays the selected conversion candidates "Taro_Saitoh@us.ibm.com" (313-1), "Takao_Saitoh@us.ibm.com" (313-2), and "Yuji_Saito@us.ibm.com" (313-3) on the map (313). For example, the map (313) can be displayed as a window associated with the text (312) or the appellation "Mr. Saitoh" input to the text (312). The electronic apparatus (101) displays the respective conversion candidates (313-1, 313-2, and 313-3) on the map (313) to occupy wider regions in descending order of the fifth counts. The area on the map is allocated at ratios of, for example, 50% for the conversion candidate having the highest fifth count of the respective conversion candidates (313-1, 313-2, and 313-3), for example, 30% for the conversion candidate having the second highest fifth count, and, for example, 20% for the conversion candidate having the third highest fifth count. Alternatively, the area on the map is allocated according to a ratio of the fifth counts of the respective conversion candidates (313-1, 313-2, and 313-3).

Subsequently, the electronic apparatus (101) displays the regions on the map such that, for example, a hue is lighter, brightness is lower, or chroma is lower as the second count is lower. That is, the electronic apparatus (101) displays the conversion candidates on the map (313) in descending order of the second counts such that, for example, a hue is lighter, brightness is lower, or chroma is lower in the order of the conversion candidates "Takao_Saitoh@us.ibm.com" (313-2) (the second count=60) (313-2), "Taro_Saitoh@us.ibm.com" (the second count=30) (313-1), and "Yuji_Saito@us.ibm.com" (the second count=5) (313-3).

The electronic apparatus (101) displays, on the map (313), a plurality of conversion candidates according to two ranks of the fifth count and the second count. In the case of a conversion candidate having the high fifth count, since an area occupied on the map (313) is large, the user F can easily select the conversion candidate having the high fifth count. The user F can learn, from display areas of the respective conversion candidates, in closeness of the organizations to which the receiver and the sender belong, whether the conversion candidate is used in more users in the organization to which the sender belongs. In the case of a conversion candidate having the high second count, since a hue displayed on the map (313) is thick, the user F can learn which conversion candidate the user F himself/herself frequently uses.

In step 304, the user F places an operation finger (324) on the conversion candidate "Taro_Saitoh@us.ibm.com" (313-1) on the map (313). The electronic apparatus (101) displays, for example, with a popup window, information "Mr. Taro N Saitoh Taro_Saitoh/Japan Org1, Tokyo, JPN, xxx-yyy" (N is a middle name and indicates an organization to which Mr. Taro N Saitoh belongs) (325) associated with the conversion candidate "Taro_Saito@us.ibm.com" (313-1) on which the operation finger (324) is placed and for supporting selection of the conversion candidate "Taro_Saitoh@us.ibm.com" (313-1) on which the operation finger (324) is placed.

In step 305, the user F selects the conversion candidate "Taro_Saitoh@us.ibm.com" (313-2) on the map (313) using an operation finger (326) (e.g., double touch). In step 306, the electronic apparatus (101) inputs, according to the selection by the operation finger (326), the selected "Taro_Saitoh@us.ibm.com" to the destination (311) on an application to which a mail address is input (i.e., a position different from the text (312) to which the appellation is input) and decides the selected "Taro_Saitoh@us.ibm.com". Therefore, the user F can select, according to the input of the appellation "Mr. Saitoh", a conversion candidate, which the user F considers optimum, out of the mail addresses, which are the plurality of conversion candidates, on the graphically displayed map (313) and input the conversion candidate.

The electronic apparatus (101) can notify the server computer (141) that the appellation "Mr. Saitoh" has been converted into the mail address "Taro_Saitoh@us.ibm.com". According to reception of the notification, the server computer (141) can increment, by 1, the second count (=30) in a row in which an appellation is "Mr. Saitoh" and a mail address is "Taro_Saitoh@us.ibm.com" in the data 1 (307).

Figure 3C:
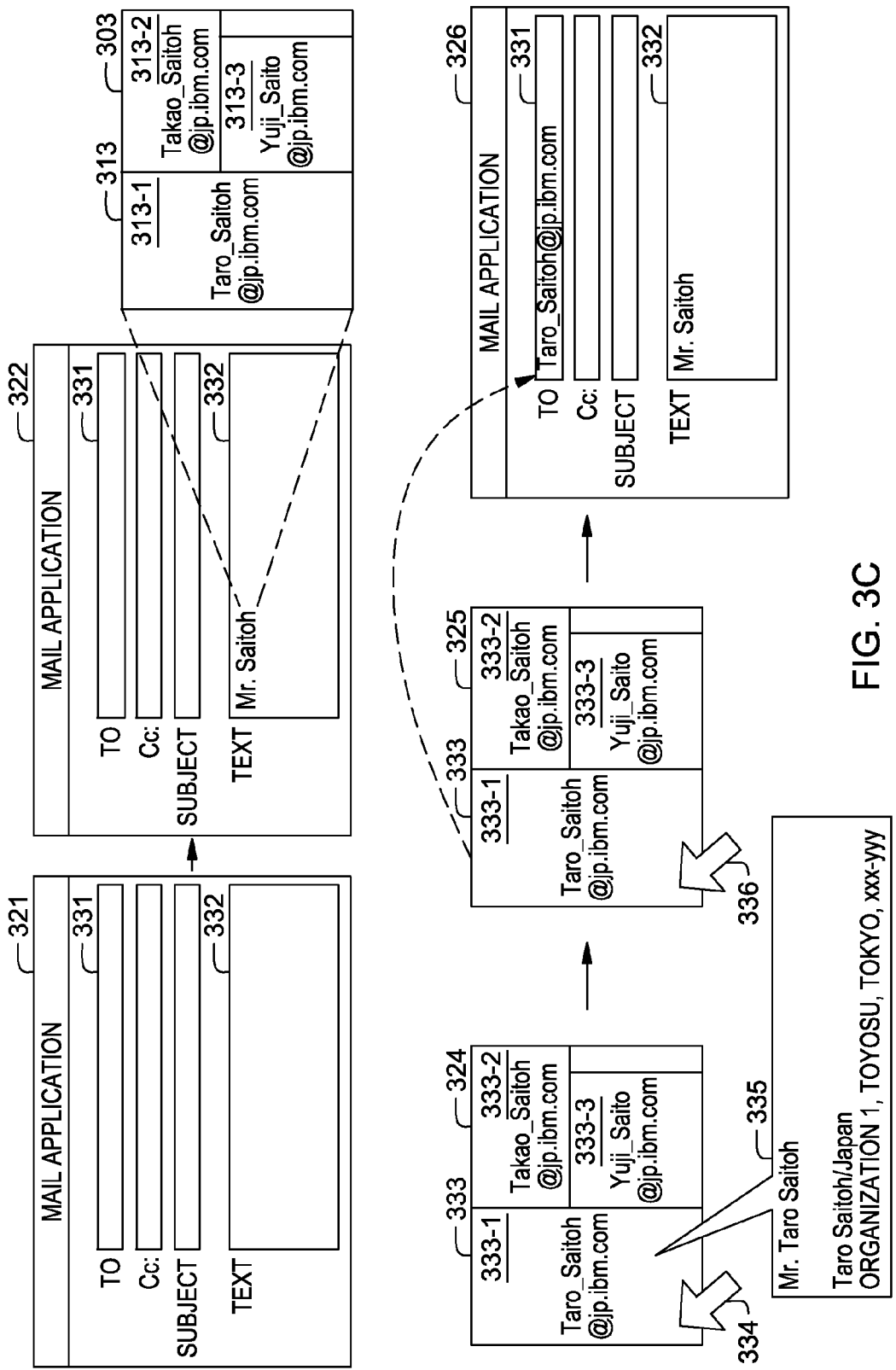
FIG. 3C is an illustration showing a mode in which a plurality of conversion candidates (mail addresses in Japanese) corresponding to an input character string (nickname or name) are displayed on a map and a selected conversion candidate on the map is input to a predetermined position in accordance with at least one embodiment of the present invention.
Figure 3D:
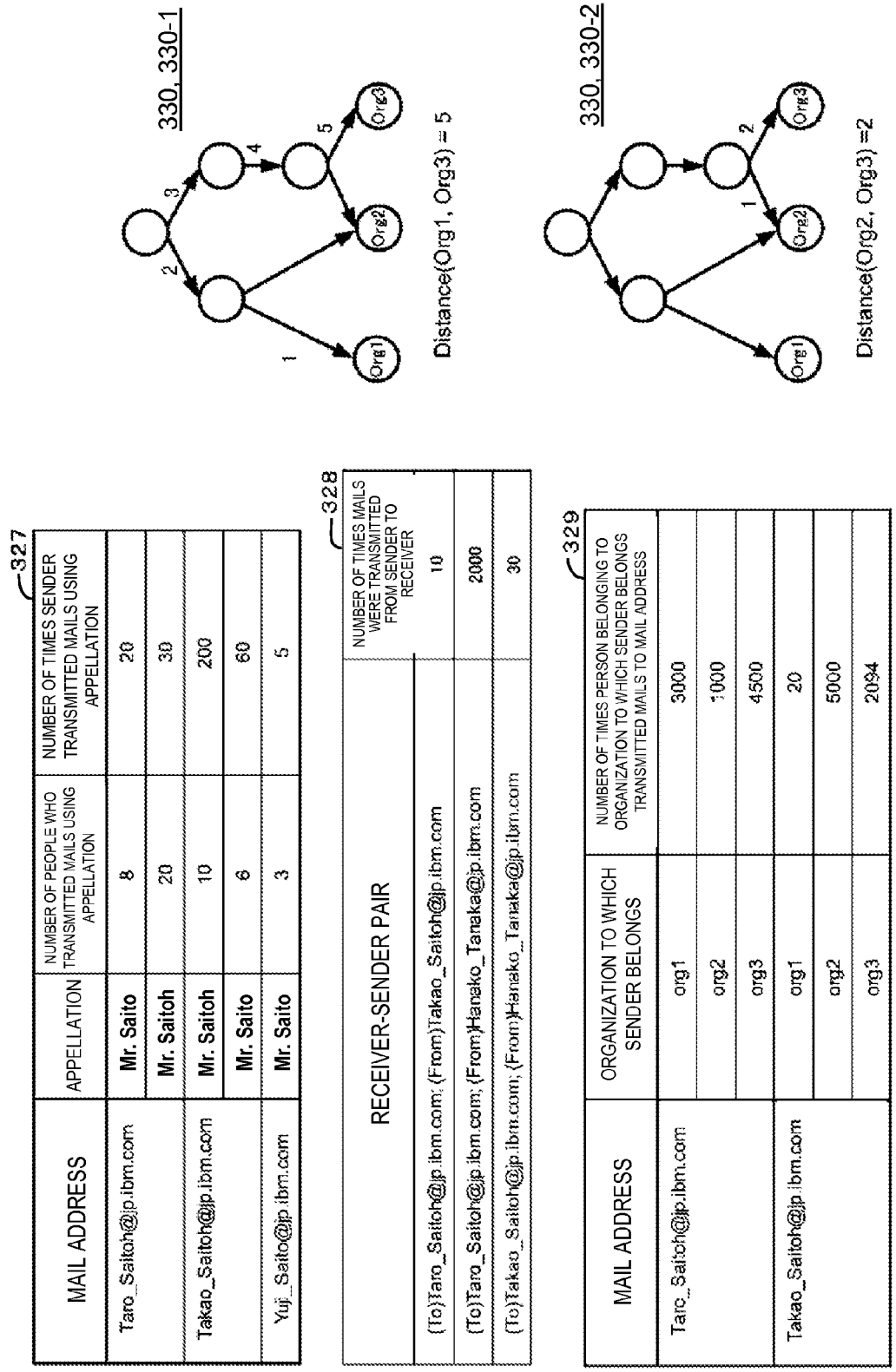
FIG. 3D is an illustration showing data usable for displaying the plurality of conversion candidates on the map in the mode shown in FIG. 3C.

FIG. 3C shows a mode in which a plurality of conversion candidates (mail addresses in Japanese) corresponding to an input character string (nickname or name) are displayed on a map and a selected conversion candidate on the map is input to a predetermined position according to the embodiment of the present invention. FIG. 3D shows data usable for displaying the plurality of conversion candidates on the map in the mode shown in FIG. 3C.

In the following explanation, a mode in which the electronic apparatus (101) retrieves a plurality of conversion candidates (mail addresses) corresponding to an input character string (nickname or name in Japanese) and a mode in which the server computer (141) retrieves the plurality of conversion candidates are respectively explained.

In step 321, a user G (who uses the mail address Hanako_Tanaka@jp.ibm.com) belonging to the organization (Org3) is about to start a mail application and create a new mail on the electronic apparatus (101) (e.g., a notebook computer). The electronic apparatus (101) starts the mail application and displays a screen for new mail creation. The screen for new mail creation includes fields for inputting a destination (331), Cc., a subject, and a text (332).

In step 322, the user G inputs a nickname or a name ("appellation") to, for example, the head of the text (332). It is assumed that the appellation input by the user G is Mr.Saitoh. The electronic apparatus (101) displays Mr.Saitoh in the text (332). The electronic apparatus (101) refers to, according to the input of the appellation Mr.Saitoh, data 1 (327) including an appellation and a mail address associated with the appellation. The data 1 (327) has been downloaded to the electronic apparatus (101) from a storage medium (e.g., a server computer accessible to the storage medium) having stored therein the data 1 (327), for example, during the start of the electronic apparatus (101) or during the start of the mail application or at every predetermined time interval.

The data 1 (327) includes, for each mail address, a plurality of appellations associated with the mail address and, concerning each of the plurality of appellations, a total number of people who transmitted mails to the mail address using the appellation (the first count) and the number of times or a frequency a sender (i.e., the user G) transmitted mails to the mail address using the appellation (the second count).

The electronic apparatus (101) extracts, referring to the data 1 (327), mail addresses (i.e., conversion candidates) in which the appellation Mr.Saitoh is used. That is, the electronic apparatus (101) extracts, from the data 1 (327), as conversion candidates, the mail addresses "Taro_Saitoh@jp.ibm.com" and "Takao_Saitoh@jp.ibm.com" in which the appellation Mr.Saitoh is used. The electronic apparatus (101) can optionally extract, from the data 1 (327), as a conversion candidate, a mail address "Yuji_Saitoh@jp.ibm.com" in which the appellation Mr.Saito homophonic with the appellation Mr.Saitoh is used.

Subsequently, the electronic apparatus (101) optionally refers to data 2 (328) including a pair of a mail address of a receiver and a mail address of a sender (a receiver-sender pair) and the number of times or a frequency mails were transmitted from the sender to the receiver (the third count). The data 2 (328) has been downloaded to the electronic apparatus (101) from a storage medium (e.g., a server computer accessible to the storage medium) having stored therein the data 2 (328), for example, during the start of the electronic apparatus (101) or during the start of the mail application or at every predetermined time interval. Therefore, the electronic apparatus (101) optionally acquires, from the data 2 (328), the number of times or a frequency mails were transmitted from a sender (the user G who is a mail creator) (Hanako_Tanaka@jp.ibm.com) to the extracted mail addresses (i.e., mail addresses of reception destinations) "Taro_Saitoh@jp.ibm.com" and "Takano_Saitoh@jp.ibm.com" or optionally "Yuji_Saitoh@jp.ibm.com" (the third count). That is, the electronic apparatus (101) acquires the number of times of transmission "2000" of a receiver-sender pair "(To) Taro_Saitoh@jp.ibm.com; (From) Hanako_Tanaka@jp.ibm.com", the number of times of transmission "30" of a receiver-sender pair "(To) Takao_Saitoh@jp.ibm.com; (From) Hanako_Tanaka@jp.ibm.com", and, optionally, the number of times of transmission "10" of a receiver-sender pair "(To) Yuji_Saito@jp.ib.mcom"; (From) Hanako_Tanaka@jp.ibm.com" (not shown on the data (328) in FIG. 3D).

Subsequently, the electronic apparatus (101) further optionally refers to data 3 (329) including a mail address of a reception destination, an organization to which a sender belongs, and the number of times of transmission and a frequency a person belonging to the organization to which the sender belongs transmitted mails to the mail address of the reception destination (the forth count). The data 3 (329) has been downloaded to the electronic apparatus (101) from a storage medium (e.g., a server computer accessible to the storage medium) having stored therein the data 2 (328), for example, during the start of the electronic apparatus (101) or during the start of the mail application or at every predetermined time interval.

The electronic apparatus (101) further optionally calculates data 4 (330) indicating a distance between the organization to which the sender of the mail belongs and the organization to which the user having the mail address of the reception destination belongs and acquires the distance from the server computer. For example, the distance is calculated using tree structures (330-1 and 330-2) shown in FIG. 3D.

The tree structure (330-1) indicates a calculation method for a distance between the organization (Org1) and the organization (Org3). The number of branches in the tree structure (330-1) from the organization (Org1) to the organization (Org3) is five. Therefore, the distance between the organization (Org1) and the organization (Org3) is five. Similarly, the tree structure (330-2) indicates a calculation method for a distance between the organization (Org2) and the organization (Org3). The number of branches in the tree structure (330-2) from the organization (Org2) to the organization (Org3) is two. Therefore, the distance between the organization (Org2) and the organization (Org3) is two. When organizations are the same, a distance between the organizations is one.

The electronic apparatus (101) can further optionally calculate, from the data 1 (327), the data 2 (328), the data 3 (329), and the data 4 (see 330), concerning each of the extracted mail addresses, the candidate ranking L (the fifth count) according to the above Expression 1 or Expression 2 or acquire the candidate ranking L1 or L2 calculated according to each of the above Expression 1 and Expression 2 from the server computer.

In the above Expression 1, when A=1 and B=1, the candidate rankings L1 (the fifth counts) of the respective extracted mail addresses "Taro_Saitoh@jp.ibm.com" (belonging to Org1) and "Takao_Saitoh@jp.ibm.com" (belonging to Org2) are as described below: L1 (Hanako_Tanaka@jp.ibm.com, Taro_Saitoh@jp.ibm.com)= $(1\times2000+1\times4500)/5$ (Distance(Org1, Org3)=1300; and L1 (Hanako_Tanaka@jp.ibm.com, Takao_Saitoh@jp.ibm.com), $(1\times30+1\times2094)/2$ (Distance (Org2, Org3)=1062.

Therefore, concerning the fifth count, the mail address "Taro_Saitoh@jp.ibm.com", which is the conversion candidate, has a larger value than the mail address "Takao_Saitoh@jp.ibm.com", which is the conversion candidate.

In the above Expression 2, when A=0, B=1, and C=1, the candidate rankings L2 (the fifth counts) of the respective extracted mail addresses "Taro_Saitoh@jp.ibm.com" (belonging to Org1) and "Takao_Saitoh@jp.ibm.com" (belonging to Org2) are as described below: L2 (Hanako_Tanaka@jp.ibm.com, Taro_Saitoh@jp.ibm.com)= $(1\times2000)\times(\frac{1}{5})+(1+4500)\times(\frac{1}{5})=1300$; and L2 (Hanako_Tanaka@jp.ibm.com, Takao_Saitoh@jp.ibm.com)=$(1\times30)\times(\frac{1}{2})\pm(1+2094)\times(\frac{1}{2})=1062$.

Therefore, concerning the fifth count, the mail address "Taro_Saitoh@jp.ibm.com", which is the conversion candidate, has a larger value than the mail address "Takao_Saitoh@jp.ibm.com", which is the conversion candidate. The fifth count is the mail addresses "Taro_Saitoh@jp.ibm.com", "Takao_Saitoh@jp.ibm.com", and "Yuji_Saito@jp.ibm.com", which are the conversion candidates, in descending order of values of the fifth count.

The electronic apparatus (101) selects, for example, three conversion candidates in descending order of the fifth counts of the respective conversion candidates, which are conversion candidates (the number of conversion candidates to be selected can be set to any number, and the user G can set the number to, for example, three to five). Note that, in closeness of the organizations to which the receiver and the sender belong, a conversion candidate having the high fifth count can be interpreted as a mail address used in more users in the organization to which the sender belongs. A conversion candidate having the low fifth count can be interpreted as a mail address not so often used by users in the organization to which the sender belongs because the organizations to which the receiver and the sender belong are apart from each other.

In step 323, the electronic apparatus (101) displays the selected conversion candidates "Taro_Saitoh@jp.ibm.com" (333-1), "Takao_Saitoh@jp.ibm.com" (333-2), and "Yuji_Saito@jp.ibm.com" (333-3) on a map (333). For example, the map (333) can be displayed as a window associated with the text (332) or the appellation Mr. Saitoh input to the text (332). The electronic apparatus (101) displays the respective conversion candidates (333-1, 333-2, and 333-3) on the map (333) to occupy wider regions in descending order of the fifth counts. The area on the map is allocated at ratios of, for example, 50% for the conversion candidate having the highest fifth count of the respective conversion candidates (333-1, 333-2, and 333-3), for example, 30% for the conversion candidate having the second highest fifth count, and, for example, 20% for the conversion candidate having the third highest fifth count. Alternatively, the area on the map is allocated according to a ratio of the fifth counts of the respective conversion candidates (333-1, 333-2, and 333-3).

Subsequently, the electronic apparatus (101) reads, referring to the data 1 (327), the second counts of the respective selected conversion candidates (333-1, 333-2, and 333-3). The electronic apparatus (101) displays the regions on the map such that, for example, a hue is lighter, brightness is lower, or chroma is lower as the second count is lower. That is, the electronic apparatus (101) displays the conversion candidates on the map (333) in descending order of the second counts such that, for example, a hue is lighter, brightness is lower, or chroma is lower in the order of the conversion candidates "Takao_Saitoh@jp.ibm.com" (333-2) (the second count=60) (333-2), "Taro_Saitoh@jp.ibm.com" (the second count=30) (333-1), and "Yuji_Saito@jp.ibm.com" (the second count=5) (333-3).

The electronic apparatus (101) displays, on the map (333), a plurality of conversion candidates according to two ranks of the fifth count and the second count. In the case of a conversion candidate having the high fifth count, since an area occupied on the map (333) is large, the user G can easily select the conversion candidate having the high fifth count. The user G can learn, from display areas of the respective conversion candidates, in closeness of the organizations to which the receiver and the sender belong, whether the conversion candidate is used in more users in the organization to which the sender belongs. In the case of a conversion candidate having the high second count, since a hue displayed on the map (333) is thick, the user G can learn which conversion candidate the user G himself/herself frequently uses.

In step 324, the user G places a mouse cursor (334) on the conversion candidate "Taro_Saitoh@jp.ibm.com" (333-1) on the map (333). The electronic apparatus (101) displays, for example, with a popup window, information Mr. Taro Saitoh(斉藤 太郎氏) Taro_Saitoh/Japan organization 1, Toyosu, Tokyo, xxx-yyy" (indicating an organization to which Mr. Taro Saitoh belongs) (325) associated with the conversion candidate "Taro_Saito@jp.ibm.com" (333-1) on which the mouse cursor (334) is placed and for supporting selection of the conversion candidate "Taro_Saitoh@jp.ibm.com" (333-1) on which the mouse cursor (334) is placed.

In step 325, the user G selects the conversion candidate "Taro_Saitoh@jp.ibm.com" (333-2) on the map (333) using a mouse cursor (336) (e.g., left click).

In step 326, the electronic apparatus (101) inputs, according to the selection by the mouse cursor (336), the selected "Taro_Saitoh@jp.ibm.com" to the destination (331) on an application to which a mail address is input (i.e., a position different from the text (332) to which the appellation is input) and decides the selected "Taro_Saitoh@jp.ibm.com". Therefore, the user G can select, according to the input of the appellation Mr. Saitoh, a conversion candidate, which the user G considers optimum, out of the appellations, which are the plurality of conversion candidates, on the graphically displayed map (333) and input the conversion candidate.

According to the conversion of the appellation Mr. Saitoh into the mail address "Taro_Saitoh@jp.ibm.com", the electronic apparatus (101) can increment, by 1, the second count (=30) in a row in which a mail address is "Taro_Saitoh@jp.ibm.com" and an appellation is Mr. Saitoh in the data 1 (327). The electronic apparatus (101) can notify the server computer (141) that the appellation Mr. Saitoh has been converted into "Taro_Saitoh@jp.ibm.com". According to reception of the notification, the server computer (141) can increment, by 1, the second count (=30) in a row in which an appellation is Mr. Saitoh and a mail address is "Taro_Saitoh@jo.ibm.com" in data corresponding to the data 1 (327).

In step 321, a user H (who uses the mail address Hanako_Tanaka@jp.ibm.com) belonging to the organization (Org3) is about to start a mail application and create a new mail on the electronic apparatus (101) (e.g., a cellular phone). The electronic apparatus (101) starts the mail application and displays a screen for new mail creation. The screen for new mail creation includes fields for inputting the destination (331), Cc., a subject, and the text (332).

In step 322, the user H inputs a nickname or a name ("appellation") to, for example, the head of the text (332). It is assumed that the appellation input by the user H is Mr.Saitoh. The electronic apparatus (101) displays Mr.Saitoh in the text (332). The electronic apparatus (101) transmits, according to the input of the appellation Mr.Saitoh, the input appellation Mr.Saitoh to the server computer (141).

According to reception of the appellation Mr.Saitoh from the electronic apparatus (101), the server computer (141) refers to the data 1 (327) including an appellation and a mail address associated with the appellation. The data 1 (327) is stored in, for example, a storage medium (e.g., the disk (148) shown in FIG. 1C) accessible by the server computer (141).

The data 1 (327) includes, for each mail address, a plurality of appellations associated with the mail address and, concerning each of the plurality of appellations, a total number of people who transmitted mails to the mail address using the appellation (the first count) and the number of times or a frequency a sender (i.e., the user H) transmitted mails to the mail address using the appellation (the second count). Note that, when data is updated concerning the items of the data 1 (327), the server computer (141) can update the data concerning the items, for example, on a real time basis or through batch processing.

The server computer (141) extracts mail addresses (i.e., conversion candidates) in which the appellation Mr.Saitoh is used. That is, the server computer (141) extracts, from the data 1 (327), as conversion candidates, the mail addresses "Taro_Saitoh@jp.ibm.com" and "Takao_Saitoh@jp.ibm.com" in which the appellation Mr.Saitoh" is used. The server computer (141) can optionally extract, from the data 1 (327), as a conversion candidate, the mail address "Yuji_Saitoh@jp.ibm.com" in which an appellation Mr.Saito homophonic with the appellation Mr.Saitoh is used.

Subsequently, the server computer (141) optionally refers to the data 2 (328) including a pair of a mail address of a receiver and a mail address of a sender (a receiver-sender pair) and the number of times of transmission or a frequency mails were transmitted from the sender to the receiver (the third count). Note that, when data is updated concerning the items of the data 2 (328), the server computer (141) can update the data concerning the items, for example, on a real time basis or through batch processing.

The server computer (141) optionally acquires, from the data 2 (328), the number of times of transmission or a frequency mails are transmitted from the mail address (Hanako_Tanaka@jp.ibm.com) of the sender (the user H who is a mail creator) to the extracted mail address (i.e., a mail address of a reception destination) "Taro_Saitoh@jp.ibm.com" or "Takano_Saitoh@jp.ibm.com" or optionally "Yuji_Saitoh@jp.ibm.com" (the third count). That is, the electronic apparatus (101) acquires the number of times of transmission "2000" of a receiver-sender pair "(To) Taro_Saitoh@jp.ibm.com; (From) Hanako_Tanaka@jp.ibm.com", the number of times of transmission "30" of a receiver-sender pair "(To) Takao_Saitoh@jp.ibm.com; (From) Hanako_Tanaka@jp.ibm.com", and, optionally, the number of times of transmission "10" of a receiver-sender pair "(To) Yuji_Saito@jp.ib.mcom"; (From) Hanako_Tanaka@ji.ibm.com" (not shown on the data (328) in FIG. 3D).

Subsequently, the server computer (141) further optionally refers to the data 3 (329) including a mail address of a reception destination, an organization to which a sender belongs, and the number of times of transmission and a frequency a person belonging to the organization to which the sender belongs transmitted mails to the mail address of the reception destination (the forth count). Note that, when data is updated concerning the items of the data 3 (329), the server computer (141) can update the data concerning the items, for example, on a real time basis or through batch processing.

The server computer (141) further optionally calculates the data 4 (see 330) indicating a distance between the organization to which the sender of the mail belongs and the organization to which the user having the mail address of the reception destination belongs. For example, the distance is calculated using the tree structures (330-1 and 330-2) shown in FIG. 3B.

The tree structure (330-1) and the tree structure (330-2) are as explained above.

The server computer (141) can further optionally calculate, from the data 1 (327), the data 2 (328), the data 3 (329), and the data 4 (see 330), concerning each of the extracted mail addresses, the candidate ranking L (the fifth count) according to the above Expression 1 and Expression 2.

The fifth count is the mail addresses "Taro_Saitoh@jp.ibm.com", "Takao_Saitoh@jp.ibm.com", and "Yuji_Saito@jp.ibm.com", which are the conversion candidates, in descending order of values of the fifth count.

The server computer (141) selects, according to the calculated fifth counts, for example, three conversion candidates in descending order of the fifth counts of the respective conversion candidates, which are conversion candidates (the number of conversion candidates to be selected can be set to any number, and the user H can set the number to, for example, three to five). Note that, in closeness of the organizations to which the receiver and the sender belong, a conversion candidate having the high fifth count can be interpreted as a mail address used in more users in the organization to which the sender belongs. A conversion candidate having the low fifth count can be interpreted as a mail address not so often used by users in the organization to which the sender belongs because the organizations to which the receiver and the sender belong are apart from each other. Therefore, the server computer (141) selects "Taro_Saitoh@jp.ibm.com" (333-1), "Takao_Saitoh@jp.ibm.com" (333-2), and "Yuji_Saito@jp.ibm.com" (333-3) in descending order of the fifth counts.

Subsequently, the server computer (141) reads, referring to the data 1 (327), the second counts of the respective selected conversion candidates (333-1, 333-2, and 333-3).

The server computer (141) transmits the three conversion candidates and the fifth counts and the second counts associated with the respective conversion candidates to the electronic apparatus (101). The server computer (141) can optionally transmit information for supporting selection associated with the respective conversion candidates to the electronic apparatus (101).

The electronic apparatus (101) receives the three conversion candidates and the fifth counts and the second counts associated with the respective conversion candidates and optionally the information for supporting selection associated with the respective conversion candidates transmitted from the server computer (141).

In step 323, the electronic apparatus (101) displays the selected conversion candidates "Taro_Saitoh@jp.ibm.com" (333-1), "Takao_Saitoh@jp.ibm.com" (333-2), and "Yuji_Saito@jp.ibm.com" (333-3) on the map (333). For example, the map (333) can be displayed as a window associated with the text (332) or the appellation Mr.Saitoh input to the text (332). The electronic apparatus (101) displays the respective conversion candidates (333-1, 333-2, and 333-3) on the map (333) to occupy wider regions in descending order of the fifth counts. The area on the map is allocated at ratios of, for example, 50% for the conversion candidate having the highest fifth count of the respective conversion candidates (333-1, 333-2, and 333-3), for example, 30% for the conversion candidate having the second highest fifth count, and, for example, 20% for the conversion candidate having the third highest fifth count. Alternatively, the area on the map is allocated according to a ratio of the fifth counts of the respective conversion candidates (333-1, 333-2, and 333-3).

Subsequently, the electronic apparatus (101) displays the regions on the map such that, for example, a hue is lighter, brightness is lower, or chroma is lower as the second count is lower. That is, the electronic apparatus (101) displays the conversion candidates on the map (333) in descending order of the second counts such that, for example, a hue is lighter, brightness is lower, or chroma is lower in the order of the conversion candidates "Takao_Saitoh@jp.ibm.com" (333-2) (the second count=60) (333-2), "Taro_Saitoh@jp.ibm.com" (the second count=30) (333-1), and "Yuji_Saito@jps.ibm.com" (the second count=5) (333-3).

The electronic apparatus (101) displays, on the map (333), a plurality of conversion candidates according to two ranks of the fifth count and the second count. In the case of a conversion candidate having the high fifth count, since an area occupied on the map (333) is large, the user H can easily select the conversion candidate having the high fifth count. The user H can learn, from display areas of the respective conversion candidates, in closeness of the organizations to which the receiver and the sender belong, whether the conversion candidate is used in more users in the organization to which the sender belongs. In the case of a conversion candidate having the high second count, since a hue displayed on the map (333) is thick, the user H can learn which conversion candidate the user H himself/herself frequently uses.

In step 324, the user H places the operation finger (324) on the conversion candidate "Taro_Saitoh@jp.ibm.com" (333-1) on the map (333). The electronic apparatus (101) displays, for example, with a popup window, information Mr. Taro Saitoh Taro_Saitoh/Japan organization 1, Toyosu, Tokyo xxx-yyy" (indicating an organization to which Mr. Taro Saito belongs) (325) associated with the conversion candidate "Taro_Saito@jp.ibm.com" (333-1) on which the operation finger (324) is placed and for supporting selection of the conversion candidate "Taro_Saitoh@jp.ibm.com" (333-1) on which the operation finger (324) is placed.

In step 325, the user H selects the conversion candidate "Taro_Saitoh@jp.ibm.com" (333-1) on the map (333) using a mouse cursor (336) (e.g., double touch).

In step 326, the electronic apparatus (101) inputs, according to the selection by the mouse cursor (336), the selected "Taro_Saitoh@jp.ibm.com" to the destination (331) on an application to which a mail address is input (i.e., a position different from the text (332) to which the appellation is input) and decides the selected "Taro_Saitoh@jp.ibm.com". Therefore, the user H can select, according to the input of the appellation Mr.Saitoh, a conversion candidate, which the user H considers optimum, out of the mail addresses, which are the plurality of conversion candidates, on the graphically displayed map (333) and input the conversion candidate.

The electronic apparatus (101) can notify the server computer (141) that the appellation Mr.Saitoh has been converted into the mail address "Taro_Saitoh@jp.ibm.com". According to reception of the notification, the server computer (141) can increment, by 1, the second count (=30) in a row in which an appellation is Mr.Saitoh and a mail address is "Taro_Saitoh@jp.ibm.com" in the data 1 (327).

FIG. 4A shows a mode in which a plurality of conversion candidates (which can include English words or chemical formulas) corresponding to an input character string (English) are displayed on the map and a selected conversion candidate (English) on the map is decided according to the embodiment of the present invention. FIG. 4B shows data usable for displaying the plurality of conversion candidates on the map in the mode shown in FIG. 4A.

In the following explanation, a mode in which the electronic apparatus (101) retrieves a plurality of conversion candidates corresponding to an input character string (English) and a mode in which the server computer (141) retrieves the plurality of conversion candidates are respectively explained.

In step 401, a user J is about to start a word processor and perform new document creation or document editing on the electronic apparatus (101) (e.g., an ultra book). The electronic apparatus (101) starts the word processor and displays a screen for new document creation or reads a file being created.

In step 402, the user J is inputting a report in English on a screen of the word processor. It is assumed that the user J inputs a word "alcohol" and subsequently depresses, for example, a predetermined key (e.g., an End key).

The electronic apparatus (101) refers to, according to the input of the word "alcohol" and the depression of the predetermined key, data (407) including the word and conversion candidates associated with the word. The data (407) can be downloaded to the electronic apparatus (101) from a storage medium (e.g., a server computer accessible to the storage medium) having stored therein the data (407), for example, during the start of the electronic apparatus (101) or during the start of the word processor or at every predetermined time interval.

The data (407) includes, for each of words of an input character string, a plurality of conversion candidates associated with the word and, concerning each of the plurality of conversion candidates, a total number of people who performed decision inputs using the conversion candidate (the first count) and the number of times or a frequency an inputting person (i.e., the user J) performed decision inputs using the conversion candidate (the second count).

The electronic apparatus (101) selects, referring to the data (407), for example, three conversion candidates in descending order of the first counts of a respective plurality of conversion candidates (the number of conversion candidates to be selected can be set to any number and the user J can set the number to, for example, three to five). Note that a conversion candidate having the high first count can be interpreted as a conversion candidate used in more users. A conversion candidate having the low first count can be interpreted as a conversion candidate not used so often or a wrong conversion candidate.

In step 403, the electronic apparatus (101) displays, in descending order of the first counts, conversion candidates "ethanol" (the first count=50) (413-1), "ethyl alcohol" (the first count=25 (413-2), and "CH$_3$CH$_2$OH" (the first count=10) (413-3) on a map (413). The map (413) can be displayed as, for example, a window associated with the input character string. The electronic apparatus (101) displays the respective conversion candidates (413-1, 413-2, and 413-3) on the map (413) to occupy wider regions in descending order of the first counts. The area on the map is allocated according to, for example, a ratio of the first counts of the respective conversion candidates (413-1, 413-2, and 413-3). Alternatively, the area on the map is allocated at ratios of, for example, 50% for the conversion candidate having the highest first count of the respective conversion candidates (413-1, 413-2, and 413-3), for example, 30% for the conversion candidate having the second highest first count, and, for example, 20% for the conversion candidate having the third highest first count.

Subsequently, the electronic apparatus (101) reads, referring to the data (407), the second counts of the respective selected conversion candidates (413-1, 413-2, and 413-3). The electronic apparatus (101) displays the regions on the map such that, for example, a hue is lighter, brightness is lower, or chroma is lower as the second count is lower. That is, the electronic apparatus (101) displays the conversion candidates on the map (413) in descending order of the second counts such that, for example, a hue is lighter, brightness is lower, or chroma is lower in the order of the conversion candidates "ethyl alcohol" (the second count=200) (413-2), "ethanol" (the second count=60) (413-1), and "CH$_3$CH$_2$OH" (the second count=30) (413-3).

On the map (413), the electronic apparatus (101) displays a plurality of conversion candidates according to two ranks of the respective first and second counts. In the case of a conversion candidate having the high first count, since an area occupied on the map (413) is large, the user J can easily select the conversion candidate having the high first count. The user J can learn, from display areas of the respective conversion candidates, what kinds of conversion candidates users other than the user J often use. In the case of a conversion candidate having the high second count, since a hue displayed on the map (413) is thick, the user J can learn which conversion candidate the user J himself/herself frequently uses.

In step 404, the user J places a mouse cursor (414) on the conversion candidate "CH$_3$CH$_2$OH" (413-3) on the map (413). The electronic apparatus (101) displays, for example, with a popup window, information "a chemical formula of ethanol" (415) associated with the conversion candidate "CH$_3$CH$_2$OH" (413-3) on which the mouse cursor (414) is placed and for supporting selection of the conversion candidate "CH$_3$CH$_2$OH" (413-3) on which the mouse cursor (414) is placed.

In step 405, the user J selects the conversion candidate "ethyl alcohol" (413-2) on the map (413) using a mouse cursor (416) (e.g., left click).

In step 406, the electronic apparatus (101) deletes, according to the selection by the mouse cursor (416), the "alcohol" and inputs the selected "ethyl alcohol" to a position to which "alcohol" is input on the word processor and decides the selected "ethyl alcohol". Therefore, the user J can select, according to the input of the word "alcohol", a conversion candidate, which the user J considers optimum, out of the conversion candidates, which are the plurality of conversion candidates, on the graphically displayed map (413) and input the conversion candidate.

According to the conversion of the word "alcohol" into "ethyl alcohol", the electronic apparatus (101) can increment, by 1, the second count (=200) in a row in which an input character string is "alcohol" and a conversion candidate is "ethyl alcohol" in the data (407).

The electronic apparatus (101) can notify the server computer (141) that the word "alcohol" has been converted into "ethyl alcohol". According to reception of the notification, the server computer (141) can increment, by 1, the second count (=200) in a row in which an input character string is "alcohol" and a conversion candidate is "ethyl alcohol" in data corresponding to the data (407).

In step 401, a user K is about to start a word processor and perform new document creation or document editing on the electronic apparatus (101) (e.g., a tablet terminal). The electronic apparatus (101) starts the word processor and displays a screen for new document creation or reads a file being created.

In step 402, the user K is inputting a report in English on a screen of the word processor. It is assumed that the user K inputs the word "alcohol" and subsequently depresses, for example, a predetermined key (e.g., an End key).

The electronic apparatus (101) transmits, according to the input of the word "alcohol" and the depression of the predetermined software key, the input word "alcohol" to the server computer (141).

According to reception of the word "alcohol" from the electronic apparatus (101), the server computer (141) refers to the data (407) including the word and conversion candidates associated with the word. The data (407) is stored in, for example, a storage medium (e.g., the disk (148) shown in FIG. 1C) accessible by the server computer (141).

The data (407) includes, for each word that is an input character string, a plurality of conversion candidates associated with the word and, concerning each of the plurality of conversion candidates, a total number of people who performed decision inputs using the conversion candidate (the first count) and the number of times or a frequency an inputting person (i.e., the user K) performed decision inputs using the conversion candidate (the second count). Note that, when data is updated concerning the items of the data (407), the server computer (141) can update the data concerning the items, for example, on a real time basis or through batch processing.

The server computer (141) selects, referring to the data (407), for example, three conversion candidates in descending order of the first counts of a respective plurality of conversion candidates (the number of conversion candidates to be selected can be set to any number and the user K can set the number to, for example, three to five). Note that a conversion candidate having the high first count can be interpreted as a conversion candidate used in more users. A conversion candidate having the low first count can be interpreted as a conversion candidate not so often used or a wrong conversion candidate. Therefore, the server computer (141) selects the conversion candidates "ethanol" (the first count=50), "ethyl alcohol" (the first count=25), and "CH$_3$CH$_2$OH" (the first count=10) in descending order of the first counts.

Subsequently, the server computer (141) reads, referring to the data (407), the second counts of the respective selected three conversion candidates.

The server computer (141) transmits the three conversion candidates and the first counts and the second counts associated with the respective conversion candidates to the electronic apparatus (101). The server computer (141) can optionally transmit information for supporting selection associated with the respective conversion candidates to the electronic apparatus (101).

The electronic apparatus (101) receives the three conversion candidates and the first counts and the second counts associated with the respective conversion candidates and optionally the information for supporting selection associated with the respective conversion candidates transmitted from the server computer (141).

In step 403, the electronic apparatus (101) displays the received three conversion candidates on the map (413) in descending order of the first counts, i.e., the conversion candidates "ethanol" (the first count=50) (413-1), "ethyl alcohol" (the first count=25) (413-2), and "CH$_3$CH$_2$OH" (the first count=10) (413-3). The map (413) can be displayed as, for example, a window associated with the input character string. The electronic apparatus (101) displays the respective conversion candidates (413-1, 413-2, and 413-3) on the map (413) to occupy wider regions in descending order of the first counts. The area on the map is allocated according to, for example, a ratio of the first counts of the respective conversion candidates (413-1, 413-2, and 413-3). Alternatively, the area on the map is allocated at ratios of, for example, 50% for the conversion candidate having the highest first count of the respective conversion candidates (413-1, 413-2, and 413-3), for example, 30% for the conversion candidate having the second highest first count, and, for example, 20% for the conversion candidate having the third highest first count.

Subsequently, the electronic apparatus (101) displays the regions on the map such that, for example, a hue is lighter, brightness is lower, and chroma is lower as the second count is lower. That is, the electronic apparatus (101) displays the conversion candidates on the map (413) in descending order of the second counts such that, for example, a hue is lighter, brightness is lower, or chroma is lower in the order of the conversion candidates "ethyl alcohol" (the second count=200) (413-2), "ethanol" (the second count=60) (413-1), and "CH$_3$CH$_2$OH" (the second count=30) (413-3).

On the map (413), the electronic apparatus (101) displays a plurality of conversion candidates according to two ranks of the respective first and second counts. In the case of a conversion candidate having the high first count, since an area occupied on the map (413) is large, the user K can easily select the conversion candidate having the high first count. The user K can learn, from display areas of the respective conversion candidates, what kinds of conversion candidates users other than the user K often use. In the case of a conversion candidate having the high second count, since a hue displayed on the map (413) is thick, the user K can learn which conversion candidate the user K himself/herself frequently uses.

In step 404, the user K places a mouse cursor (414) on the conversion candidate "CH$_3$CH$_2$OH" (413-3) on the map (413). The electronic apparatus (101) displays, for example, with a popup window, information "a chemical formula of ethanol" (415) associated with the conversion candidate "CH$_3$CH$_2$OH" (413-3) on which the mouse cursor (414) is placed and for supporting selection of the conversion candidate "CH$_3$CH$_2$OH" (413-3) on which the mouse cursor (414) is placed.

In step 405, the user K selects the conversion candidate "ethyl alcohol" (413-2) on the map (413) using an operation finger (416) (e.g., double touch).

In step 406, the electronic apparatus (101) deletes, according to the selection by the operation finger (416), the "alcohol" and inputs the selected "ethyl alcohol" to a position to which "alcohol" is input on the word processor and decides the selected "ethyl alcohol". Therefore, the user K can select, according to the input of the word "alcohol", a conversion candidate, which the user K considers optimum, out of the conversion candidates, which are the plurality of conversion candidates, on the graphically displayed map (413) and input the conversion candidate.

The electronic apparatus (101) can notify the server computer (141) that the word "alcohol" has been converted into "ethyl alcohol". According to reception of the notification, the server computer (141) can increment, by 1, the second count (=200) in a row in which an input character string is "alcohol" and a conversion candidate is "ethyl alcohol" in the data (407).

Figure 4C:
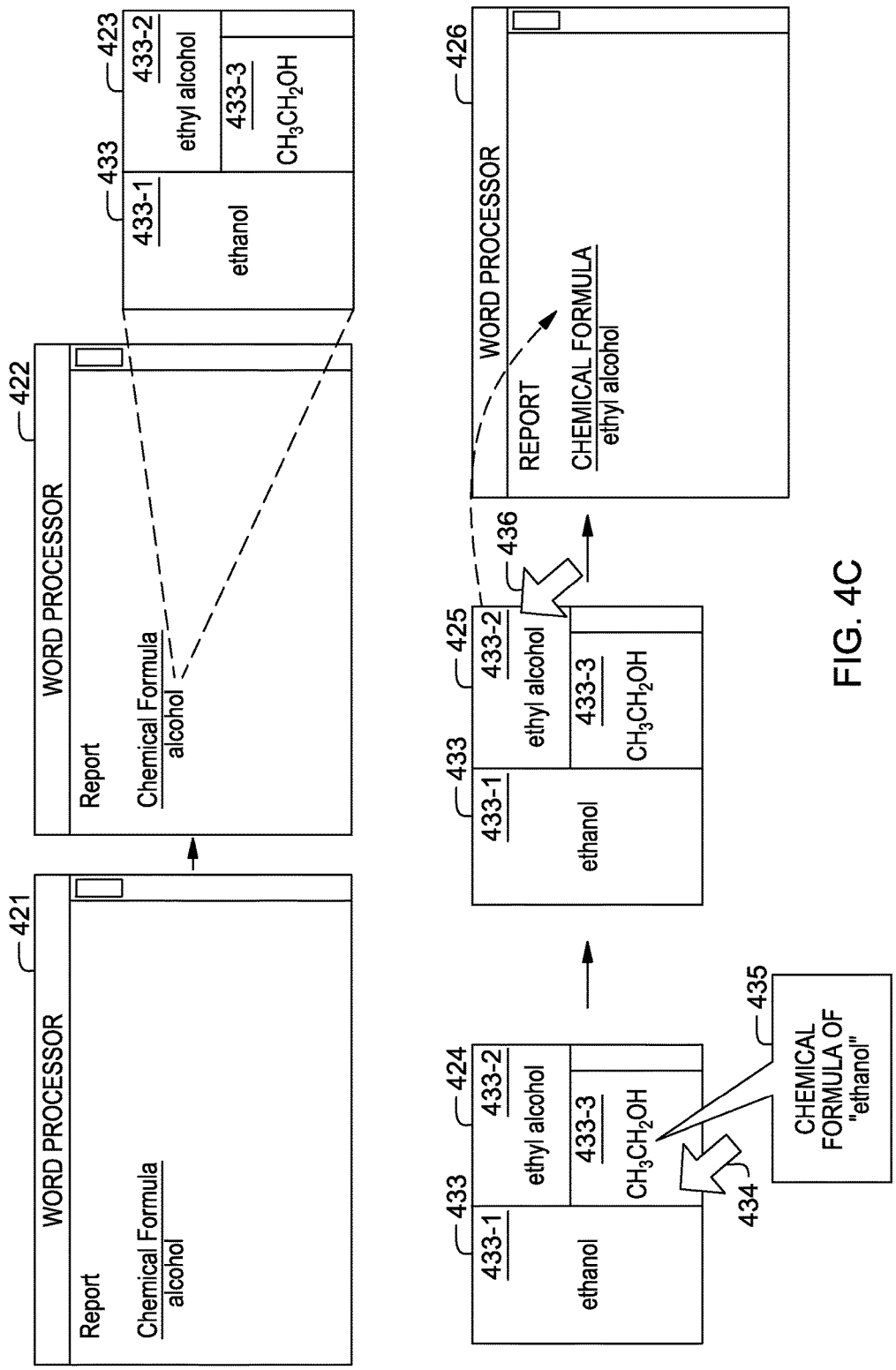
FIG. 4C is an illustration showing a mode in which a plurality of conversion candidates corresponding to an input character string (Japanese) are displayed on the map and a selected conversion candidate on the map is decided in accordance with at least one embodiment of the present invention.

FIG. 4C shows a mode in which a plurality of conversion candidates (including Japanese words, English words, or chemical formulas) corresponding to an input character string (Japanese) are displayed on the map and a selected conversion candidate on the map is decided according to the embodiment of the present invention. FIG. 4D shows data usable for displaying the plurality of conversion candidates on the map in the mode shown in FIG. 4C.

In the following explanation, a mode in which the electronic apparatus (101) retrieves a plurality of conversion candidates corresponding to an input character string (Japanese) and a mode in which the server computer (141) retrieves the plurality of conversion candidates are respectively explained.

In step 421, the user J is about to start a word processor and perform new document creation or document editing on the electronic apparatus (101) (e.g., a wireless keyboard attached tablet terminal). The electronic apparatus (101) starts the word processor and displays a screen for new document creation or reads a file being created.

In step 422, the user J is inputting a report in Japanese on a screen of the word processor. It is assumed that the user J inputs a word alcohol (アルコール) and subsequently depresses, for example, a predetermined key (e.g., an End key).

The electronic apparatus (101) refers to, according to the input of the word alcohol and the depression of the predetermined key, data (427) including the word and conversion candidates associated with the word. The data (427) can be downloaded to the electronic apparatus (101) from a storage medium (e.g., a server computer accessible to the storage medium) having stored therein the data (427), for example, during the start of the electronic apparatus (101) or during the start of the word processor or at every predetermined time interval.

The data (427) includes, for each of words of an input character string, a plurality of conversion candidates associated with the word and, concerning each of the plurality of conversion candidates, a total number of people who performed decision inputs using the conversion candidate (the first count) and the number of times or a frequency an inputting person (i.e., the user J) performed decision inputs using the conversion candidate (the second count).

The electronic apparatus (101) selects, referring to the data (427), for example, three conversion candidates in descending order of the first counts of a respective plurality of conversion candidates (the number of conversion candidates to be selected can be set to any number and the user J can set the number to, for example, three to five). Note that a conversion candidate having the high first count can be interpreted as a conversion candidate used in more users. A conversion candidate having the low first count can be interpreted as a conversion candidate not used so often or a wrong conversion candidate.

In step 423, the electronic apparatus (101) displays, in descending order of the first counts, conversion candidates ethanol (エタノール) (the first count=50) (433-1), ethyl alcohol (エチルアルコール) (the first count=25 (433-2), and "CH$_3$CH$_2$OH" (the first count=14) (433-3) on a map (433). The map (433) can be displayed as, for example, a window associated with the input character string. The electronic apparatus (101) displays the respective conversion candidates (433-1, 433-2, and 433-3) on the map (433) to occupy wider regions in descending order of the first counts. The area on the map is allocated according to, for example, a ratio of the first counts of the respective conversion candidates (433-1, 433-2, and 433-3). Alternatively, the area on the map is allocated at ratios of, for example, 50% for the conversion candidate having the highest first count of the respective conversion candidates (433-1, 433-2, and 433-3), for example, 30% for the conversion candidate having the second highest first count, and, for example, 20% for the conversion candidate having the third highest first count.

Subsequently, the electronic apparatus (101) reads, referring to the data (427), the second counts of the respective selected conversion candidates (433-1, 433-2, and 433-3). The electronic apparatus (101) displays the regions on the map such that, for example, a hue is lighter, brightness is lower, or chroma is lower as the second count is lower. That is, the electronic apparatus (101) displays the conversion candidates on the map (433) in descending order of the second counts such that, for example, a hue is lighter, brightness is lower, or chroma is lower in the order of the conversion candidates ethyl alcohl (the second count=200) (433-2), ethanol (the second count=60) (433-1), and "CH$_3$CH$_2$OH" (the second count=20) (433-3).

On the map (433), the electronic apparatus (101) displays a plurality of conversion candidates according to two ranks of the respective first and second counts. In the case of a conversion candidate having the high first count, since an area occupied on the map (433) is large, the user J can easily select the conversion candidate having the high first count. The user J can learn, from display areas of the respective conversion candidates, what kinds of conversion candidates users other than the user J often use. In the case of a conversion candidate having the high second count, since a hue displayed on the map (433) is thick, the user J can learn which conversion candidate the user J himself/herself frequently uses.

In step 424, the user J places a mouse cursor (434) on the conversion candidate "CH$_3$CH$_2$OH" (433-3) on the map (433). The electronic apparatus (101) displays, for example, with a popup window, information "a chemical formula of ethanol (435) associated with the conversion candidate "CH$_3$CH$_2$OH" (433-3) on which the mouse cursor (434) is placed and for supporting selection of the conversion candidate "CH$_3$CH$_2$OH" (433-3) on which the mouse cursor (434) is placed.

In step 425, the user J selects the conversion candidate ethyl alcohol (433-2) on the map (433) using a mouse cursor (436) (e.g., left click). In step 426, the electronic apparatus (101) deletes, according to the selection by the mouse cursor (436), the alcohol and inputs the selected ethyl alcohol to a position to which alcohol is input on the word processor and decides the selected ethyl alcohol. Therefore, the user J can select, according to the input of the word "alcohol", a conversion candidate, which the user J considers optimum, out of the conversion candidates, which are the plurality of conversion candidates, on the graphically displayed map (433) and input the conversion candidate.

According to the conversion of the word alcohol into ethyl alcohol, the electronic apparatus (101) can increment, by 1, the second count (=200) in a row in which an input character string is alcohol and a conversion candidate is ethyl alcohol in the data (427).

The electronic apparatus (101) can notify the server computer (141) that the word alcohol has been converted into ethyl alcohol. According to reception of the notification, the server computer (141) can increment, by 1, the second count (=200) in a row in which an input character string is "alcohol" and a conversion candidate is "ethyl alcohol" in the data (427).

In step 421, the user K is about to start a word processor and perform new document creation or document editing on the electronic apparatus (101) (e.g., a wireless keyboard attached tablet terminal). The electronic apparatus (101) starts the word processor and displays a screen for new document creation or reads a file being created.

In step 422, the user K is inputting a report in Japanese on a screen of the word processor. It is assumed that the user K inputs the word alcohol and subsequently depresses, for example, a predetermined key (e.g., an End key). The electronic apparatus (101) transmits, according to the input of the word alcohol and the depression of the predetermined software key, the input word alcohol to the server computer (141).

According to reception of the word alcohol from the electronic apparatus (101), the server computer (141) refers to the data (427) including the word and conversion candidates associated with the word. The data (427) is stored in, for example, a storage medium (e.g., the disk (148) shown in FIG. 1C) accessible by the server computer (141). The data (427) includes, for each word that is an input character string, a plurality of conversion candidates associated with the word and, concerning each of the plurality of conversion candidates, a total number of people who performed decision inputs using the conversion candidate (the first count) and the number of times or a frequency an inputting person (i.e., the user K) performed decision inputs using the conversion candidate (the second count). Note that, when data is updated concerning the items of the data (427), the server computer (141) can update the data concerning the items, for example, on a real time basis or through batch processing.

The server computer (141) selects, referring to the data (427), for example, three conversion candidates in descending order of the first counts of a respective plurality of conversion candidates (the number of conversion candidates to be selected can be set to any number and the user K can set the number to, for example, three to five). Note that a conversion candidate having the high first count can be interpreted as a conversion candidate used in more users. A conversion candidate having the low first count can be interpreted as a conversion candidate not so often used or a wrong conversion candidate. Therefore, the server computer (141) selects the conversion candidates ethanol (the first count=50), ethyl alcohol (the first count=25), and "$CH_3CH_2OH$" (the first count=14) in descending order of the first counts.

Subsequently, the server computer (141) reads, referring to the data (427), the second counts of the respective selected three conversion candidates. The server computer (141) transmits the three conversion candidates and the first counts and the second counts associated with the respective conversion candidates to the electronic apparatus (101). The server computer (141) can optionally transmit information for supporting selection associated with the respective conversion candidates to the electronic apparatus (101).

The electronic apparatus (101) receives the three conversion candidates and the first counts and the second counts associated with the respective conversion candidates and optionally the information for supporting selection associated with the respective conversion candidates transmitted from the server computer (141).

In step 423, the electronic apparatus (101) displays the received three conversion candidates on the map (433) in descending order of the first counts, i.e., the conversion candidates ethanol (the first count=50) (433-1), ethyl alcohol (the first count=25) (433-2), and "$CH_3CH_2OH$" (the first count=14) (433-3). The map (433) can be displayed as, for example, a window associated with the input character string. The electronic apparatus (101) displays the respective conversion candidates (433-1, 433-2, and 433-3) on the map (433) to occupy wider regions in descending order of the first counts. The area on the map is allocated according to, for example, a ratio of the first counts of the respective conversion candidates (433-1, 433-2, and 433-3). Alternatively, the area on the map is allocated at ratios of, for example, 50% for the conversion candidate having the highest first count of the respective conversion candidates (433-1, 433-2, and 433-3), for example, 30% for the conversion candidate having the second highest first count, and, for example, 20% for the conversion candidate having the third highest first count.

Subsequently, the electronic apparatus (101) displays the regions on the map such that, for example, a hue is lighter, brightness is lower, and chroma is lower as the second count is lower. That is, the electronic apparatus (101) displays the conversion candidates on the map (433) in descending order of the second counts such that, for example, a hue is lighter, brightness is lower, or chroma is lower in the order of the conversion candidates ethyl alcohol (the second count=200) (433-2), ethanol (the second count=60) (433-1), and "$CH_3CH_2OH$" (the second count=20) (433-3).

On the map (433), the electronic apparatus (101) displays a plurality of conversion candidates according to two ranks of the respective first and second counts. In the case of a conversion candidate having the high first count, since an area occupied on the map (433) is large, the user K can easily select the conversion candidate having the high first count. The user K can learn, from display areas of the respective conversion candidates, what kinds of technical terms users other than the user K often use as conversion candidates. In the case of a conversion candidate having the high second count, since a hue displayed on the map (433) is thick, the user K can learn which conversion candidate the user K himself/herself frequently uses.

In step 424, the user K places a mouse cursor (434) on the conversion candidate "$CH_3CH_2OH$" (433-3) on the map (433). The electronic apparatus (101) displays, for example, with a popup window, information "a chemical formula of ethanol" (435) associated with the conversion candidate "$CH_3CH_2OH$" (433-3) on which the mouse cursor (434) is placed and for supporting selection of the conversion candidate "$CH_3CH_2OH$" (433-3) on which the mouse cursor (434) is placed.

In step 425, the user K selects the conversion candidate ethyl alcohol (433-2) on the map (433) using an operation finger (436) (e.g., double touch). In step 426, the electronic apparatus (101) deletes, according to the selection by the operation finger (436), the alcohol and inputs the selected ethyl alcohol to a position to which alcohol is input on the word processor and decides the selected ethyl alcohol. Therefore, the user K can select, according to the input of the word alcohol, a conversion candidate, which the user K considers optimum, out of the conversion candidates, which are the plurality of conversion candidates, on the graphically displayed map (433) and input the conversion candidate.

The electronic apparatus (101) can notify the server computer (141) that the word alcohol has been converted into ethyl alcohol. According to reception of the notification, the server computer (141) can increment, by 1, the second count (=200) in a row in which an input character string is alcohol and a conversion candidate is ethyl alcohol in the data (427).

FIG. 5A shows a mode in which a plurality of conversion candidates (Japanese words as translated words) corresponding to a character string (English) are displayed on a map and a selected conversion candidate on the map is decided according to the embodiment of the present invention. FIG. 5B shows data usable for displaying the plurality of conversion candidates on the map in the mode shown in FIG. 5A.

In step 501, a user L is about to start a word processor and perform document editing for cooperative translation work for a technical manual on the electronic apparatus (101) (e.g., a desktop personal computer). It is assumed that the electronic apparatus (101) starts the word processor and reads a file being created. In step 502, the user L is performing translation work from English into Japanese on a screen of the word processor. It is assumed that the user L inputs a word "Fix List" and depresses, for example, a predetermined key (e.g., an End key) or selects an already-input word "Fix List" and depresses, for example, a predetermined key (e.g., a space key).

The electronic apparatus (101) transmits, according to the input or the selection of the word "Fix List" and the depression of the predetermined key, the input or selected word "Fix List" to the server computer (141). According to reception of the word "Fix List" from the electronic apparatus (101), the server computer (141) refers to data (507) including the word and conversion candidates associated with the word. The data (507) is stored in, for example, a storage medium (e.g., the disk (148) shown in FIG. 1C) accessible by the server computer (141).

The data (507) includes, for each word that is an input character string, a plurality of conversion candidates associated with the word and, concerning each of the plurality of conversion candidates, a total number of people who performed decision inputs using the conversion candidate (the first count) and the number of times or a frequency an inputting person (i.e., the user L) performed decision inputs using the conversion candidate (the second count). Note that, when data is updated concerning the items of the data (507), the server computer (141) can update the data concerning the items, for example, on a real time basis or through batch processing. In particular, when the data (507) is used for cooperative translation work by a group, every time the data concerning the items of the data (507) is updated, the server computer (141) can update the data concerning the items. Consequently, it is possible to reflect, in the data (507), on a real-time basis, how a specific word is translated.

The server computer (141) selects, referring to the data (507), for example, three conversion candidates in descending order of the first counts of a respective plurality of conversion candidates (the number of conversion candidates to be selected can be set to any number and the user L can set the number to, for example, three to five). Note that a conversion candidate having the high first count can be interpreted as a translation word used in more users. A conversion candidate having the low first count can be interpreted as a translation word not so often used or a wrong translation word. Therefore, the server computer (141) selects conversion candidates Fix List_(修正リスト) (the first count=20), Fix List_2 (Fixリスト) (the first count=10), and Fix List_3 (フィックス・リスト) (the first count=5) in descending order of the first counts.

Subsequently, the server computer (141) reads, referring to the data (507), the second counts of the respective selected three conversion candidates. The server computer (141) transmits the three conversion candidates and the first counts and the second counts associated with the respective conversion candidates to the electronic apparatus (101). The server computer (141) can optionally transmit information for supporting selection associated with the respective conversion candidates to the electronic apparatus (101).

The electronic apparatus (101) receives the three conversion candidates and the first counts and the second counts associated with the respective conversion candidates and optionally the information for supporting selection associated with the respective conversion candidates transmitted from the server computer (141).

In step 503, the electronic apparatus (101) displays the received three conversion candidates on a map (513) in descending order of the first counts, i.e., the conversion candidates Fix List_1 (the first count=20) (513-1), Fix List_2 (the first count=10) (513-2), and Fix List_3 (the first count=5) (513-3). The map (513) can be displayed as, for example, a window associated with the input character string. The electronic apparatus (101) displays the respective conversion candidates (513-1, 513-2, and 513-3) on the map (513) to occupy wider regions in descending order of the first counts. The area on the map is allocated according to, for example, a ratio of the first counts of the respective conversion candidates (513-1, 513-2, and 513-3). Alternatively, the area on the map is allocated at ratios of, for example, 50% for the conversion candidate having the highest first count of the respective conversion candidates (513-1, 513-2, and 513-3), for example, 30% for the conversion candidate having the second highest first count, and, for example, 20% for the conversion candidate having the third highest first count.

Subsequently, the electronic apparatus (101) displays the regions on the map such that, for example, a hue is lighter, brightness is lower, and chroma is lower as the second count is lower. That is, the electronic apparatus (101) displays the conversion candidates on the map (513) in descending order of the second counts such that, for example, a hue is lighter, brightness is lower, or chroma is lower in the order of the conversion candidates Fix List_2 (the second count=120) (513-2), Fix List_1 (the second count=100) (513-1), and Fix List_3 (the second count=15) (513-3).

On the map (513), the electronic apparatus (101) displays a plurality of conversion candidates according to two ranks of the respective first and second counts. In the case of a conversion candidate having the high first count, since an area occupied on the map (513) is large, the user L can easily select the conversion candidate having the high first count. The user L can learn, from display areas of the respective conversion candidates, what kinds of conversion candidates users other than the user L often use. In the case of a conversion candidate having the high second count, since a hue displayed on the map (513) is thick, the user L can learn which conversion candidate the user L himself/herself frequently uses.

In step 504, the user L places a mouse cursor (514) on the conversion candidate Fix List_2 (513-2) on the map (513). The electronic apparatus (101) displays, for example, with a popup window, information 'You selected the word Fix List_2 most often in the past"' (515) associated with the conversion candidate Fix List_2 (513-2) on which the mouse cursor (514) is placed and for supporting selection of the conversion candidate Fix List_2 (513-2) on which the mouse cursor (514) is placed.

In step 505, the user L selects the conversion candidate Fix List_1 (513-1) on the map (513) using a mouse cursor (516) (e.g., left click). In step 506, the electronic apparatus (101) deletes, according to the selection by the mouse cursor (516), the Fix List_2 and inputs the selected Fix List_1 to a position to which Fix List_2 is input on the word processor and decides the selected Fix List_1. Therefore, the user J can select, according to the input of the word "Fix List", a conversion candidate, which the user L considers optimum, out of the conversion candidates, which are the plurality of conversion candidates, on the graphically displayed map (513) and input the conversion candidate. In this way, this embodiment is useful in, in the case of the cooperative translation work for a technical manual as in this example, enabling selection of translation words often used by other translators rather than translation words in the past of the user L himself/herself from the conversion candidates. This also makes it possible to eliminate inconsistency of translation words among translators and standardize translation words.

The electronic apparatus (101) can notify the server computer (151) that the word Fix List_2 has been converted into Fix List_1. According to reception of the notification, the server computer (151) can increment, by 1, the second count (=100) in a row in which an input character string is Fix List_2 and a conversion candidate is Fix List_1 in the data (507).

Each of FIG. 6A to FIG. 6C and FIG. 7A to FIG. 7C below shows an example of a flowchart for processing for displaying conversion candidates associated with an input character string according to the embodiment of the present invention.

Figure 6A:
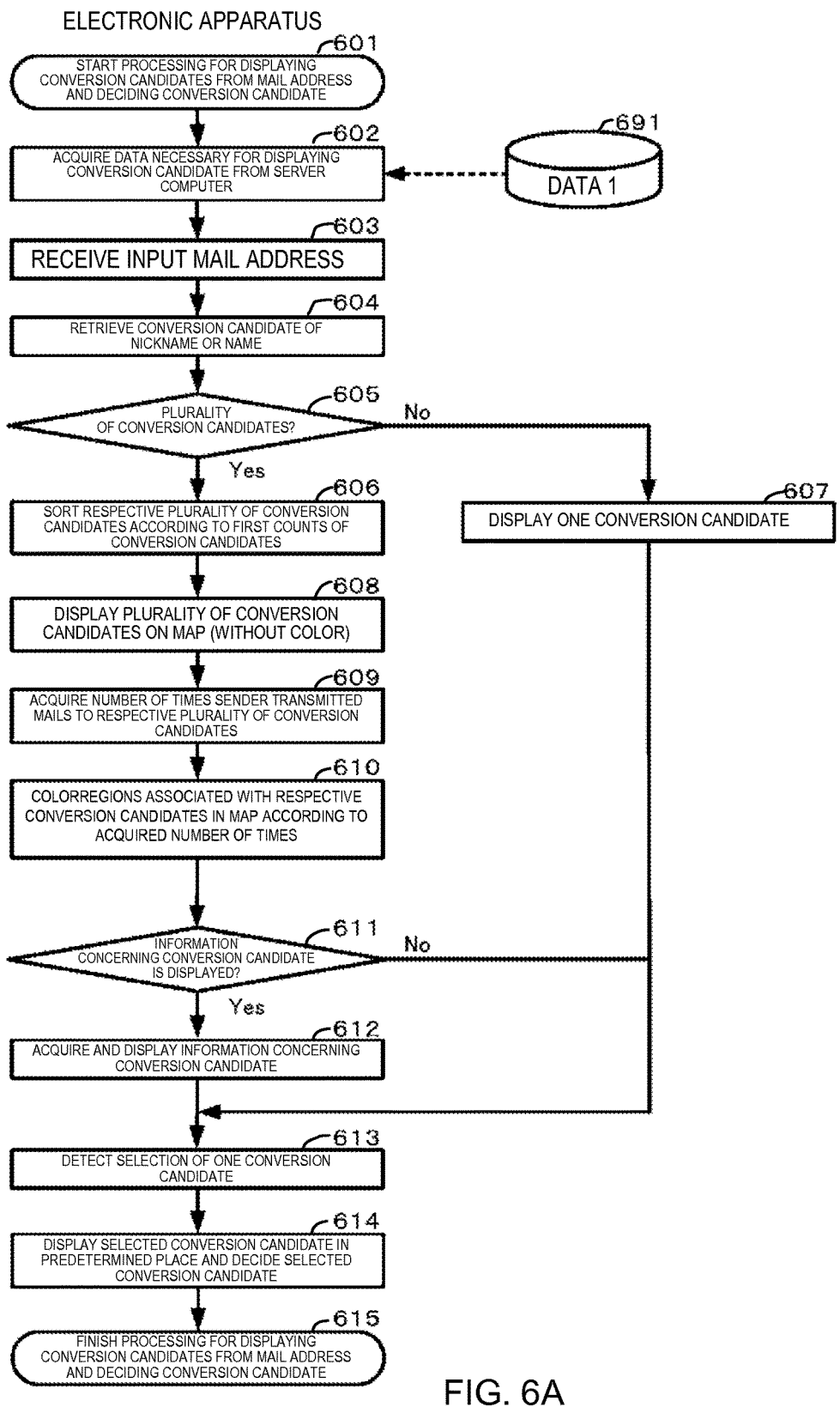
FIGS. 6A-6C are flowcharts of a process for displaying conversion candidates (nicknames or names) associated with an input character string (mail address) in accordance with at least one embodiment of the present invention.

FIG. 6A shows, among the flowcharts for the processing for displaying conversion candidates associated with an input character string, a flowchart for executing processing in which an input character string is a mail address, a conversion candidate associated with the input character string is a nickname or a name (a nickname or a name; hereinafter referred to as appellation as well), and an electronic apparatus retrieves the conversion candidate.

In step 601, the electronic apparatus (101) starts processing for displaying a plurality of conversion candidates (appellations) associated with an input character string (mail address) and deciding a conversion candidate. In step 602, the electronic apparatus (101) optionally acquires data 1 (691) necessary for displaying conversion candidates from a server computer. The data 1 (691) includes, for each mail address, a plurality of appellations associated with the mail address and, concerning each of the plurality of appellations, a total number of people who transmitted mails to the mail address using the appellation (the first count) and the number of times or a frequency a sender transmitted mails to the mail address using the appellation (the second count). The electronic apparatus (101) can download the data 1 (691) to the electronic apparatus (101) from a storage medium (e.g., a server computer accessible to the storage medium) having stored therein the data 1 (691), for example, during the start of the electronic apparatus (101) or during the start of an application to which a character string can be input or at every predetermined time interval.

In step 603, the electronic apparatus (101) receives a mail address input to, for example, a destination on an application, to which the mail address is input, (including the case in which a part of the mail address is input by a user and the remainder is automatically input) from the mail application. The application, to which the mail address is input, can be, for example, a mail application, an application for a social media network (e.g., Twitter® or Facebook®), an application for a bulletin board or a forum (e.g., IBM Connections™), or a web browser.

In step 604, the electronic apparatus (101) retrieves, referring to the data 1 (691), a nickname or a name associated with the input mail address. In step 605, the electronic apparatus (101) determines whether the number of appellations retrieved in step 604 is a plural number. When the number of retrieved appellations is a plural number, the electronic apparatus (101) advances the processing to step 606. On the other hand, when the number of retrieved appellations is one, the electronic apparatus (101) advances the processing to step 607.

In step 606, when the number of retrieved appellations is a plural number, the electronic apparatus (101) acquires the first counts of the respective conversion candidates from the data 1 (691) and sorts the respective appellations, which are the plurality of conversion candidates, according to the first counts. The electronic apparatus (101) selects, as the appellations, for example, three to five appellations in descending order of the first counts.

In step 607, when the number of the retrieved appellations is one, the electronic apparatus (101) displays the one appellation as a conversion candidate for the mail address.

In step 608, the electronic apparatus (101) displays the plurality of appellations selected in step 606 on a map. The map can be two-dimensional or three-dimensional display. The electronic apparatus (101) displays the respective plurality of appellations on the map to occupy wider regions in descending order of the first counts.

In step 609, the electronic apparatus (101) acquires the second counts of the respective plurality of appellations selected in step 606 from the data 1 (691). In step 610, the electronic apparatus (101) displays, on the map, regions allocated to the respective plurality of appellations, for example, with a hue colored in a lighter color as the second count acquired in step 609 is lower.

In step 611, the electronic apparatus (101) determines whether a mouse cursor is moved to or an operation finger is placed on one region on the map. When the mouse cursor is moved to or the operation finger is placed on the one region, the electronic apparatus (101) advances the processing to step 612. On the other hand, when the mouse cursor is not moved to and the operation finger is not placed on the one region, the electronic apparatus (101) advances the processing to step 613.

In step 612, the electronic apparatus (101) acquires information for supporting selection of a conversion candidate present in the region under the mouse cursor or the operation finger and displays the information with, for example, a popup window associated with the region. When the conversion candidate is an appellation, the information for supporting selection of the conversion candidate can be an organization name to which a receiver associated with the appellation, which is the conversion candidate, belongs, a location (which can include a country name) of the organization, an identification number associated with the organization, a name notation (in particular, a name notation other than alphabet (e.g., Han characters (including distinction by homonyms), hiragana or katakana, or Korean alphabet)), or an appellation notation (e.g., a nickname or a name in English of a Japanese or a Chinese).

In step 613, the electronic apparatus (101) detects that, on one region on the map, a conversion candidate on the region is selected. The selection of the conversion candidate is performed by, for example, left click by a mouse on the one region or, for example, double tap of an operation finger on the one region.

In step 614, the electronic apparatus (101) displays an appellation, which is the conversion candidate selected by the user in step 613, in a position (e.g., the head of a text) different from the input position of the destination on the application, to which a mail address is input, and decides the appellation.

In step 615, the electronic apparatus (101) finishes the processing for displaying a plurality of conversion candidates (appellations) associated with an input character string (mail address) and deciding a conversion candidate.

Figure 6B:
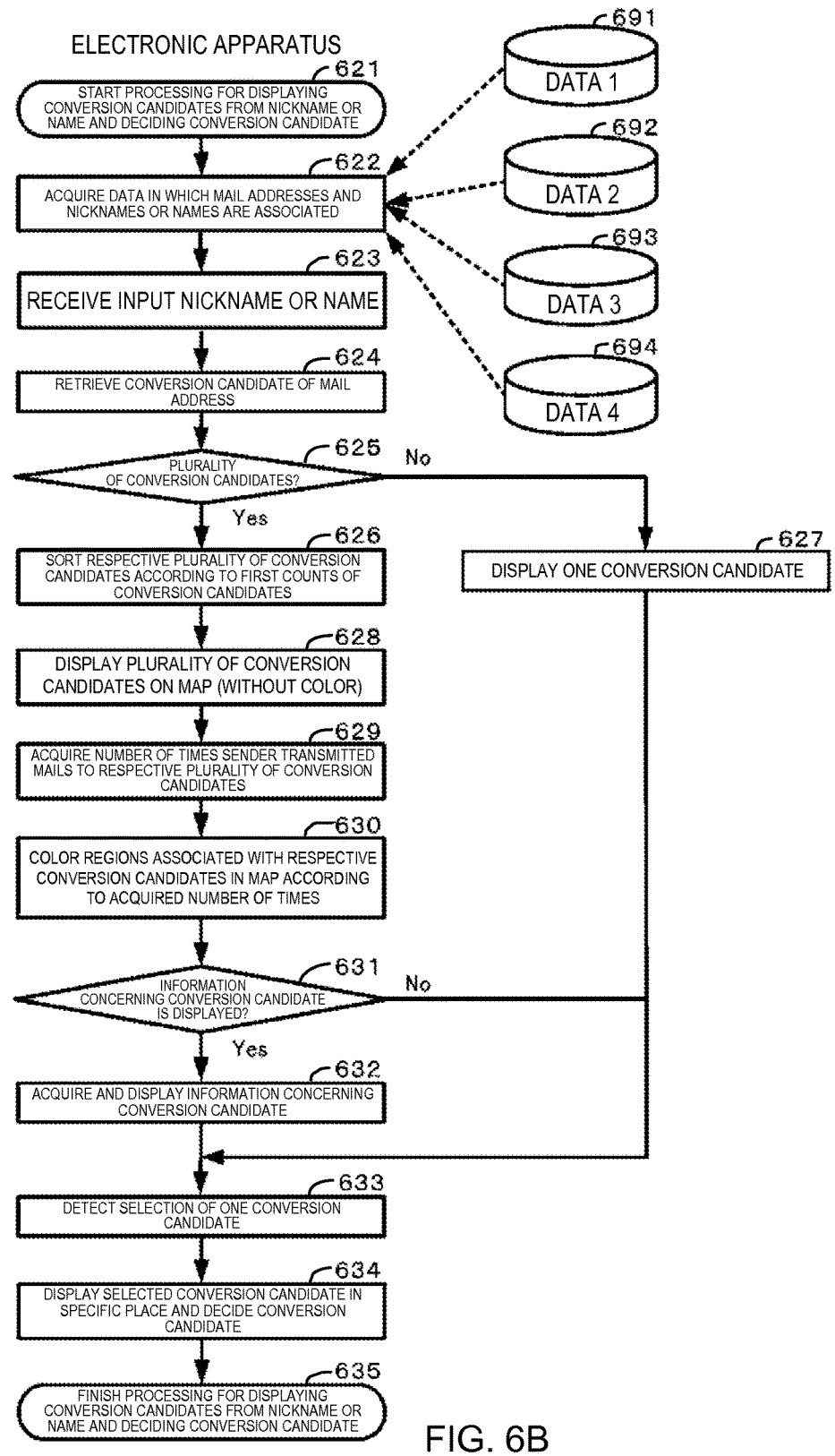

FIG. 6B shows, among the flowcharts for the processing for displaying conversion candidates associated with an input character string, a flowchart for executing processing in which an input character string is a nickname or a name, a conversion candidate associated with the input character string is a mail address, and an electronic apparatus retrieves the conversion candidate. In step 621, the electronic apparatus (101) starts processing for displaying a plurality of conversion candidates (mail addresses) associated with an input character string (nickname or name; hereinafter referred to appellation as well) and deciding the plurality of conversion candidates.

In step 622, the electronic apparatus (101) optionally acquires the data 1 (691), data 2 (692), data 3 (693), and data 4 (694) necessary for displaying conversion candidates from a server computer. The data 1 (691) is as explained in step 602 in FIG. 6A. The data 2 (692) includes a pair of a mail address of a receiver and a mail address of a sender (a receiver-sender pair) and the number of times of transmission or a frequency mails were transmitted from the sender to the receiver (the third count). The data 3 (693) includes a mail address of a reception destination, an organization to which a sender belongs, and the number of times of transmission or a frequency a person belonging to the organization to which the sender belongs transmitted mails to the mail address of the reception destination (the fourth count). The data 4 (694) indicates a distance between the organization to which the sender of the mail belongs and an organization to which a user having the mail address of the reception destination belongs. The electronic apparatus (101) can download the data 1 (691), the data 2 (692), the data 3 (693), and the data 4 (694) to the electronic apparatus (101) from a storage medium (e.g., a server computer accessible to the storage medium) having stored therein the data 1 (691), the data 2 (692), the data 3 (693), and the data 4 (694), for example, during the start of the electronic apparatus (101) or during the start of the application to which a character string can be input or at every predetermined time interval.

In step 623, the electronic apparatus (101) receives an appellation input to, for example, the head of, for example, a text on the application, to which a mail address is input, from the mail application. In step 624, the electronic apparatus (101) retrieves, referring to the data 1 (691), mail addresses associated with the input appellation.

In step 625, the electronic apparatus (101) determines whether the number of the mail addresses retrieved in step 624 is a plural number. When the number of the retrieved mail addresses is a plural number, the electronic apparatus (101) advances the processing to step 626. On the other hand, when the number of the retrieved mail addresses is one, the electronic apparatus (101) advances the processing to step 627.

In step 626, when the number of the retrieved mail addresses is a plural number, the electronic apparatus (101) calculates candidate rankings of the respective conversion candidates (the fifth count). As a method of calculating the fifth count, the fifth count can be calculated according to the above Expression 1 or Expression 2 explained in the explanation of step 302 shown in FIG. 3A. Alternatively, the electronic apparatus (101) can acquire the fifth count from the server computer.

Subsequently, the electronic apparatus (101) sorts the respective mail addresses, which are the plurality of conversion candidates, according to the fifth counts. The electronic apparatus (101) selects, as the mail addresses, for example, three to five mail addresses in descending order of the fifth counts. Alternatively, as the respective mail addresses, which are the plurality of conversion candidates, the electronic apparatus (101) can select, for example, three to five mail addresses in descending order of the first counts according to the first counts in the data 1 (691). Alternatively, as the respective mail addresses, which are the plurality of conversion candidates, the electronic apparatus (101) can select, for example, three to five mail addresses in descending order of the third counts according to the third counts in the data 2 (692). Alternatively, as the respective mail addresses, which are the plurality of conversion candidates, the electronic apparatus (101) can select, for example, three to five mail addresses in descending order of the fourth counts according to the fourth counts in the data 3 (693).

In step 627, when the number of the retrieved mail addresses is one, the electronic apparatus (101) displays the one mail address as a conversion candidate for the appellation.

In step 628, the electronic apparatus (101) displays the plurality of mail addresses selected in step 626 on a map. The map can be two-dimensional or three-dimensional display. The electronic apparatus (101) displays, on the map, the respective plurality of mail addresses selected according to the fifth counts to occupy wider regions in descending order of the fifth counts. The map can be two-dimensional or three-dimensional display. Alternatively, the electronic apparatus (101) can display, on the map, a respective plurality of mail addresses selected according to the third counts in the data 2 (692) to occupy wider regions in descending order of the third counts. Alternatively, the electronic apparatus (101) can display, on the map, a respective plurality of mail addresses selected according to the fourth counts in the data 3 (693) to occupy wider regions in descending order of the fourth counts.

In step 629, the electronic apparatus (101) acquires the second counts of the respective plurality of appellations selected in step 626 from the data 1 (691). In step 630, the electronic apparatus (101) displays, on the map, regions allocated to the respective plurality of appellations, for example, with a hue colored in a lighter color as the second count acquired in step 629 is lower.

In step 631, the electronic apparatus (101) determines whether a mouse cursor is moved to or an operation finger is placed on one region on the map. When the mouse cursor is moved to or the operation finger is placed on the one region, the electronic apparatus (101) advances the processing to step 632. On the other hand, when the mouse cursor is not moved to and the operation finger is not placed on the one region, the electronic apparatus (101) advances the processing to step 633.

In step 632, the electronic apparatus (101) acquires information for supporting selection of a conversion candidate present in the region under the mouse cursor or the operation finger and displays the information with, for example, a popup window associated with the region. When the conversion candidate is a mail address, the information for supporting selection of the conversion candidate can be an organization name to which a receiver associated with the mail address, which is the conversion candidate, belongs, a location (which can include a country name) of the organization, an identification number associated with the organization, a name notation (in particular, a name notation other than alphabet (e.g., Han characters, hiragana or katakana, or Korean alphabet)), or an appellation notation (e.g., a nickname or a name in English of a Japanese or a Chinese).

In step 633, the electronic apparatus (101) detects that, on one region on the map, a conversion candidate on the region is selected. The selection of the conversion candidate is performed by, for example, left click by a mouse on the one region or, for example, double tap of an operation finger on the one region.

In step 634, the electronic apparatus (101) displays a mail address, which is the conversion candidate selected by the user in step 633, in a position (e.g., a destination) different from the input position of the appellation on the application, to which the mail address is input, and decides the mail address.

In step 635, the electronic apparatus (101) finishes the processing for displaying a plurality of conversion candidates (mail addresses) associated with an input character string (appellation) and deciding the plurality of conversion candidates.

Figure 6C:
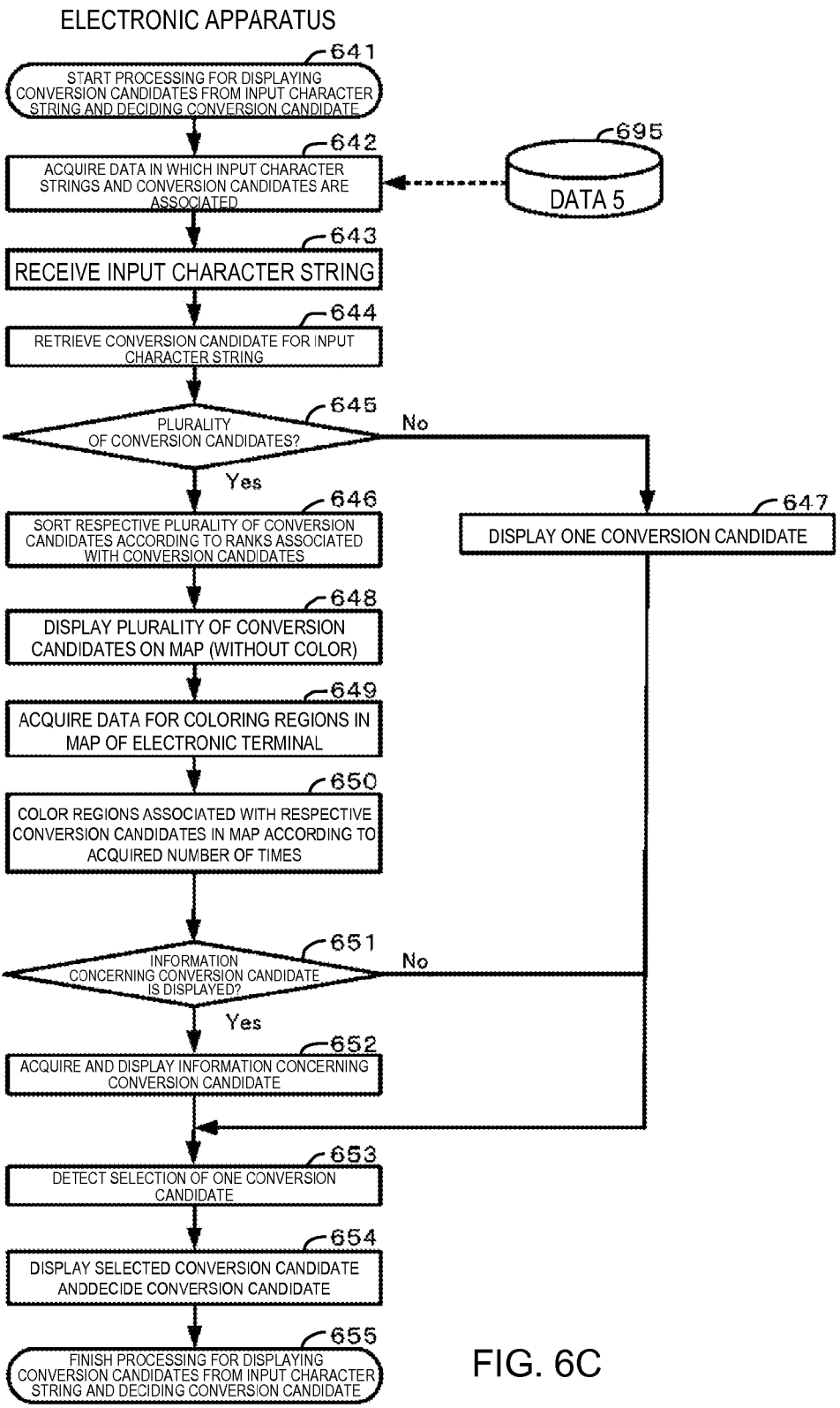

FIG. 6C shows an example of a flowchart for processing for displaying a conversion candidate associated with an input character string and shows a flowchart in which the electronic apparatus executes processing for retrieving a conversion candidate according to the embodiment of the present invention. In step 641, the electronic apparatus (101) starts processing for displaying a plurality of conversion candidates associated with an input character string and deciding the plurality of conversion candidates.

In step 642, the electronic apparatus (101) optionally acquires, from a server computer, data 5 (695) necessary for displaying conversion candidates on an application to which a character can be input. The data 5 (695) includes, for each word that is an input character string, a plurality of conversion candidates associated with the word and, concerning each of the plurality of conversion candidates, a total number of people who performed decision inputs using the conversion candidate (the first count) and the number of times or a frequency an inputting person (i.e., the user J) performed decision inputs using the conversion candidate (the second count). The electronic apparatus (101) can download the data 5 (695) to the electronic apparatus (101) from a storage medium (e.g., a server computer accessible to the storage medium) having stored therein the data 5 (695), for example, during the start of the electronic apparatus (101) or during the start of an application to which a character string can be input or at every predetermined time interval.

In step 643, the electronic apparatus (101) receives a character string input to the application, to which the character string can be input, from the application. In step 644, the electronic apparatus (101) retrieves, referring to the data 5 (695), conversion candidates associated with the input character string. In step 645, the electronic apparatus (101) determines whether the number of conversion candidates retrieved in step 644 is a plural number. When the number of retrieved conversion candidates is a plural number, the electronic apparatus (101) advances the processing to step 646. On the other hand, when the number of retrieved conversion candidates is one, the electronic apparatus (101) advances the processing to step 647.

In step 646, when the number of retrieved conversion candidates is a plural number, the electronic apparatus (101) acquires the first counts of the respective conversion candidates from the data 5 (695) and sorts the respective plurality of conversion candidates according to the first counts. The electronic apparatus (101) selects, as the conversion candidates, for example, three to five conversion candidates in descending order of the first counts.

In step 647, when the number of the retrieved conversion candidates is one, the electronic apparatus (101) displays the one conversion candidate as a conversion candidate for the input character string. In step 648, the electronic apparatus (101) displays the plurality of conversion candidates selected in step 646 on a map. The map can be two-dimensional or three-dimensional display. The electronic apparatus (101) displays the respective plurality of conversion candidates on the map to occupy wider regions in descending order of the first counts. In step 649, the electronic apparatus (101) acquires the second counts of the respective plurality of conversion candidates selected in step 646 from the data 5 (695). In step 650, the electronic apparatus (101) displays, on the map, regions allocated to the respective plurality of conversion candidates, for example, with a hue colored in a lighter color as the second count acquired in step 649 is lower.

In step 651, the electronic apparatus (101) determines whether a mouse cursor is moved to or an operation finger is placed on one region on the map. When the mouse cursor is moved to or the operation finger is placed on the one region, the electronic apparatus (101) advances the processing to step 652. On the other hand, when the mouse cursor is not moved to and the operation finger is not placed on the one region, the electronic apparatus (101) advances the processing to step 653.

In step 652, the electronic apparatus (101) acquires information for supporting selection of a conversion candidate present in the region under the mouse cursor or the operation finger and displays the information with, for example, a popup window associated with the region. The information for supporting selection of the conversion candidate can be, for example, display concerning an input history of a character inputting person (e.g., display concerning which conversion candidate is most often selected in the past).

In step 653, the electronic apparatus (101) detects that, on one region on the map, a conversion candidate on the region is selected. The selection of the conversion candidate is performed by, for example, left click by a mouse on the one region or, for example, double tap of an operation finger on the one region.

In step 654, the electronic apparatus (101) replaces the characters received in step 643 with the conversion candidate selected in step 653 and displays and decides the conversion candidate. In step 655, the electronic apparatus (101) finishes the processing for displaying a plurality of conversion candidates associated with an input character string and deciding the plurality of conversion candidates.

Figure 7A:
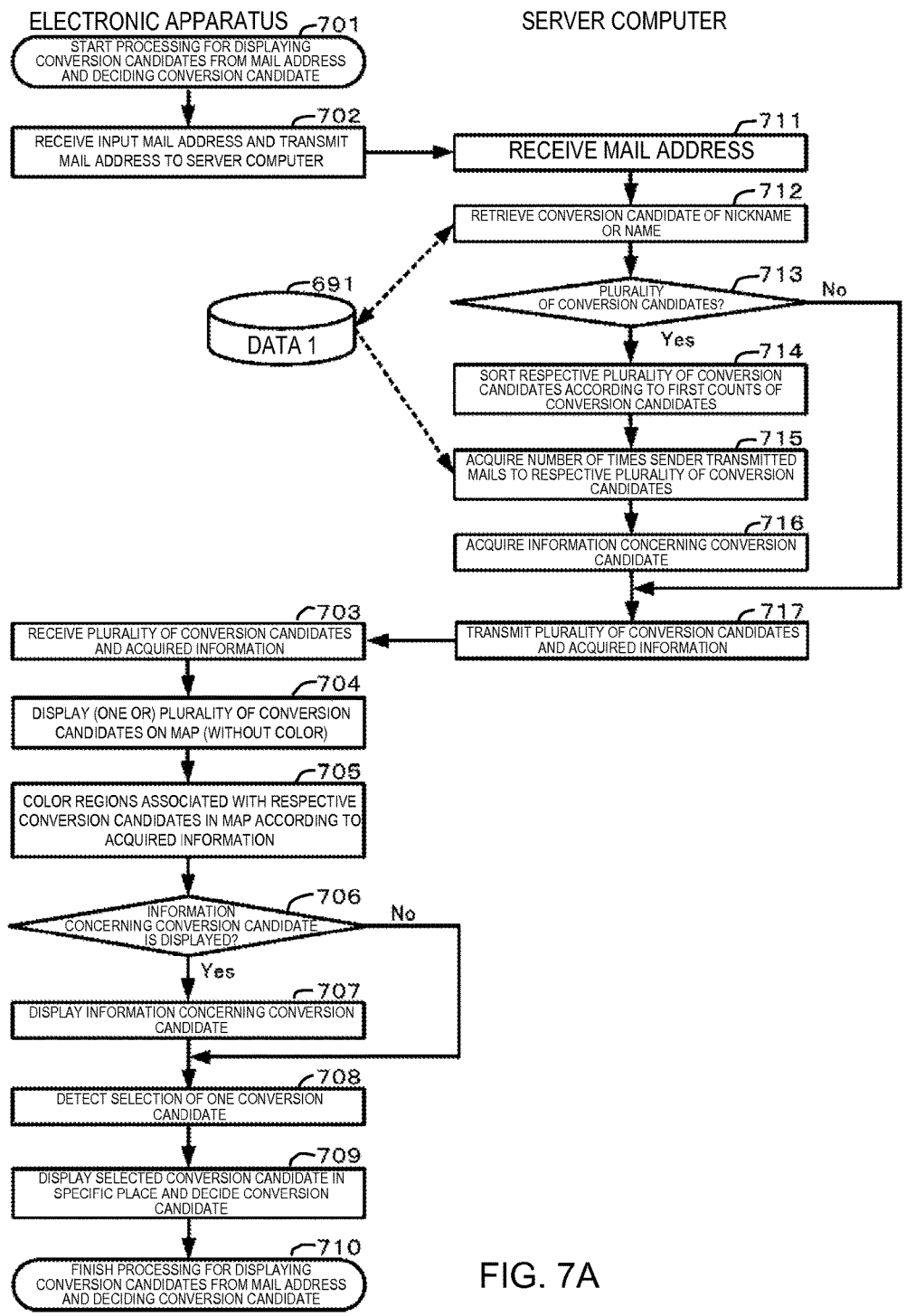
FIGS. 7A-7C are flowcharts of a process for displaying conversion candidates (nicknames or names) associated with an input character string (mail address) in accordance with at least one embodiment of the present invention.

FIG. 7A shows, among the flowcharts for the processing for displaying conversion candidates associated with an input character string, a flowchart for executing processing in which an input character string is a mail address, a conversion candidate associated with the input character string is a nickname or a name, and a server computer retrieves the conversion candidate.

In step 701, the electronic apparatus (101) starts processing for displaying a plurality of conversion candidates (nicknames or names; hereinafter referred to as appellations as well) associated with an input character string (mail address) and deciding the plurality of conversion candidates.

In step 702, the electronic apparatus (101) receives a mail address input to, for example, a destination on an application, to which the mail address is input, (including the case in which a part of the mail address is input by a user and the remainder is automatically input) from the mail application. According to the reception of the mail address, the electronic apparatus (101) transmits the received mail address to the server computer (141).

In step 711, the server computer (141) receives the mail address from the electronic apparatus (101). In step 712, the server computer (141) retrieves, referring to the data 1 (691), nicknames or names associated with the input mail address. In step 713, the server computer (141) determines whether the number of the appellations retrieved in step 712 is a plural number. When the number of the retrieved appellations is a plural number, the electronic apparatus (101) advances the processing to step 714. On the other hand, when the number of the retrieved appellations is one, the electronic apparatus (101) advances the processing to step 717.

In step 714, when the number of the retrieved appellations is a plural number, the server computer (141) sorts the respective appellations according to the first counts in the data 1 (691). The server computer (141) selects, as the appellations, for example, three to five appellations in descending order of the first counts. In step 715, the server computer (141) acquires, referring to the data 2 (692), the second counts of the respective selected appellations.

In step 716, the server computer (141) can optionally acquire information for supporting selection associated with the respective selected appellations. In step 717, the server computer (141) transmits the selected appellations and the first counts and the second counts associated with the respective appellations and, optionally, the information for supporting selection associated with the respective selected appellations to the electronic apparatus (101).

In step 703, the electronic apparatus (101) receives, from the server computer (141), the selected appellations and the first counts and the second counts associated with the respective appellations and, optionally, the information for supporting selection associated with the respective selected appellations.

In step 704, when the number of the received appellations is one, the electronic apparatus (101) displays the one appellation as a conversion candidate for the mail address. When the number of the received appellations is a plural number, the electronic apparatus (101) displays the plurality of appellations on a map. The map can be two-dimensional or three-dimensional display. The electronic apparatus (101) displays the respective plurality of appellations on the map to occupy wider regions in descending order of the first counts.

In step 705, the electronic apparatus (101) displays, on the map, regions allocated to the respective plurality of appellations such that, for example, a hue is lighter, brightness is lower, and chroma is lower as the second count is lower in the regions on the map.

In step 706, the electronic apparatus (101) determines whether a mouse cursor is moved to or an operation finger is placed on one region on the map. When the mouse cursor is moved to or the operation finger is placed on the one region, the electronic apparatus (101) advances the processing to step 707. On the other hand, when the mouse cursor is not moved to and the operation finger is not placed on the one region, the electronic apparatus (101) advances the processing to step 708.

In step 707, the electronic apparatus (101) acquires information for supporting selection of a conversion candidate present in the region under the mouse cursor or the operation finger and displays the information with, for example, a popup window associated with the region. In step 708, the electronic apparatus (101) detects that, on one region on the map, a conversion candidate on the region is selected. The selection of the conversion candidate is performed by, for example, left click by a mouse on the one region or, for example, double tap of an operation finger on the one region.

In step 709, the electronic apparatus (101) displays an appellation, which is the conversion candidate selected by the user in step 613, in a position (e.g., the head of a text) different from the input position of the destination on the application, to which a mail address is input, and decides the appellation. In step 710, the electronic apparatus (101) finishes the processing for displaying a plurality of conversion candidates (appellations) associated with an input character string (mail address) and deciding the plurality of conversion candidates.

Figure 7B:
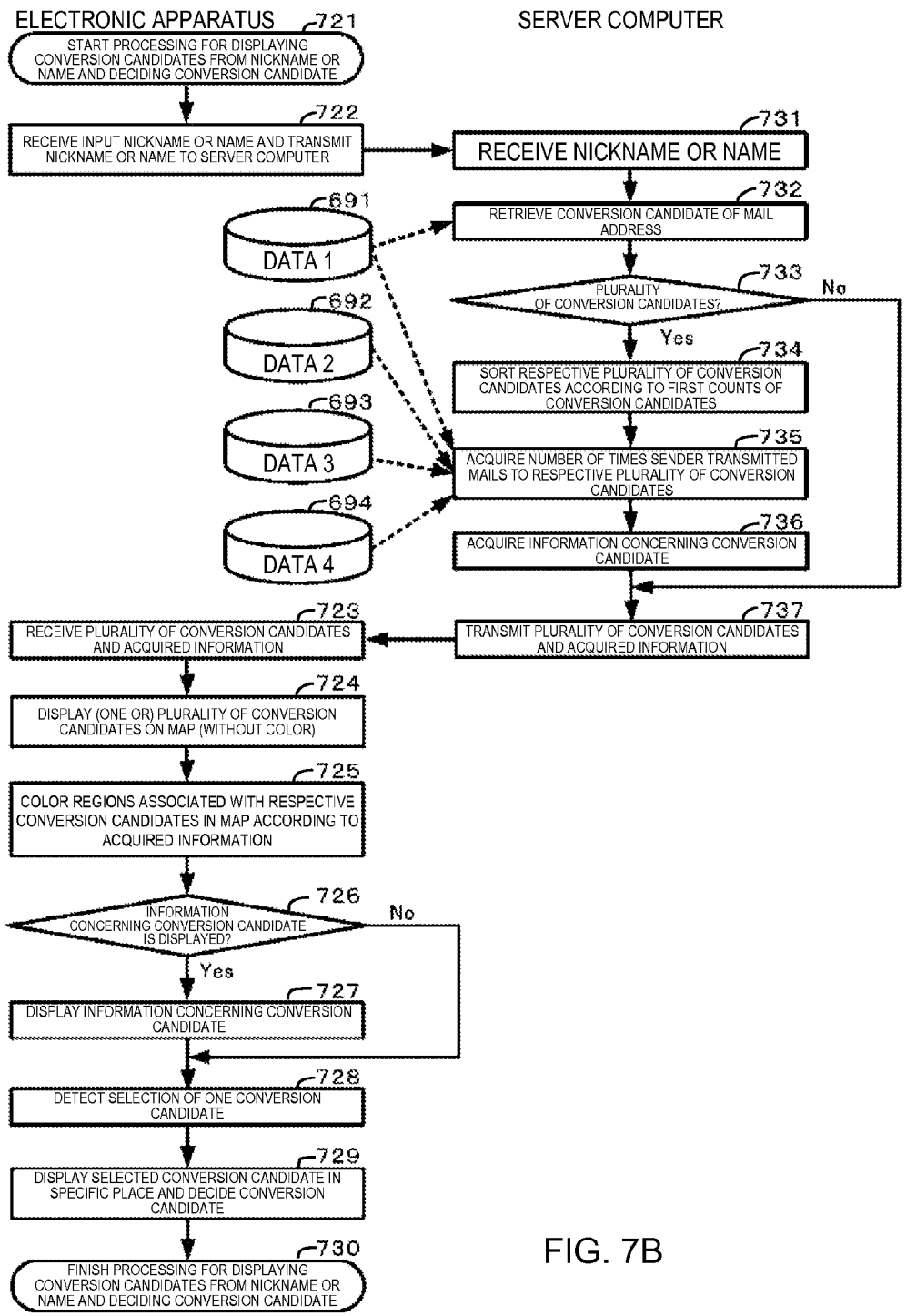

FIG. 7B shows, among the flowcharts for the processing for displaying conversion candidates associated with an input character string, a flowchart for executing processing in which an input character string is a nickname or a name, a conversion candidate associated with the input character string is a mail address, and a server computer retrieves the conversion candidate.

In step 721, the electronic apparatus (101) starts processing for displaying a plurality of conversion candidates (mail addresses) associated with an input character string (nickname or name; hereinafter referred to appellation as well) and deciding the plurality of conversion candidates. In step 722, the electronic apparatus (101) receives an appellation input to, for example, a text on an application, to which a mail address is input, from the mail application. According to the reception of the appellation, the electronic apparatus (101) transmits the received appellation to the server computer (141).

In step 731, the server computer (141) receives the appellation from the electronic apparatus (101). In step 732, the server computer (141) retrieves, referring to the data 1 (691), mail addresses associated with the input appellation. In step 733, the server computer (141) determines whether the number of the mail addresses retrieved in step 732 is a plural number. When the number of the retrieved mail addresses is a plural number, the electronic apparatus (101) advances the processing to step 734. On the other hand, when the number of the retrieved mail addresses is one, the electronic apparatus (101) advances the processing to step 737.

In step 734, when the number of the retrieved mail addresses is a plural number, the server computer (141) calculates candidate rankings (the fifth counts) of the respective conversion candidates. As a method of calculating the fifth count, the fifth count is calculated according to the above Expression 1 or Expression 2 explained in the explanation of step 302 shown in FIG. 3A.

Subsequently, the server computer (141) sorts the respective mail addresses, which are the plurality of conversion candidates, according to the fifth counts. The server computer (141) selects, as the mail addresses, for example, three to five mail addresses in descending order of the fifth counts. Alternatively, as the respective mail addresses, which are the plurality of conversion candidates, the server computer (141) can select, for example, three to five mail addresses in descending order of the first counts according to the first counts in the data 1 (691). Alternatively, as the respective mail addresses, which are the plurality of conversion candidates, the server computer (141) can select, for example, three to five mail addresses in descending order of the third counts according to the third counts in the data 2 (692). Alternatively, as the respective mail addresses, which are the plurality of conversion candidates, the server computer (141) can select, for example, three to five mail addresses in descending order of the fourth counts according to the fourth counts in the data 3 (693).

In step 735, the server computer (141) acquires, referring to the data 2 (692), the second counts of the respective selected mail addresses. In step 736, the server computer (141) can optionally acquire information for supporting selection associated with the respective selected mail addresses. In step 737, the server computer (141) transmits the selected mail addresses and the fifth counts and the second counts (and, optionally, the third counts or the fourth counts) associated with the respective appellations, and, optionally, the information for supporting selection associated with the respective selected mail addresses to the electronic apparatus (101).

In step 723, the electronic apparatus (101) receives, from the server computer (141), the selected mail addresses and the fifth counts and the second counts (and, optionally, the third counts or the fourth counts) associated with the respective mail addresses and, optionally, the information for supporting selection associated with the respective selected mail addresses.

In step 724, when the number of the received mail addresses is one, the electronic apparatus (101) displays the one mail address as a conversion candidate for the mail address. When the number of the received mail addresses is a plural number, the electronic apparatus (101) displays the plurality of mail addresses on a map. The map can be two-dimensional or three-dimensional display. The electronic apparatus (101) displays the respective plurality of mail addresses on the map to occupy wider regions in descending order of the fifth counts. Alternatively, the electronic apparatus (101) can display, on the map, a respective plurality of mail addresses selected according to the third counts to occupy wider regions in descending order of the third counts. Alternatively, the electronic apparatus (101) can display, on the map, a respective plurality of mail addresses selected according to the fourth counts to occupy wider regions in descending order of the fourth counts.

In step 725, the electronic apparatus (101) displays, on the map, regions allocated to the respective plurality of mail addresses such that, for example, a hue is lighter, brightness is lower, and chroma is lower as the second count is lower. In step 726, the electronic apparatus (101) determines whether a mouse cursor is moved to or an operation finger is placed on one region on the map. When the mouse cursor is moved to or the operation finger is placed on the one region, the electronic apparatus (101) advances the processing to step 727. On the other hand, when the mouse cursor is not moved to and the operation finger is not placed on the one region, the electronic apparatus (101) advances the processing to step 728.

In step 727, the electronic apparatus (101) acquires information for supporting selection of a conversion candidate present in the region under the mouse cursor or the operation finger and displays the information with, for example, a popup window associated with the region. In step 728, the electronic apparatus (101) detects that, on one region on the map, a conversion candidate on the region is selected. The selection of the conversion candidate is performed by, for example, left click by a mouse on the one region or, for example, double tap of an operation finger on the one region.

In step 729, the electronic apparatus (101) displays a mail address, which is the conversion candidate selected by the user in step 728, in a position (e.g., a destination) different from the input position (the text) of the appellation on the application, to which the mail address is input, and decides the mail address. In step 730, the electronic apparatus (101) finishes the processing for displaying a plurality of conversion candidates (mail addresses) associated with an input character string (appellation) and deciding the plurality of conversion candidates.

Figure 7C:
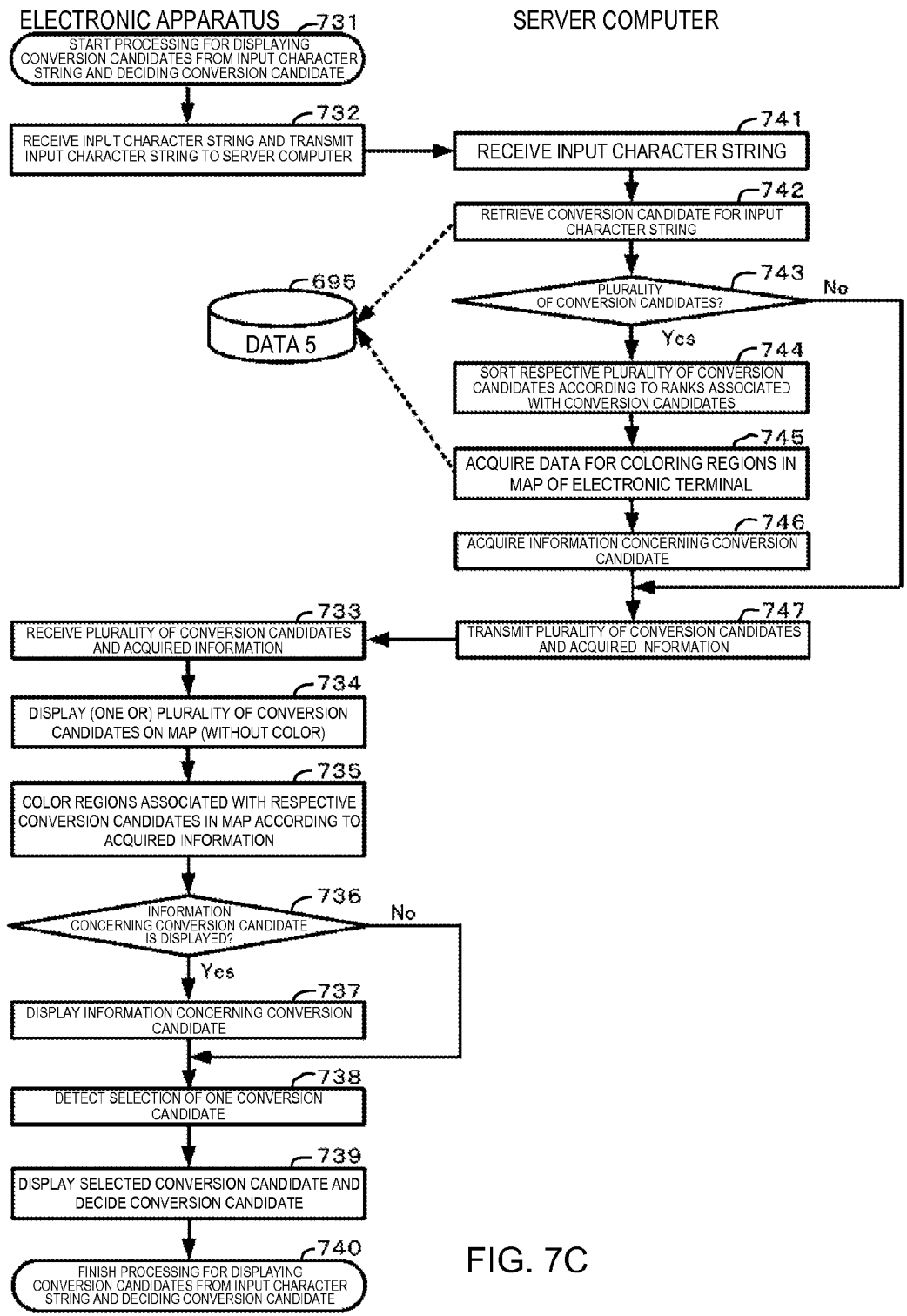

FIG. 7C shows an example of a flowchart for processing for displaying a conversion candidate associated with an input character string and shows a flowchart in which the server computer executes processing for retrieving a conversion candidate according to the embodiment of the present invention.

In step 731, the electronic apparatus (101) starts processing for displaying a plurality of conversion candidates associated with an input character string and deciding the plurality of conversion candidates. In step 732, the electronic apparatus (101) receives a character string input to the application, to which the character string can be input, from the application. According to the reception of the input character string, the electronic apparatus (101) transmits the received input character string to the server computer (141).

In step 741, the server computer (141) receives the input character string from the electronic apparatus (101). In step 742, the server computer (141) retrieves, referring to the data 5 (695), conversion candidates associated with the input character string. In step 743, the server computer (141) determines whether the number of the conversion candidates retrieved in step 742 is a plural number. When the number of the retrieved conversion candidates is a plural number, the electronic apparatus (101) advances the processing to step 744. On the other hand, when the number of the retrieved conversion candidates is one, the electronic apparatus (101) advances the processing to step 747.

In step 744, when the number of the retrieved conversion candidates is a plural number, the server computer (141) sorts the respective conversion candidates according to the first counts in the data 1 (691). The server computer (141) selects, as the conversion candidates, for example, three to five conversion candidates in descending order of the first counts.

In step 745, the server computer (141) acquires, referring to the data 5 (695), the second counts of the respective selected conversion candidates. In step 746, the server computer (141) can optionally acquire information for supporting selection associated with the respective selected conversion candidates. In step 747, the server computer (141) transmits the selected conversion candidates and the first counts and the second counts associated with the respective conversion candidates and, optionally, the information for supporting selection associated with the respective selected conversion candidates to the electronic apparatus (101).

In step 733, the electronic apparatus (101) receives, from the server computer (141), the selected conversion candidates and the first counts and the second counts associated with the respective conversion candidates and, optionally, the information for supporting selection associated with the respective selected conversion candidates. In step 734, when the number of the received conversion candidates is one, the electronic apparatus (101) displays the one conversion candidate as a conversion candidate for the mail address. When the number of the received conversion candidates is a plural number, the electronic apparatus (101) displays the plurality of conversion candidates on a map. The map can be two-dimensional or three-dimensional display. The electronic apparatus (101) displays the respective plurality of conversion candidates on the map to occupy wider regions in descending order of the first counts.

In step 735, the electronic apparatus (101) displays, on the map, regions allocated to the respective plurality of conversion candidates such that, for example, a hue is lighter, brightness is lower, and chroma is lower as the second count is lower. In step 736, the electronic apparatus (101) determines whether a mouse cursor is moved to or an operation finger is placed on one region on the map. When the mouse cursor is moved to or the operation finger is placed on the one region, the electronic apparatus (101) advances the processing to step 737. On the other hand, when the mouse cursor is not moved to and the operation finger is not placed on the one region, the electronic apparatus (101) advances the processing to step 738.

In step 737, the electronic apparatus (101) acquires information for supporting selection of a conversion candidate present in the region under the mouse cursor or the operation finger and displays the information with, for example, a popup window associated with the region. In step 738, the electronic apparatus (101) detects that, on one region on the map, a conversion candidate on the region is selected. The selection of the conversion candidate is performed by, for example, left click by a mouse on the one region or, for example, double tap of an operation finger on the one region. In step 739, the electronic apparatus (101) replaces the characters received in step 738 with the conversion candidate selected in step 653 and displays and decides the conversion candidate.

In step 710, the electronic apparatus (101) finishes the processing for displaying a plurality of conversion candidates associated with an input character string and deciding the plurality of conversion candidates.

Figure 8:
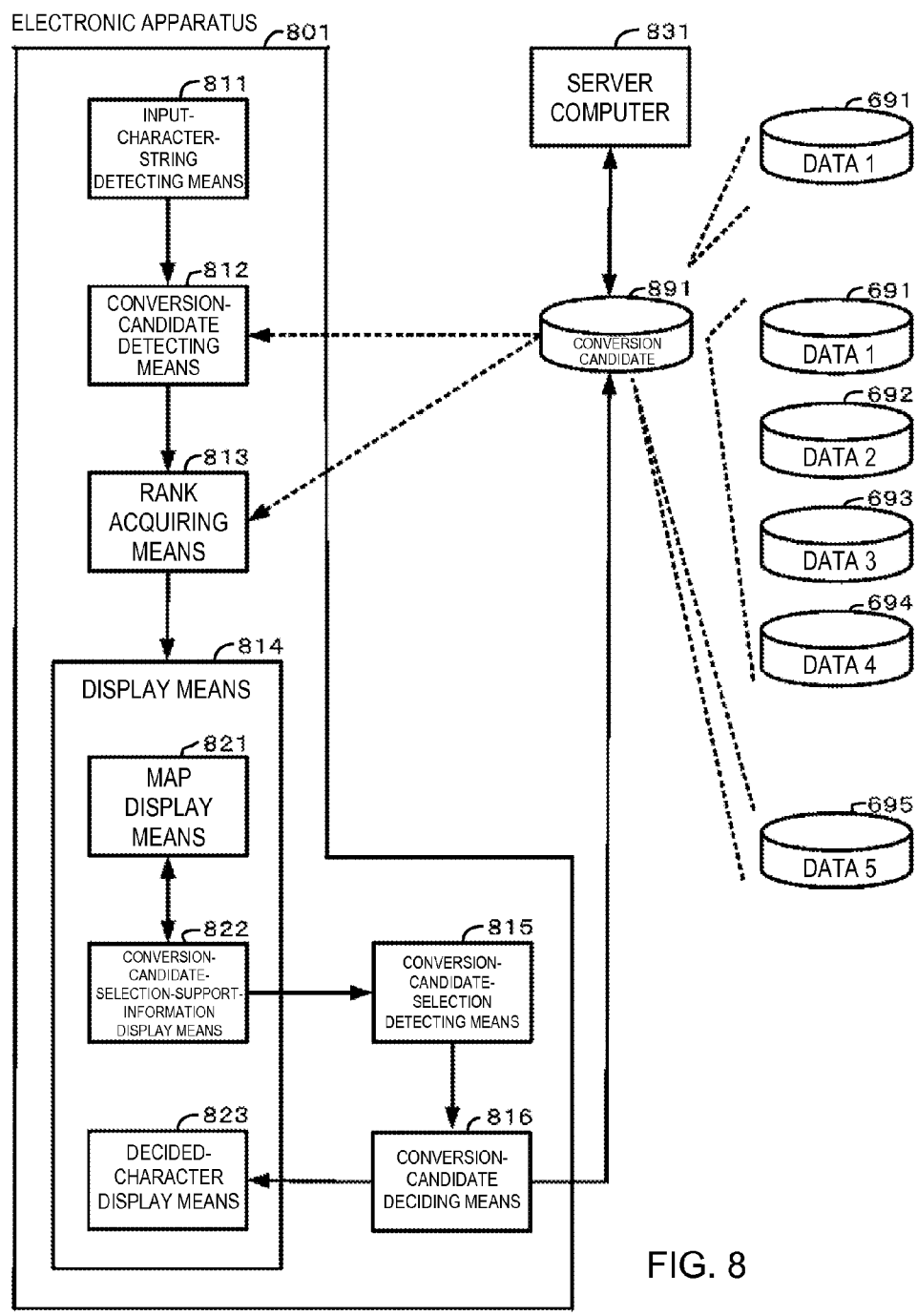
FIG. 8 is a functional block diagram of an electronic apparatus for displaying conversion candidates associated with an input character string and retrieving the conversion candidate in accordance with at least one embodiment of the present invention.

FIG. 8 is a diagram showing an example of a functional block diagram of an electronic apparatus (801) that in some embodiments includes the hardware configuration according to FIG. 1A or FIG. 1B and executes the processing of the steps of the flowchart shown in each of the FIG. 6A to FIG. 6C. The electronic apparatus (801) can correspond to the electronic apparatus (101) described in FIG. 1A or the electronic apparatus (121) described in FIG. 1B. The electronic apparatus (801) includes input-character-string detecting means (811), conversion-candidate detecting means (812), rank acquiring means (813), display means (814), conversion-candidate-selection detecting means (815), and conversion-candidate deciding means (816).

The input-character-string detecting means (811) detects an input of a character string by a user via, for example, a keyboard or a software keyboard or character input means by sound recognition. The input of the character string by the user also includes the case in which the remaining character string is automatically estimated and input by an input of a part of the character string by the user.

The input-character-string detecting means (811) can execute step 603 described in FIG. 6A, step 623 described in FIG. 6B, and step 643 described in FIG. 6C. The conversion-candidate detecting means (812) retrieves, in response to the input of the character string by the user, a conversion candidate associated with the input character string. In one embodiment of the present invention, the input character string can be a mail address and the conversion candidate can be a nickname or a name. In one embodiment of the present invention, the input character string can be a nickname or a name and the conversion candidate can be a mail address. In one embodiment of the invention, the conversion candidate can be a word that can be obtained by converting the input character string with an input method, a word that can be obtained by converting the input character string using a technical term conversion dictionary, a translation word that can be obtained by converting the input character string using a translation dictionary, or an association conversion word that can be obtained by converting the input character string using an association conversion dictionary. The input method can be, for example, a kana-kanji conversion system, a Chinese conversion system, or Korean conversion system but is not limited to these systems.

The conversion-candidate detecting means (812) can execute step 604 described in FIG. 6A, step 624 described in FIG. 6B, and step 644 described in FIG. 6C. The rank acquiring means (813) refers to the data 1 (691) when the input character string is a mail address and the conversion candidate is a nickname or a name. The rank acquiring means (813) uses, as a rank, a total number of users who transmitted mails to the mail address, which is the conversion candidate, using the nickname or the name, or the number of times or a frequency the user, who inputted the character string, transmitted mails to the mail address, which is the conversion candidate, using the nickname or the name, or a value calculated on the basis of a combination of the total number of the users and the number of times or the frequency.

When the input character string is a nickname or a name and the conversion candidate is a mail address, the rank acquiring means (813) refers to the data 1 (691), the data 2 (692), the data 3 (693), or the data 4 (694), or a combination of the data and uses, as a rank, a total number of users who transmitted mails to the mail address, which is the conversion candidate, using the nickname or the name, the number of times or a frequency the user, who inputted the character string, transmitted mails to the mail address, which is the conversion candidate, using the nickname or the name, the number of times of transmission or a frequency the user, who inputted the character string, transmitted mails to the mail address, which is the retrieved conversion candidate, the number of times of transmission or a frequency a person belonging to an organization to which the user, who inputted the character string, belongs transmitted mails to the mail address, which is the retrieved conversion candidate, or a distance between the organization to which the user, who inputted the character string, belongs and an organization to which a receiver associated with the mail address, which is the retrieved conversion candidate, belongs, or a value calculated on the basis of at least two of the numbers of times or the frequencies and the distance. In one embodiment of the present invention, when the organizations are represented by nodes of a tree structure, the distance can be represented by the number of branches from the organization to which the user, who inputted the character string, belongs to the organization to which the receiver associated with the mail address, which is the retrieved conversion candidate, belongs.

When the conversion candidate is a word that can be obtained by converting the input character string with an input method, a word that can be obtained by converting the input character string using a technical term conversion dictionary, a translation word that can be obtained by converting the input character string using a translation dictionary, or an association conversion word that can be obtained by converting the input character string using an association conversion dictionary, the rank acquiring means (813) refers to the data 5 (695) and uses, as a rank, the number of times or a frequency the input character string is converted into and decided as the conversion candidate, the number of times or a frequency, in document creation, the input character string is converted into and decided as the conversion candidate in the document, the number of times or a frequency, in an organization, the input character string is converted into and decided as the conversion candidate in the organization, or the number of times or a frequency, in an industry (e.g., the newspaper industry, the book industry, or the pharmaceutical industry), the input character string is converted into and decided as the conversion candidate in the organization, or a value calculated on the basis of a combination of at least two of the numbers of times or the frequencies.

The rank acquiring means (813) can execute steps 605 to 606 and 609 described in FIG. 6A, steps 625 to 626 and 629 described in FIG. 6B, and steps 645 to 646 and 649 described in FIG. 6C.

The display means (814) includes conversion-candidate-map display means (hereinafter referred to as map display means) (821) and decided-character display means (823) and, optionally, conversion-candidate-selection-support-information display means (822).

When a plurality of conversion candidates detected by the conversion-candidate detecting means (812) are present, the map display means (821) displays the plurality of conversion candidates on a map. The map display means (821) displays the map on a display device (e.g., the display (106) shown in FIG. 1A or the display (126) shown in FIG. 1B) such that one region including a plurality of regions corresponding to one conversion candidate, and conversion candidates having higher ranks associated with the respective plurality of conversion candidates occupy wider regions on the map.

When the ranks associated with the respective plurality of conversion candidates are first ranks, the map display means (821) displays regions on the map by further coloring the regions on the map with a hue, brightness, or chroma ordered according to a second rank different from the first rank or a combination of the hue, the brightness, and the chroma.

When the rank is a first rank that is a total number of users who transmitted mails to the mail address, which is the conversion candidate, using the nickname or the name, the map display means (821) displays the regions on the map by further coloring the regions on the map with a hue, brightness, or chroma ordered according to a second rank, which is the number of times or a frequency the user, who inputted the character string, transmitted mails to the mail address, which is the conversion candidate, using the nickname or the name, or a combination of the hue, the brightness, and the chroma.

The map display means (821) can execute steps 608 and 610 described in FIG. 6A, steps 628 and 630 described in FIG. 6B, and steps 648 and 650 described in FIG. 6C.

When a pointing device or an operation finger is placed on one of the plurality of conversion candidates displayed on the map displayed by the map display means (821), the conversion-candidate-selection-support-information display means (822) displays information associated with the conversion candidate on which the pointing device or the operation finger is placed and for supporting selection of the conversion candidate on which the pointing device or the operation finger is placed.

The conversion-candidate-selection-support-information display means (822) can execute steps 611 and 612 described in FIG. 6A, steps 631 and 632 described in FIG. 6B, and steps 651 and 652 described in FIG. 6C.

The conversion-candidate-selection detecting means (815) detects that, on one region on a map, a conversion candidate on the region is selected. The selection of the conversion candidate is performed by, for example, left click by a mouse on the one region or, for example, double tap of an operation finger on the one region.

The conversion-candidate-selection detecting means (815) can execute step 613 described in FIG. 6A, step 633 described in FIG. 6B, and step 653 described in FIG. 6C.

When one of a plurality of conversion candidates on a map is selected by a user, the conversion-candidate deciding means (816) can input the selected conversion candidate to a position different from a position of a character string input by the user.

When one of a plurality of conversion candidates on a map is selected by a user, the conversion-candidate deciding means (816) inputs the selected one conversion candidate (appellation) to a position (e.g., the head of a text) different from an input position of a character string in a destination on an application to which a mail address is input and decides the selected one conversion candidate.

When one of a plurality of conversion candidates on a map is selected by a user, the conversion-candidate deciding means (816) inputs the selected one conversion candidate (mail address) to a position (e.g., a destination) different from an input position of a character string in the head of a text on an application to which the mail address is input and decides the selected one conversion candidate.

When one of a plurality of conversion candidates on a map is selected by a user, the conversion-candidate deciding means (816) deletes a character string input by the user, inputs the selected conversion candidate in a position of the input character string, and decides the selected conversion candidate.

The conversion-candidate deciding means (816) can execute the decision processing in step 614 described in FIG. 6A, the decision processing in step 634 described in FIG. 6B, and the decision processing in step 654 described in FIG. 6C.

The decided-character display means (823) displays a character string decided by the conversion-candidate deciding means (816) on the display device.

The decided-character display means (823) can execute the display processing in step 614 described in FIG. 6A, the display processing in step 634 described in FIG. 6B, and the display processing in step 654 described in FIG. 6C.

Figure 9:
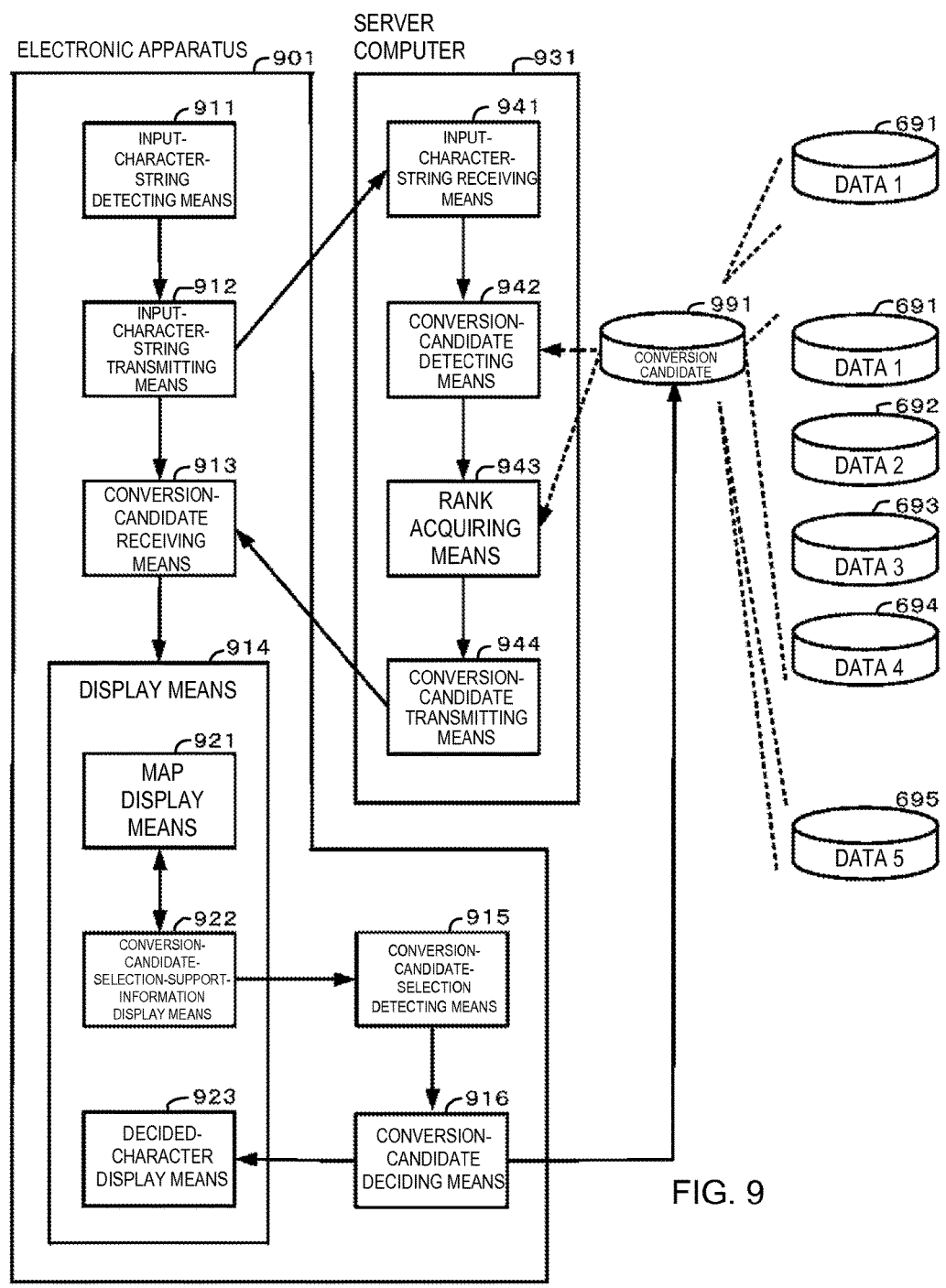
FIG. 9 is a functional block diagrams of a system for displaying conversion candidates associated with an input character string in accordance with at least one embodiment of the present invention.

FIG. 9 is a diagram showing an example of functional block diagrams of an electronic apparatus (901) that may include a hardware configuration according to FIG. 1A or FIG. 1B and executes processing of a part of the steps of the flowchart shown in each of FIG. 7A to FIG. 7C and a server computer (931) that may include a hardware configuration according to FIG. 1C and executes processing of a part of the steps of the flowchart shown in each of FIG. 7A to FIG. 7C.

The electronic apparatus (901) can correspond to the electronic apparatus (101) described in FIG. 1A or the electronic apparatus (121) described in FIG. 1B. The server computer (931) can correspond to the server computer (141) described in FIG. 1C.

The electronic apparatus (901) includes input-character-string detecting means (911), input-character-string transmitting means (912), conversion-candidate receiving means (913), display means (914), conversion-candidate-selection detecting means (915), and conversion-candidate deciding means (916).

The input-character-string detecting means (911) can execute processing same as the processing by the input-character-string detecting means (811) shown in FIG. 8.

The input-character-string detecting means (911) can execute the detection processing for an input character string in step 702 described in FIG. 7A, the detection processing for an input character string in step 722 described in FIG. 7B, and the detection processing for an input character string in step 732 described in FIG. 7C.

When the input-character-string detecting means (911) detects an input character string by a user, the input-character-string transmitting means (912) transmits the input character string to the server computer (931) via a wired or wireless network.

The input-character-string transmitting means (912) can execute the transmission processing for an input character string to the server computer in step 702 described in FIG. 7A, the transmission processing for an input character string to the server computer in step 722 described in FIG. 7B, and the transmission processing for an input character string to the server computer in step 732 described in FIG. 7C.

The conversion-candidate receiving means (913) receives conversion candidates and ranks associated with the respective conversion candidates transmitted from conversion-candidate transmitting means (944) of the server computer (931).

The conversion-candidate receiving means (913) can execute step 703 described in FIG. 7A, step 723 described in FIG. 7B, and step 733 described in FIG. 7C.

The display means (914) includes conversion-candidate-map display means (hereinafter referred to as map display means) (921) and decided-character display means (923) and, optionally, conversion-candidate-selection-support-information display means (922).

When a plurality of conversion candidates received by the conversion-candidate receiving means (913) are present, the map display means (921) displays the plurality of conversion candidates on a map.

The map display means (921) can execute display processing same as the display processing by the map display means (821) shown in FIG. 8.

The map display means (921) can execute steps 704 and 705 described in FIG. 7A, steps 724 and 725 described in FIG. 7B, and steps 734 and 735 described in FIG. 7C.

The conversion-candidate-selection-support-information display means (922) can execute processing same as the processing by the conversion-candidate-selection-support-information display means (822) shown in FIG. 8.

The conversion-candidate-selection-support-information display means (922) can execute steps 706 and 707 described in FIG. 7A, steps 726 and 727 described in FIG. 7B, and steps 736 and 737 described in FIG. 7C. The conversion-candidate-selection detecting means (915) can execute processing same as the processing by the conversion-candidate-selection detecting means (815) shown in FIG. 8.

The conversion-candidate-selection detecting means (915) can execute step 708 described in FIG. 7A, step 728 described in FIG. 7B, and step 738 described in FIG. 7C. The conversion-candidate deciding means (916) can execute processing same as the processing by the conversion-candidate deciding means (816) shown in FIG. 8.

The conversion-candidate deciding means (916) can execute the decision processing in step 709 described in FIG. 7A, the decision processing in step 729 described in FIG. 7B, and the decision processing in step 739 described in FIG. 7C. The decided-character display means (923) can execute processing same as the processing by the decided-character display means (823) shown in FIG. 8. The decided-character display means (923) can execute the display processing in step 709 described in FIG. 7A, the display processing in step 729 described in FIG. 7B, and the display processing in step 739 described in FIG. 7C.

The server computer (931) includes input-character-string receiving means (941), conversion-candidate detecting means (942), rank acquiring means (943), and the conversion-candidate transmitting means (944). The input-character-string receiving means (941) receives an input character string transmitted from the input-character-string transmitting means (912) of the electronic apparatus (901). The input-character-string receiving means (941) can execute step 711 described in FIG. 7A, step 731 described in FIG. 7B, and step 741 described in FIG. 7C.

The conversion-candidate detecting means (942) retrieves a conversion candidate associated with a character string received by the input-character-string receiving means (941). In one embodiment of the present invention, the input character string can be a mail address and the conversion candidate can be a nickname or a name. In one embodiment of the present invention, the input character string can be a nickname or a name and the conversion candidate can be a mail address. In one embodiment of the invention, the conversion candidate can be a word that can be obtained by converting the input character string with an input method, a word that can be obtained by converting the input character string using a technical term conversion dictionary, a translation word that can be obtained by converting the input character string using a translation dictionary, or an association conversion word that can be obtained by converting the input character string using an association conversion dictionary.

The conversion-candidate detecting means (942) can execute step 712 described in FIG. 7A, step 732 described in FIG. 7B, and step 742 described in FIG. 7C.

The rank acquiring means (943) can execute processing same as the processing by the rank acquiring means (813) included in the electronic apparatus (801) shown in FIG. 8.

The rank acquiring means (943) can execute steps 713 to 715 described in FIG. 7A, steps 733 to 735 described in FIG. 7B, and steps 743 to 745 described in FIG. 7C.

The rank acquiring means (943) can optionally execute step 716 described in FIG. 7A, step 736 described in FIG. 7B, and step 746 described in FIG. 7C.

The conversion-candidate transmitting means (944) transmits the retrieved conversion candidates and ranks associated with the respective conversion candidates to the conversion-candidate receiving means (913) of the electronic apparatus (901) via a wired or wireless network.

The conversion-candidate transmitting means (944) can further transmit information for supporting selection of the conversion candidate associated with the respective retrieved conversion candidates to the conversion-candidate receiving means (913) of the electronic apparatus (901) via a wired or wireless network.

The conversion-candidate transmitting means (944) can execute step 717 described in FIG. 7A, step 737 described in FIG. 7B, and step 747 described in FIG. 7C.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The embodiments disclosed herein include a system, a method, and/or a computer program product. The computer program product may include a computer readable storage medium (or media) having computer readable program instructions thereon for causing a processor to carry out the methods disclosed herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that this description is not intended to limit the invention. On the contrary, the embodiments presented are intended to cover some of the alternatives, modifications, and equivalents, which are included in the spirit and scope of the invention as defined by the appended claims. Further, in the detailed description of the disclosed embodiments, numerous specific details are set forth in order to provide a comprehensive understanding of the claimed invention. However, one skilled in the art would understand that various embodiments may be practiced without such specific details.

Although the features and elements of the embodiments disclosed herein are described in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. An electronic apparatus comprising:
    a computer readable storage medium and program instructions stored on the computer readable storage medium; and
    a processor communicatively coupled to the computer readable storage medium and configured to execute the program instructions to perform a method comprising:
    receiving an input character string from a user;
    retrieving, in response to input of a character string by a user, conversion candidates associated with the input character string, each conversion candidate having a first rank, wherein the input character string is a mail address and each conversion candidate is a nickname or a name, wherein the first rank is based on a first count corresponding to a total number of users who transmitted mails to the mail address using each nickname or name, wherein the first rank is further based on a second count corresponding to a total number of mails transmitted to the mail address using each nickname or name by the user;

displaying, when a plurality of the conversion candidates are present, the plurality of conversion candidates within a corresponding plurality of regions on a map, wherein conversion candidates that have a higher first count occupy larger regions on the map, wherein a first region associated with a conversion candidate having a highest first count comprises 50% of the map, wherein a second region associated with a conversion candidate having a second highest first count comprises 30% of the map, wherein a third region associated with a conversion candidate having a third highest first count comprises 20% of the map, and wherein the plurality of regions on the map are further colored with chroma ordered according to the second count; and displaying, in response to a user selecting a particular region of the plurality of regions on the map with a user input device, information associated with the conversion candidate corresponding to the particular selected region.

2. The electronic apparatus of claim 1, wherein the first rank is further based on a third count corresponding to a number of mails transmitted for a respective sender-receiver pair of mail addresses;
    wherein the first rank is further based on a fourth count corresponding to a number of mails transmitted by senders belonging to a same organization as the user; and
    wherein the first rank is further based on a fifth count corresponding to a number of branches in a tree structure representing an organizational hierarchy between an organization of the user and an organization of a second user associated with the input character string.

* * * * *